(12) United States Patent
Kan et al.

(10) Patent No.: US 8,903,881 B2
(45) Date of Patent: Dec. 2, 2014

(54) ARITHMETIC CIRCUIT, ARITHMETIC PROCESSING APPARATUS AND METHOD OF CONTROLLING ARITHMETIC CIRCUIT

(75) Inventors: Ryuji Kan, Yokohama (JP); Hideyuki Unno, Kawasaki (JP); Kenichi Kitamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 452 days.

(21) Appl. No.: 13/437,969

(22) Filed: Apr. 3, 2012

(65) Prior Publication Data
US 2012/0259905 A1 Oct. 11, 2012

(30) Foreign Application Priority Data

Apr. 8, 2011 (JP) ................................. 2011-085880

(51) Int. Cl.
*G06F 7/42* (2006.01)
*G06F 7/483* (2006.01)
*G06F 7/499* (2006.01)

(52) U.S. Cl.
CPC ............ *G06F 7/49942* (2013.01); *G06F 7/483* (2013.01)
USPC ............ 708/505; 708/200; 708/209; 708/497

(58) Field of Classification Search
None
See application file for complete search history.

(56) References Cited

U.S. PATENT DOCUMENTS

| | | | | |
|---|---|---|---|---|
| 5,038,310 | A | * | 8/1991 | Akagiri et al. ................ 708/205 |
| 5,870,094 | A | * | 2/1999 | Deering ........................ 345/419 |
| 6,018,756 | A | * | 1/2000 | Wolrich et al. ............... 708/505 |
| 2009/0030960 | A1 | * | 1/2009 | Geraghty et al. ............. 708/203 |

OTHER PUBLICATIONS

T. J. Dekker, "A Floating-Point Technique for Extending the Available Precision", Numer. Math. vol. 18, pp. 224-242 (1971).
Douglas M. Priest, "On Property of Floating Point Arithmetics: Numerical Stability and the Cost of Accurate Computations," Appendix A: Algorithms for Arbitrary Precision Floating Point Arithmetic, PhD thesis, University of California, Berkeley, pp. 111-124, Nov. 9, 1992.
Yozo Hida, et al., "Library for Double-Double and Quad-Double Arithmetic", pp. 1-24, Dec. 29, 2007.

* cited by examiner

*Primary Examiner* — Michael D Yaary
(74) *Attorney, Agent, or Firm* — Fujitsu Patent Center

(57) ABSTRACT

An arithmetic circuit for quantizing pre-quantized data includes a first input register to store first-format pre-quantized data that includes a mantissa and an exponent, a second input register to store a quantization target exponent, an exponent-correction-value indicating unit to indicate an exponent correction value, an exponent generating unit to generate a quantized exponent obtained by subtracting the exponent correction value from the quantization target exponent, a shift amount generating unit to generate a shift amount obtained by subtracting the exponent of the pre-quantized data and the exponent correction value from the quantization target exponent, a shift unit to generate a quantized mantissa obtained by shifting the mantissa of the pre-quantized data by the shift amount generated by the shift amount generating unit, and an output register to store quantized data that includes the quantized exponent generated by the exponent generating unit and the quantized mantissa generated by the shift unit.

16 Claims, 49 Drawing Sheets

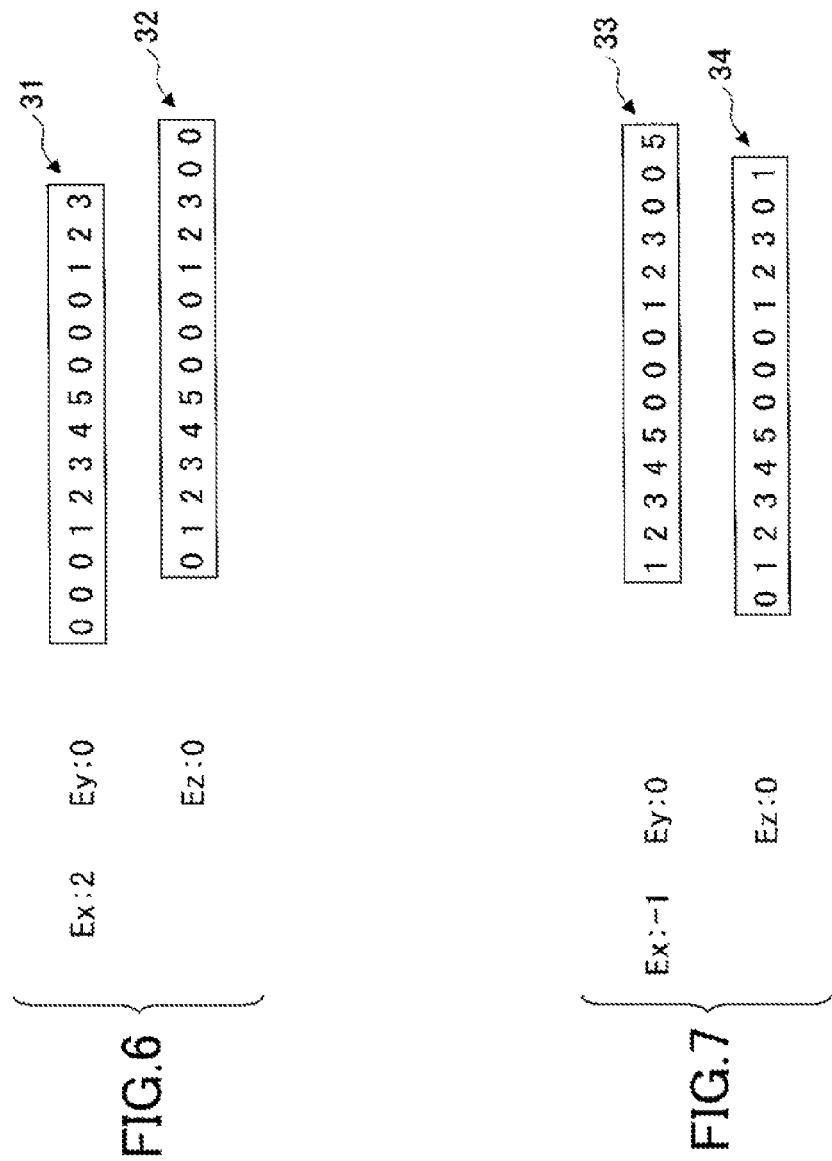

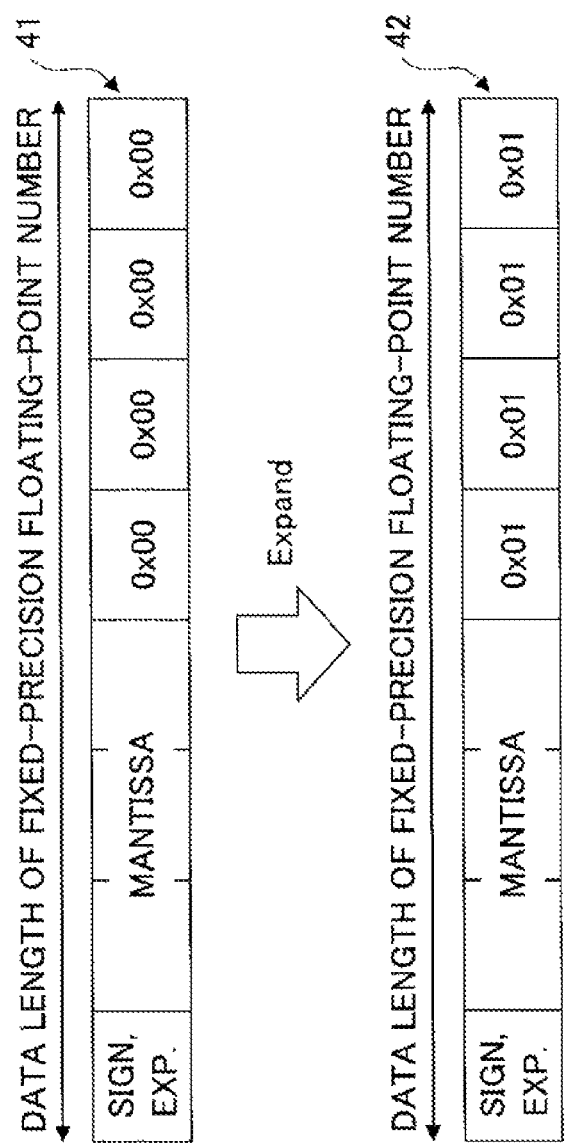

FIG.10

| | | exp | byte[0] | Oracle NUMBER representation | | | | | | Number |
|---|---|---|---|---|---|---|---|---|---|---|
| | | | | length | byte[0] | byte[1] | byte[2] | ... | byte[20] | |
| | Inf | — | 255 | 2 | 255 | 101 | | | | Inf |
| Positive | MAX Number +124 | +124 | 255 | 21 | 255 | 100 | 100 | ... | 100 | 99.999999999999999999999E+124 |
| | | | 255 | 2 | 255 | 11 | | | | 10E+124 |
| | | | 255 | 2 | 255 | 2 | | | | 10E+123 |
| | ... | ... | ... | ... | ... | ... | ... | ... | ... | ... |
| | | | 194 | 2 | 194 | 11 | | | | 10E+2 |
| | | | 194 | 2 | 194 | 2 | | | | 10E+1 |
| | | +0 | 193 | 2 | 193 | 11 | | | | 10E+0 |
| | ... | ... | ... | ... | ... | ... | ... | ... | ... | ... |
| | | 130 | 128 | 2 | 128 | 2 | | | | 1E-130 |
| Zero | | — | 128 | 1 | 128 | | | | | 0 |
| | | 130 | 127 | 3 | 127 | 91 | 102 | | | -10E-130 |
| | | | 126 | 3 | 126 | 100 | 102 | | | -10E-129 |
| | | | 126 | 3 | 126 | 91 | 102 | | | -10E-128 |
| | ... | ... | ... | ... | ... | ... | ... | ... | ... | ... |
| Negative | | | 1 | 3 | 1 | 91 | 102 | | | -10E+122 |
| | | | 0 | 3 | 0 | 100 | 102 | | | -10E+123 |
| | | | 0 | 3 | 0 | 91 | 102 | | | -10E+124 |
| | MIN Number +124 | +124 | 0 | 21 | 0 | 2 | 2 | ... | 2 | -99.999999999999999999999e+124 |
| | -Inf | — | 0 | 1 | 0 | | | | | -Inf |

| INPUT | OUTPUT |
|---|---|
| x x x x x x x x x x x x x x | 0 0 0 0 |
| 0 x x x x x x x x x x x x x | 0 0 0 1 |
| 0 0 x x x x x x x x x x x x | 0 0 1 0 |
| 0 0 0 x x x x x x x x x x x | 0 0 1 1 |
| 0 0 0 0 x x x x x x x x x x | 0 1 0 0 |
| 0 0 0 0 0 x x x x x x x x x | 0 1 0 1 |
| 0 0 0 0 0 0 x x x x x x x x | 0 1 1 0 |
| 0 0 0 0 0 0 0 x x x x x x x | 0 1 1 1 |
| 0 0 0 0 0 0 0 0 x x x x x x | 1 0 0 0 |
| 0 0 0 0 0 0 0 0 0 x x x x x | 1 0 0 1 |
| 0 0 0 0 0 0 0 0 0 0 x x x x | 1 0 1 0 |
| 0 0 0 0 0 0 0 0 0 0 0 x x x | 1 0 1 1 |
| 0 0 0 0 0 0 0 0 0 0 0 0 x x | 1 1 0 0 |
| 0 0 0 0 0 0 0 0 0 0 0 0 0 x | 1 1 0 1 |
| 0 0 0 0 0 0 0 0 0 0 0 0 0 0 | 1 1 1 0 |

(1) SHIFT

Ex:2  Lx:3
Ey:0  Ly:1

| 0 0 0 1 2 3 4 5 0 0 0 0 1 2 3 | ⟵ 191 |
| 0 1 2 3 4 5 6 7 0 1 2 3 4 5 | ⟵ 192 |

LEFT-SHIFT AMOUNT Ex-Ey=2
RIGHT-SHIFT AMOUNT=0

(2) ADD

Ex:0
Ey:0

| 0 1 2 3 4 5 0 0 0 0 1 2 3 0 0 | ⟵ 193 |
| 0 1 2 3 4 5 6 7 0 1 2 3 4 5 | ⟵ 192 |

(3) NORMALIZE

Ez:0

| 0 2 4 6 9 0 6 7 0 2 4 6 4 5 | ⟵ 194 |

(4) RESULT OF ARITHMETIC

Ez:0

| 0 2 4 6 9 0 6 7 0 2 4 6 4 5 | ⟵ 194 |

0009998700009999×10^5 + 0199903601999990×10^0 = 0100006991359992×10^4 ~200

(1) SHIFT

Ex:5  Lx:3       LEFT-SHIFT AMOUNT=Lx=3
Ey:0  Ly:1       RIGHT-SHIFT AMOUNT=(Ex−Ey)−Lx=2

0 0 0 9 9 9 8 7 0 0 0 9 9 9 9   ~201
        0 1 9 9 9 0 3 6 0 1 9 9 9 0   ~202

(2) ADD

Ex:2
Ey:2

9 9 9 8 7 0 0 0 9 9 9 0 0 0   ~203
0 0 0 1 9 9 9 0 3 6 0 1 9 9 9 0   ~204

(3) NORMALIZE

Ez:2

1 0 0 0 0 6 9 9 1 3 5 9 1 9 9 9 0   ~205

(4) ROUND

Ez:4

0 1 0 0 0 0 6 9 9 1 3 5 9 9 9 0   ~206

(5) RESULT OF ARITHMETIC

(1) SHIFT

Ex:2  Lx:3    [0 0 0 1 2 3 4 5 0 0 0 1 2 3]  ← 241  LEFT-SHIFT AMOUNT=Ex-Ey=2
Ey:0          [0 1 2 3 4 5 6 7 5 0 0 0 1 2]  ← 242  RIGHT-SHIFT AMOUNT=0

(2) ADD

Ex:0    [0 1 2 3 4 5 0 0 0 1 2 3 0 0]  ← 243
Ey:0  + [0 1 2 3 4 5 6 7 5 0 0 0 1 2]  ← 244

(3) NORMALIZE

Ez:0    [0 2 4 6 9 0 6 7 5 1 2 3 1 2 0 0 0 0 0 0 0 0 0 0 0 0 0 0]  ← 245

(4) SELECT UPPER-ORDER DIGITS

Ez:0    [0 2 4 6 9 0 6 7 5 1 2 3 1 2 0 0 0 0 0 0 0 0 0 0 0 0 0 0]  ← 246

(5) RESULT OF ARITHMETIC

LEFT-SHIFT AMOUNT=Lx=3
RIGHT-SHIFT AMOUNT=(Ex−Ey)−Lx=2

(1) SHIFT
Ex:5  Lx:3    000999870000999    ~251
Ey:0          019990360100 90    ~252

(2) ADD
Ex:2          999870000999000    ~253
Ey:2          000199903601 0090  ~254

(3) NORMALIZE
Ez:2          1000069913591009000000000000000  ~255

(4) SELECT UPPER-ORDER DIGITS
Ez:4          0100006991 3591    ~256

(5) RESULT OF ARITHMETIC
Ez:4          0100006991 3591    ~257

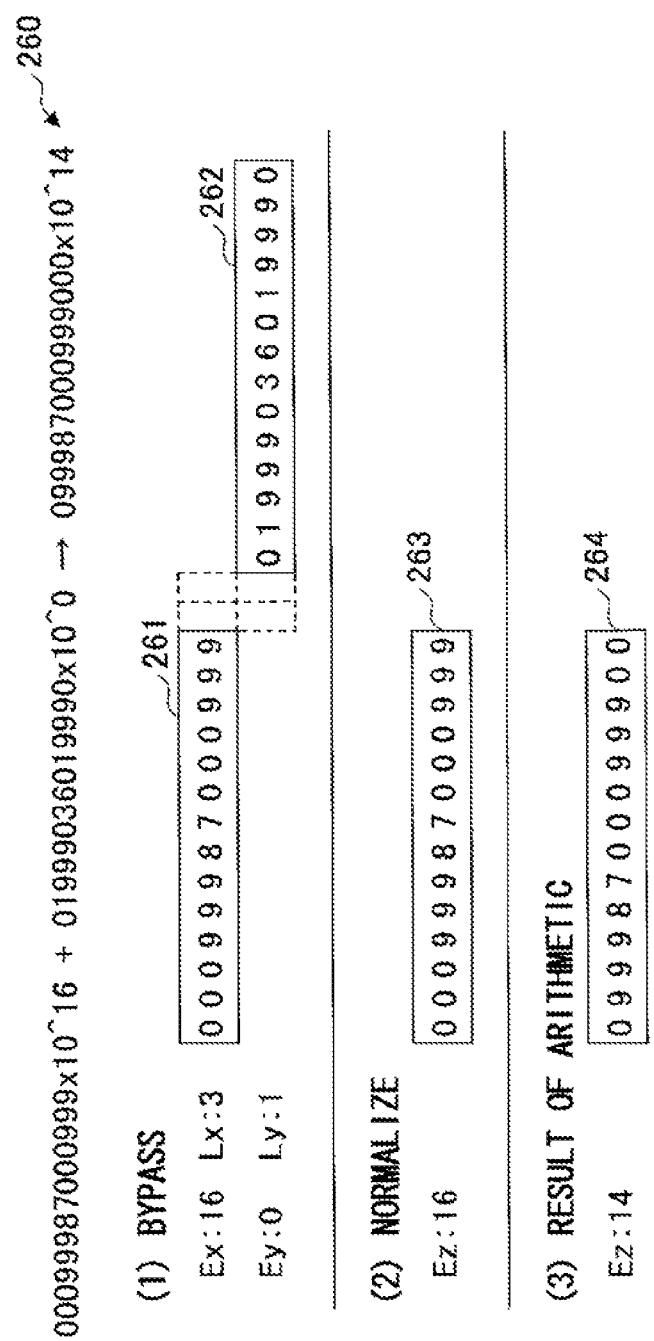

0001234500123×10^2 + 0123456700012×10^0 → 00000000000012×10^-14 ~280

(1) SHIFT

Ex:2 Lx:3  |0 0 0 1 2 3 4 5 0 0 0 1 2 3|  LEFT-SHIFT AMOUNT=Ex-Ey=2
Ey:0       |0 1 2 3 4 5 6 7 5 0 0 0 1 2|  RIGHT-SHIFT AMOUNT=0
                                    ~281
                                    ~282

(2) ADD

Ex:0       |0 1 2 3 4 5 0 0 0 1 2 3 0 0| ~283
       +   |0 1 2 3 4 5 6 7 5 0 0 0 1 2| ~284
Ey:0

(3) NORMALIZE-1                                            ~285

Ez:0       |0 2 4 6 9 0 6 7 5 1 2 3 1 2|0 0 0 0 0 0 0 0 0 0 0 0 0 0

(4) SELECT LOWER-ORDER DIGITS    14 IS SUBTRACTED FROM EXPONENT DUE
                                 TO SELECTION OF LOWER-ORDER DIGITS ~286
Ez:0        0 2 4 6 9 0 6 7 5 1 2 3 1 2|0 0 0 0 0 0 0 0 0 0 0 0 0 0|~287

(5) NORMALIZE-2

Ez:-14      0 2 4 6 9 0 6 7 5 1 2 3 1 2    |0 0 0 0 0 0 0 0 0 0 0 0 0 0| ~288

(6) RESULT OF ARITHMETIC

$0009987000999 \times 10^5 + 0199903601090 \times 10^0 \to 9000000000000 \times 10^{-12}$ ~290

(1) SHIFT

Ex:5  Lx:3  |0009987000999|  ~291  LEFT-SHIFT AMOUNT=Lx=3
Ey:0         |0199903601090|  ~292  RIGHT-SHIFT AMOUNT=(Ex-Ey)-Lx=2

(2) ADD

Ex:2  9998700099900  ~293
Ey:2  0001999036010090  ~294

(3) NORMALIZE-1

Ey:2  |10000699135910|0900000000000  ~295

(4) SELECT LOWER-ORDER DIGITS     14 IS SUBTRACTED FROM EXPONENT DUE TO SELECTION OF LOWER-ORDER DIGITS

Ey:4  01000069913591|00900000000000|  ~296

(5) NORMALIZE-2

Ez:-10  01000069913591|00900000000000|  ~297

(6) RESULT OF ARITHMETIC

(1) BYPASS

Ex:16  Lx:3    0009998700099
Ey:0   Ly:1                  0199903601999   ~302
                                              ~301

(2) NORMALIZE-2

Ez:0    0199903601999   ~303

(3) RESULT OF ARITHMETIC

```
Accumulate(u, v, x)
   (s, v) = Two_Sum(v, x)
   (s, u) = Two_Sum(u, s)
   if (u == 0){
      u = s
      s = 0
   }
   if (v == 0){
      v = u
      u = s
      s = 0
   }
   return (s, u, v)

Triple_Add(a0, a1, a2, b0, b1, b2)
   (x[0], x[1], ..., x[5]) = merge_sort(a0, a1, a2, b0, b1, b2)
   u = 0
   v = 0
   k = 0
   i = 0
   while ((k < 4) && (i < 6)){
      (s, u, v) = Accumerate(u, v, x[i])
      if (s != 0){
         c[k++] = s
      }
      i++
   }
   if (k < 3){ c[k+1] = v }
   if (k < 4){ c[k] = u }
   return renormalize(c[0], c[1], c[2], c[3])
```

FIG.37 t0 = 1200 0000 0000 0000
t1 = −30 0000 0000 0000
t2 = 4 5600 0000 0000
t3 = −7

ACCUMULATE t0, t1, t2 UNTIL zz0≠0 a0 = 1174 0000 0000 0000
z0 = 1174 0000 0000 0000
w0 = 0000 0000 0000 0000
zz0 = 5600 0000 0000

ACCUMULATE w0, zz0, t3 UNTIL zz1≠0 a1 = 5599 0000 0000
z1 = 5600 0000 0000
w1 = 1 0000 0000
zz1 = −7

ACCUMULATE w1, zz1 UNTIL zz2≠0 a2 = 9999 0000
z2 = 1 0000 0000
w2 = 1 0000
zz2 = −7

ACCUMULATE w2, zz2 a3 = 9993
z3 = 9993
w3 = 0
zz3 = 0

FIG.38

$a0 = 1.230 \times 10^{(15)}$      |1230| 0000 0000 0000

$a1 = 4.050 \times 10^{(8)}$      |4 050|0 0000

$a2 = 6.000 \times 10^{(4)}$      |6 000|0

$b0 = a0$      |1230| 0000 0000 0000
    $= 1.230 \times 10^{(15)}$ $b1 = \text{scale\_next}(a1, b0)$      |0004| 0000 0000
    $= 0.004 \times 10^{(11)}$ $tmp = a1-b1+a2$      506 0000

$b2 = \text{scale\_next}(tmp, b1)$      |0506| 0000
    $= 0.506 \times 10^{(7)}$

FIG.41

| FORMAT | DESCRIPTION |
|---|---|
| NUMBER | NO PRECISION IS SPECIFIED |
| NUMBER(precision) | PRECISION IS SPECIFIED BY THE NUMBER OF DIGITS. PRECISION RANGES FROM 1 TO 38. |
| NUMBER(precision, scale) | ROUNDING POSITION IS SPECIFIED BY THE NUMBER OF DIGITS AND A SCALE INDICATION. THE SCALE INDICATION (scale) SPECIFIES HOW MANY DECIMAL PLACES ARE USED IN REPRESENTATION, AND RANGES FROM −84 TO 127. |

FIG.42A

```
get_commma5(a0, digits=none)
    e = e(a0)
    r = 50 * 100^(e - 20)
    return r
```

FIG.42B

```
get_comma5(a0, digits=d)
    e' = e'(a0)
    r = 5 * 10^(e - d)
    return r
```

FIG.42C

```
get_comma5(scale=n)
    r = 5 * 10^-(n+1)
    return r
```

CARRY-OUT

380

ERROR FLAG

| MAGNITUDE RELATIONSHIP | CO | ERROR FLAG |
|---|---|---|
| $|p\_s| > |p\_d|$ | 1 | 0 |
| $|p\_s| = |p\_d|$ | 1 | 0 |
| $|p\_s| < |p\_d|$ | 0 | 1 |

FIG.48

```
get_oracle_num_length(a0, a1, a2)
  if (a2 != 0){
    l = 14 + min(7, length(a2))
  } else if (a1 != 0){
    l = 7 + length(a1)
  } else {
    l = length(a0)
  }
  return l
```

MANTISSA

400
CONVERSION CIRCUIT

COUNT INDICATIVE OF NUMBER OF TRAILING ZEROS

| INPUT | OUTPUT |
|---|---|
| x x x x x x x x x x x x x | 0 0 0 0 |
| x x x x x x x x x x x x 0 | 0 0 0 1 |
| x x x x x x x x x x x 0 0 | 0 0 1 0 |
| x x x x x x x x x x 0 0 0 | 0 0 1 1 |
| x x x x x x x x x 0 0 0 0 | 0 1 0 0 |
| x x x x x x x x 0 0 0 0 0 | 0 1 0 1 |
| x x x x x x x 0 0 0 0 0 0 | 0 1 1 0 |
| x x x x x x 0 0 0 0 0 0 0 | 0 1 1 1 |
| x x x x x 0 0 0 0 0 0 0 0 | 1 0 0 0 |
| x x x x 0 0 0 0 0 0 0 0 0 | 1 0 0 1 |
| x x x 0 0 0 0 0 0 0 0 0 0 | 1 0 1 0 |
| x x 0 0 0 0 0 0 0 0 0 0 0 | 1 0 1 1 |
| x 0 0 0 0 0 0 0 0 0 0 0 0 | 1 1 0 0 |
| x 0 0 0 0 0 0 0 0 0 0 0 0 | 1 1 0 1 |
| 0 0 0 0 0 0 0 0 0 0 0 0 0 | 1 1 1 0 |

United States Patent US 8,903,881 B2

ARITHMETIC CIRCUIT, ARITHMETIC PROCESSING APPARATUS AND METHOD OF CONTROLLING ARITHMETIC CIRCUIT

CROSS-REFERENCE TO RELATED APPLICATIONS

The present application is based upon and claims the benefit of priority from the prior Japanese Patent Application No. 2011-085880 filed on Apr. 8, 2011, with the Japanese Patent Office, the entire contents of which are incorporated herein by reference.

FIELD

The disclosures herein relate to an arithmetic circuit, an arithmetic processing apparatus, and a method of controlling an arithmetic circuit.

BACKGROUND

An accounting system for processing accounts in banks and some type of scientific computation may require numerical error to be small. To this end, multiple-precision numerical representation or variable-precision numerical representation may be employed. In such a case, a single integer may express a sign and an exponent. Further, a digit string separate from the sign and the exponent expressed by the single integer may often be used to represent a mantissa. When such numerical representation is employed, integer calculation may often be utilized to implement arithmetic operation between numerical values.

In contrast, study has been underway on a method for implementing multiple-precision or variable-precision floating-point arithmetic by use of fixed-precision floating-point arithmetic. A hardware processing unit is often available for fixed-precision floating-point arithmetic. The use of such a hardware processing unit can improve processing speed compared to the case in which all processes are performed by software. For example, there is a library that performs multiple-precision binary floating-point arithmetic by use of double-precision floating-point arithmetic.

In such a method, a single number is represented by a set of fixed-precision floating-point numbers, which may be referred to as an "unvalued sum" because the set is used as it is, without adding up the individual numbers. Arithmetic operation between different sets may be performed to implement a high-precision arithmetic operation (i.e., four arithmetic operations).

A method of efficiently performing four arithmetic operations is already available as described above. In order to use such a method in a computing system (software) designed to perform arithmetic operation by use of integer calculation, there is an issue to be solved in respect of the conversion of data representation as well as the implementation of four arithmetic operations.

Numerical value representation in the computing system designed for integer calculation may not be changed for the sake of preserving system compatibility. In such a case, a number represented by an integer (i.e., a digit string) needs to be converted into a set of fixed-precision floating-point numbers. Further, after arithmetic operation is performed between different sets of fixed-precision floating-point numbers, the result of the operation may need to be converted back into the original digit-string representation for storage in memory. Such an inverse-conversion may be performed by utilizing quantizing operation as will be described later. It is desirable to efficiently perform this quantizing operation in order to efficiently convert a form of expression from a set of fixed-precision floating-point numbers into a multiple-precision or variable-precision floating-point number.

RELATED-ART DOCUMENTS

Non-Patent Document

[Non-Patent Document 1] T. Dekker, A Floating-Point Technique for Extending the Available Precision, Numer. Math. vol. 18, pp. 224-242, 1971.

[Non-Patent Document 2] D. Priest, Appendix A: Algorithms for Arbitrary Precision Floating Point Arithmetic, pp. 111-124, On Property of Floating Point Arithmetics Numerical Stability and the Cost of Accurate Computations, PhD thesis, University of California, Berkeley, November 1992.

[Non-Patent Document 3] Yozo Hida, Xiaoye S. Li, David H. Bailey, Library for Double-Double and Quad-Double Arithmetic, 29 Dec. 2007.

SUMMARY

According to an aspect of the embodiment, an arithmetic circuit for quantizing pre-quantized data includes a first input register to store first-format pre-quantized data that includes a mantissa of a floating-point number using a base-N numbering system (N: integer larger than or equal to 2), and includes an exponent for the mantissa, a second input register to store a quantization target exponent indicative of an exponent to be achieved for quantization of the pre-quantized data, an exponent-correction-value indicating unit to indicate an exponent correction value for the quantization target exponent, an exponent generating unit to generate a quantized exponent obtained by subtracting the exponent correction value from the quantization target exponent, a shift amount generating unit to generate a shift amount obtained by subtracting the exponent of the pre-quantized data and the exponent correction value from the quantization target exponent, a shift unit to generate a quantized mantissa obtained by shifting the mantissa of the pre-quantized data by the shift amount generated by the shift amount generating unit, and a first output register to store quantized data that includes the quantized exponent generated by the exponent generating unit and the quantized mantissa generated by the shift unit.

According to an aspect of the embodiment, an arithmetic processing apparatus includes an arithmetic circuit to perform quantization and an instruction control unit to decode a quantization arithmetic instruction for controlling the quantization by the arithmetic circuit, wherein the arithmetic circuit includes a first input register to store first-format pre-quantized data that includes a mantissa of a floating-point number using a base-N numbering system (N: integer larger than or equal to 2), and includes an exponent for the mantissa, a second input register to store a quantization target exponent indicative of an exponent to be achieved for quantization of the pre-quantized data, an exponent-correction-value indicating unit to indicate an exponent correction value for the quantization target exponent, an exponent generating unit to generate a quantized exponent obtained by subtracting the exponent correction value from the quantization target exponent based on a decode result obtained by the instruction control unit decoding the quantization arithmetic instruction, a shift amount generating unit to generate a shift amount obtained by subtracting the exponent of the pre-quantized data and the exponent correction value from the quantization target exponent, a shift unit to generate a quantized mantissa obtained by shifting the mantissa of the pre-quantized data by the shift amount generated by the shift amount generating unit based on the decode result obtained by the instruction control unit decoding the quantization arithmetic instruction, and a first output register to store quantized data that includes the quantized exponent generated by the exponent generating unit and the quantized mantissa generated by the shift unit.

According to an aspect of the embodiment, a method of controlling an arithmetic circuit for quantizing pre-quantized data is provided wherein the arithmetic circuit includes a first input register to store first-format pre-quantized data that includes a mantissa of a floating-point number using a base-N numbering system (N: integer larger than or equal to 2), and includes an exponent for the mantissa, a second input register to store a quantization target exponent indicative of an exponent to be achieved for quantization of the pre-quantized data, and an exponent-correction-value register to store an exponent correction value for the quantization target exponent. The method includes generating, by use of an exponent generating unit of the arithmetic circuit, a quantized exponent obtained by subtracting the exponent correction value from the quantization target exponent, generating, by use of a shift amount generating unit of the arithmetic circuit, a shift amount obtained by subtracting the exponent of the pre-quantized data and the exponent correction value from the quantization target exponent, and generating, by use of a shift unit of the arithmetic circuit, a quantized mantissa obtained by shifting the mantissa of the pre-quantized data by the shift amount generated by the shift amount generating unit.

According to at least one embodiment of the disclosures herein, a quantizing operation is efficiently performed in order to efficiently convert a form of expression from a set of fixed-precision floating-point numbers into a multiple-precision or variable-precision floating-point number.

The object and advantages of the embodiment will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 3 is a drawing illustrating each byte of two fixed-precision floating-point numbers;

FIG. 4 is a drawing illustrating each byte of a multiple-precision floating-point number that is expressed by a sum of the two fixed-precision floating-point numbers;

FIG. 6 is a drawing illustrating an example of a quantize arithmetic operation;

FIG. 7 is a drawing illustrating an example of a quantize arithmetic operation;

FIG. 8 is a drawing illustrating an example in which trailing zeros are replaced with proper codes;

FIG. 10 is a drawing illustrating a table of specific examples of Oracle-numbers;

FIG. 20 is a drawing illustrating a specific example of the addition of fixed-precision floating-point numbers;

FIG. 21 is a drawing illustrating another specific example of the addition of fixed-precision floating-point numbers;

FIG. 25 is a drawing illustrating a specific example of the get_z arithmetic operation;

FIG. 26 is a drawing illustrating another specific example of the get_z arithmetic operation;

FIG. 27 is a drawing illustrating yet another specific example of the get_z arithmetic operation;

FIG. 30 is a drawing illustrating a specific example of the get_zz arithmetic operation;

FIG. 31 is a drawing illustrating another specific example of the get_zz arithmetic operation;

FIG. 32 is a drawing illustrating yet another specific example of the get_zz arithmetic operation;

FIG. 35 is a drawing illustrating an algorithm for obtaining the sum of two sets of triple-oraclenum64 numbers;

FIG. 37 is a drawing illustrating an example of sign-matched Priest's renormalization;

FIG. 38 is a drawing illustrating an example of calculation that produces a set of strongly-normalized numbers from the number set normalized by sign-matched Priest's renormalization;

FIG. 41 is a drawing illustrating a table demonstrating three types of methods for specifying NUMBER-type precision in the Oracle-Database;

FIGS. 42A through 42C are drawings illustrating examples of algorithms that generate a number having "5" only at the digit position at which rounding occurs;

FIG. 48 is a drawing illustrating an example of the arithmetic operation for obtaining the length of an Oracle-number;

DESCRIPTION OF EMBODIMENTS

In the following, a detailed description will be first given of the conversion of numerical representation between a set of fixed-precision floating-point numbers and a multiple-precision or variable-precision floating-point number.

Figure 1:
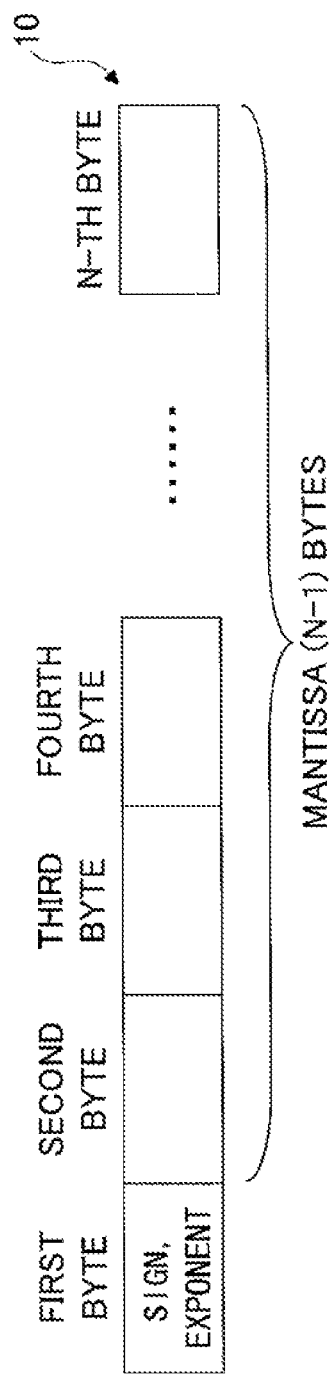
FIG. 1 is a drawing illustrating an example of numerical representation for a multiple-precision floating-point number.

FIG. 1 is a drawing illustrating an example of numerical representation for a multiple-precision floating-point number. A multiple-precision floating-point number 10 illustrated in FIG. 1 includes a first byte that is a single integer including a sign and an exponent, and also includes second through N-th bytes that constitute a digit string representing a mantissa. When the expression form is such that the number of bytes for the mantissa can vary and be any number, this expression form provides a multiple-precision and variable-precision floating-point number. Specific examples of a multiple-precision and variable-precision floating-point number include the BCD (Binary Coded Decimal) format and the Oracle-Database (registered trademark) format. In the following, a description will be given of a situation in which it is desirable to perform a hardware-based arithmetic without modifying a predetermined existing expression form.

In order to implement multiple-precision floating-point arithmetic by use of fixed-precision floating-point arithmetic, a multiple-precision floating-point number may be divided into plural parts, which are represented by a set of fixed-precision floating-point numbers. To this end, the mantissa of a multiple-precision floating-point number of interest is divided into plural parts each having the same number of digits as the number of digits of the mantissa of the fixed-precision floating-point number. These plural parts are then each represented as a single fixed-precision floating-point number.

Figure 2:
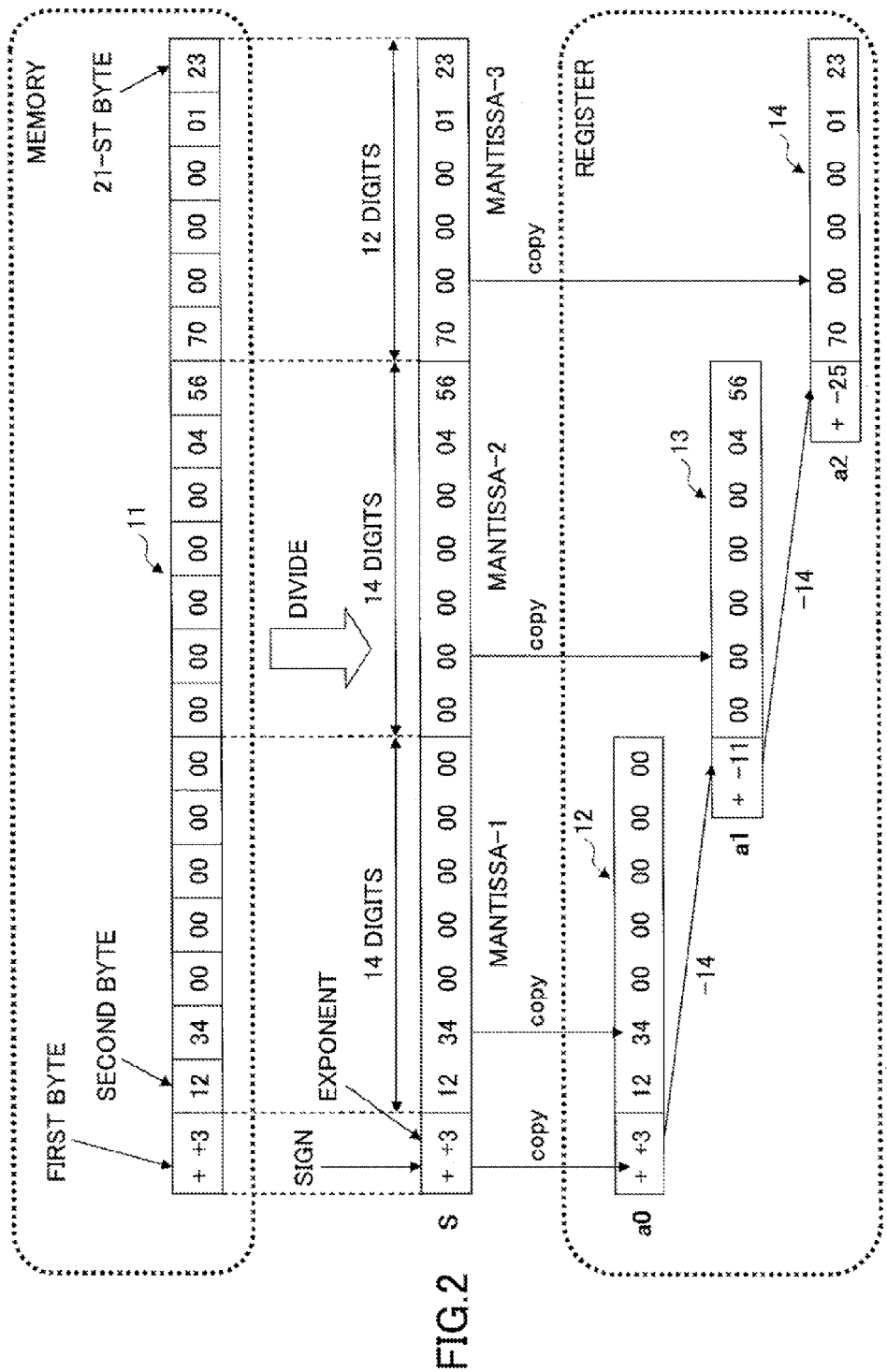
FIG. 2 is a drawing illustrating an example of division of a multiple-precision floating-point number into plural fixed-precision floating-point numbers.

FIG. 2 is a drawing illustrating an example of division of a multiple-precision floating-point number into plural fixed-precision floating-point numbers. In this example, a multiple-precision floating-point number 11 including a first byte serving as a sign and an exponent and second through twenty-first bytes serving as a mantissa is divided into three fixed-precision floating-point numbers. Each byte of the mantissa may represent a two-digit decimal number expressed in the BCD.

The seven bytes (i.e., 14 digits) of the second through eighth bytes of the mantissa are attached to the first byte serving as the sign and the exponent of the original expression, thereby producing a first fixed-precision floating-point number 12. The seven bytes (i.e., 14 digits) of the ninth through fifteenth bytes of the mantissa are attached to a byte that represents the original sign and an exponent obtained by subtracting 14 from the original exponent, thereby producing a second fixed-precision floating-point number 13. For the second fixed-precision floating-point number 13, the exponent is equal to the exponent of the first fixed-precision floating-point number 12 minus 14. This is because the digit position of this exponent is displaced by 14 digits. The six bytes (i.e., 12 digits) of the sixteenth through twenty-first bytes of the mantissa are attached to a byte that represents the original sign and an exponent obtained by subtracting 28 from the original exponent, thereby producing a third fixed-precision floating-point number 14. For the third fixed-precision floating-point number 14, digits "00" may be added to the end of the mantissa to make it a 7-byte mantissa.

In this manner, the multiple-precision floating-point number 11 is divided into the three fixed-precision floating-point numbers 12 through 14. In this case, a value S of the multiple-precision floating-point number 11 can be expressed as follows by using respective values a0, a1, and a2 of the fixed-precision floating-point numbers 12 through 14.

$S=a0+a1+a2$

Using an exponent E of the value S of the original number, respective exponents E0, E1, and E2 of the values a0, a1, and a2 are expressed as follows.

$E0=E$ $E1=E-t$ $E2=E-2t$

Arithmetic operation with respect to numbers each represented by a set of fixed-precision floating-point numbers may be implemented by use of methods disclosed in Non-Patent Documents 1 through 3, for example. A set of fixed-precision floating-point numbers indicative of a result of such an arithmetic operation is then stored in memory by use of the original expression form for a multiple-precision floating-point number. Such a task may encounter problems as will be described below.

A set of fixed-precision floating-point numbers calculated by use of the methods disclosed in Non-Patent Documents 2 and 3 is renormalized after the arithmetic operation. The numbers of a renormalized set are arranged in the descending order of their absolute values, and do not overlap each other. If overlapping existed, the digits of each of the mantissas would be different from finalized digits that appear in the mantissa upon conversion into the original multiple-precision expression. Since renormalization removes any overlapping, a number in the original multiple-precision expression can be obtained by properly catenating the mantissas of the respective numbers. However, all that is known about the respective numbers of a renormalized set is the relative magnitude relationship between these numbers and the fact that these numbers do not overlap. It is necessary to check the exponents of these numbers in order to properly catenate the numbers such that the mantissas of the respective numbers are placed side by side without a gap therebetween.

This problem will be described below by using a specific example. It may be noted that in the multiple-precision expression used in this example, the first byte represents a sign and an exponent, and the second and subsequent bytes each represent a two-digit decimal number. Two fixed-precision floating-point numbers used in this example are $a0=1234$ and $a1=4.567e-24$. These two numbers satisfy the conditions required for a renormalized set. Namely, a renormalized result of an arithmetic operation could be such numbers.

FIG. 3 is a drawing illustrating each byte of the two fixed-precision floating-point numbers. As illustrated in FIG. 3, a0 has the three bytes as illustrated as a fixed-precision floating-point number 15, and a1 has the three bytes as illustrated as a fixed-precision floating-point number 16.

FIG. 4 is a drawing illustrating each byte of a multiple-precision floating-point number that is expressed by a sum of the two fixed-precision floating-point numbers. A multiple-precision floating-point number S that is expressed as the sum of the fixed-precision floating-point numbers a0 and a1 illustrated in FIG. 3 has the seventeen bytes as illustrated as a multiple-precision floating-point number 17 illustrated in FIG. 4. Conversion from the representation for a0 and a1 illustrated in FIG. 3 into the representation for S (multiple-precision floating-point number 17) illustrated in FIG. 4 gives rise to problems as follows.

Figure 5:
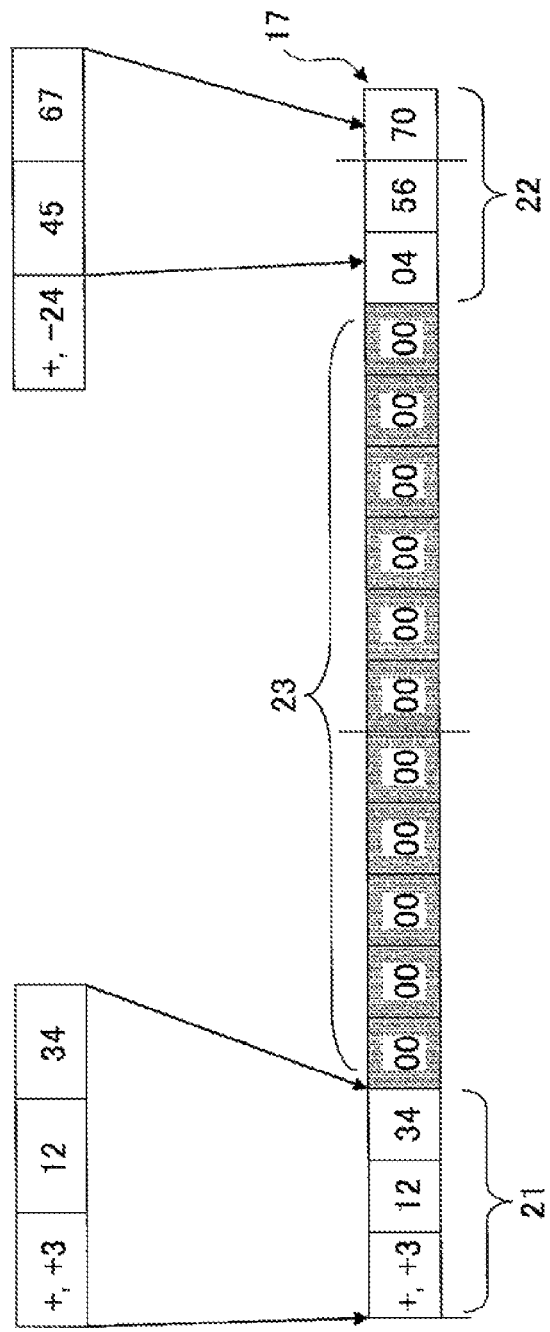
FIG. 5 is a drawing for explaining problems that occur when obtaining a multiple-precision floating-point number from a set of fixed-precision floating-point numbers.

FIG. 5 is a drawing for explaining problems that occur when obtaining a multiple-precision floating-point number from a set of fixed-precision floating-point numbers. In FIG. 5, three bytes 21 corresponding to the sign, exponent, and mantissa of a0 are placed at the beginning (i.e., most-significant-bit part) of the multiple-precision floating-point number 17. In the multiple-precision floating-point number 17, further, the position of bytes 22 corresponding to the mantissa of a1 is derived from the exponents of a0 and a1. The exponent of a0 is 3, and the exponent of a1 is −24, so that the first digit "4" of the mantissa of a1 is placed at the 28-th (i.e., $3-(-24)+1=28$) digit position of the mantissa of the multiple-precision floating-point number 17. In this manner, the memory address at which a1 is stored is calculated by referring to both of the exponents of a0 and a1.

Further, the positions of digits relative to the byte boundaries are different between the expression of the mantissa of the floating-point number a1 illustrated in FIG. 3 and the expression of the corresponding bytes 22 illustrated in FIG. 5. Such a difference may need to be taken into consideration. Moreover, care is taken such that a gap between the bytes 21 corresponding to a0 and the bytes 22 corresponding to a1 is filled with a byte string 23 having "0"-value digits.

In order to obviate these problems, the arithmetic method disclosed herein imposes stronger conditions than the conditions required for renormalization described in Non-Patent Documents 2 and 3. Further, dedicated hardware and instructions are added for the purpose of calculating such strong renormalization.

With the precision of the fixed-precision floating-point number being t digits, a strongly renormalized set (b0, b1, ...) satisfies the following conditions:
1) signs of all the elements are the same; and
2) $Ei=E(i+1)+t$ Here, Ei is the value of the exponent of an element bi. With these conditions, the elements (i.e., fixed-precision floating-point numbers) of a given set are allocated to respective digits of the mantissa of the original multiple-precision expression from the upper-order digit without leaving a gap. Namely, these elements has the same form as divided a0, a1, and a2 illustrated in FIG. 2. In this manner, a strongly renormalized set can be easily converted into the original multiple-precision expression.

In order to satisfy the conditions for strong renormalization, the second and subsequent elements may need to be properly quantized at the time of renormalization. The quantize operation specified by the IEEE 754-2008 standard may be utilized to perform the above-noted quantizing operation.

Upon receiving inputs X and Y, the quantize operation makes the exponent of X equal to the exponent of Y without changing the numerical value of X. Namely, the exponent of X is made equal to the exponent of Y, and the mantissa of X is shifted to the right or to the left by the same number of digits as the difference between the exponent of X and the exponent of Y. This converts only the expression of X without changing the numerical value of X to produce an output z. When shiftout occurs as a result of shift to the right, a rounding operation is performed according to a preset rounding mode. When shiftout occurs as a result of shift to the left, an exception indicative of "invalid operation" is thrown.

FIG. 6 and FIG. 7 are drawings illustrating examples of the quantize operation. FIG. 6 illustrates a case in which an exponent EX of an input X is larger than an exponent EY of an input Y (e.g., $EX=2$ and $EY=0$). The input X having the exponent $EX=2$ has a mantissa 31. An exponent Ez of an output z of the quantize operation is equal to 0 that is the value of Ey, and a mantissa 32 of the output z is equal to what is obtained by shifting the mantissa 31 of the input X to the left by 2 bits. FIG. 7 illustrates a case in which an exponent EX of an input X is smaller than an exponent EY of an input Y (specifically, $EX=-1$ and $EY=0$). The input X having the exponent $EX=-1$ has a mantissa 33. An exponent Ez of an output z of the quantize operation is equal to 0 that is the value of Ey, and a mantissa 34 of the output z is equal to what is obtained by shifting the mantissa 33 of the input X to the right by 1 bit. In the example illustrated in FIG. 7, the specified rounding operation is rounding to the nearest with 5 being rounded up and 4 being rounded down. In response to the shiftout of "5" as a result of shift to the right, the least significant digit is increased by +1 after the shift operation.

The quantize operation as described above is used to implement quantizing for strong renormalization as follows. β is a radix of the floating-point number. In the following, a rounding-down operation is used for rounding. A set (a0, a1) is a renormalized set in the meaning of Non-Patent Documents 2 and 3. A set (b0, b1, b2) is a strongly renormalized set.

$b0 = a0$ $Y1 = a0 * \beta^{(-t)}$ $b1 = \text{quantize}(a1, Y1)$ $tmp = a1 - b1$ $Y2 = Y1 * \beta^{(-t)}$ $b2 = \text{quantize}(tmp, Y2)$ In the calculations shown above, a0 is displaced by t digits to produce a number Y1. The representation of a1 is changed such that its exponent becomes equal to the exponent of Y1, thereby producing a number b1. A difference tmp between a1 and b1 corresponds to the remainder of a1 that is not expressed by b1 due to rounding down. Y1 is displaced by t digits to produce a number Y2. The representation of the remainder tmp of a1 is changed such that its exponent becomes equal to the exponent of Y2, thereby producing a number b2.

In the method described above, however, quantizing one element involves two steps, i.e., the quantizing operation and the multiplication (i.e., multiplication of $\beta^{\wedge}(t)$) to obtain the second argument of the quantize operation. Information about exponent used for quantization is inherently included in the preceding element. Utilizing this fact, a dedicated instruction for quantization may be designed to perform quantization in one instruction step, thereby reducing the number of arithmetic operations. Namely, the following calculations can implement quantization for strong normalization.

$$b0 = a0$$

$$b1 = \text{scale\_next}(a1, b0)$$

$$tmp = a1 - b1$$

$$b2 = \text{scale\_next}(tmp, b1)$$

Here, an arithmetic instruction scale_next(X,Y) performs the same process as quantize(X, Y*$\beta^{\wedge}(-t)$) in one instruction step. An example of a circuit to perform this arithmetic will be described in the embodiments that follow. This circuit can perform the same process faster than the two processes, i.e., the multiplication for obtaining $\beta^{\wedge}(-t)$ and the quantize operation being performed consecutively. In the calculations shown above, each element quantized for strong normalization is referred to in order to quantize the next element. Accordingly, it is desirable that the sign and the exponent reflect the result of quantization even when the result of quantization becomes 0.

With strong normalization, a set of fixed-precision floating-point numbers can easily be returned to the original multiple-precision expression. The task of writing each element in memory may be associated with other problems as will be described below.

In the fixed-precision floating-point expression, a bit expression for identifying leading zeros that are zero digits preceding a significant number may be different from a bit expression for identifying tailing zeros that are zero digits following a significant number. In such a case, a problem occurs. In numerical expressions used in Oracle-database, "0" appearing in the middle of a mantissa is represented by 0x01 or 0x65 in memory (which one of these is used depends on the sign of the number). Trailing zeros are not allowed, so that nothing is written in the remaining portion when the mantissa is short. There may be a need to take care of this gap. To this end, it may be convenient if there is an instruction for intentionally generating trailing zeros.

Figure 9:
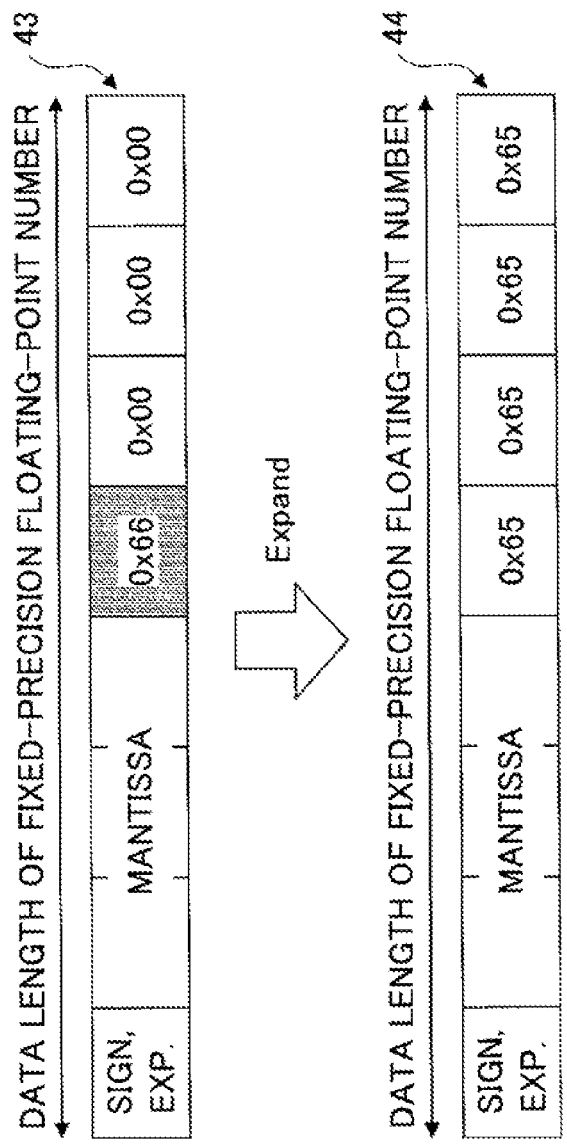
FIG. 9 is a drawing illustrating an example in which trailing zeros are replaced with proper codes.

FIG. 8 and FIG. 9 are drawings illustrating examples in which trailing zeros are replaced with proper codes. In the example illustrated in FIG. 8, trailing zeros are each replaced with 0x01. In the example illustrated in FIG. 9, a terminator 0x66 indicative of the tail end of a significant number and zeros following the terminator are each replaced with 0x65.

In the following, embodiments of the invention will be described with reference to the accompanying drawings. In each of the drawings, the same or corresponding elements are referred to by the same or corresponding symbols or numbers, and a description thereof will be omitted as appropriate.

The embodiments described below provide hardware for high-speed calculation of Oracle-numbers (registered trademark), which are the numerical number type used in the Oracle database. A description will be first given of the Oracle-number representation. What is described herein can be checked by using the SQL interpreter (i.e., Structured Query Language interpreter) of the Oracle database.

An Oracle-number is represented in a variable-precision data format including up to a maximum of 21 bytes. The first byte stores a sign and an exponent, and the following bytes store a mantissa. The mantissa extends up to a maximum of 20 bytes.

The Oracle-number format is a data format for representing a floating-point decimal number. Mainly because of the efficiency of memory utilization, the mantissa has two digits of a decimal number in each byte. Matching this notation, the exponent stores an exponent number in respect of a radix of 100. A number represented by the Oracle-number format can be expressed as follows.

$$\text{number} = \pm (M00.M01M02\ldots)*100^{\wedge}(\exp)$$

Here, M00, M01, M02, and so on represent the data of respective bytes, i.e., the first byte, the second byte, the third byte, and so on, of the mantissa extending up to a maximum of 20 bytes. Since the mantissa is sectioned in units of two digits of a decimal number, the mantissa can be regarded as having 20 digits of a centesimal number. An Oracle-number is normalized without exception when viewed as a centesimal number. Under no circumstances, does the M00 part (i.e., the first byte of the mantissa) become zero.

The first byte of the Oracle-number format (i.e., the first byte of the entire number) contains a sign and an exponent, which are encoded as follows.

In the case of number>0: First Byte=exp+193
In the case of number==0: First Byte=128
Otherwise: First Byte=62−exp The mantissa in the second byte and onwards contain M00, M01, and so on in the respective bytes thereof. In each byte, different encoding methods are used as illustrated below, depending on the sign of the expressed numerical number.

In the case of number>0: Mantissa's n-th Byte=M(n−1)+1
In the case of number==0: No Mantissa
Otherwise: Mantissa's n-th Byte=101−M(n−1)

With these encoding methods, 0x00 never appears in any byte of the mantissa since Mn ranges from 0 to 99. When the number to be expressed can be expressed by a short mantissa, this Oracle-number becomes shorter than 21 bytes. Namely, trailing zeros are not permitted in the mantissa of an Oracle-number. In the case of a negative number, a terminator of 102 (0x66) is stored in the last byte in order to indicate the tail end of the mantissa when the mantissa is shorter than 20 bytes.

The use of the encoding scheme described above in the Oracle-number format ensures that the magnitude relationship as viewed as byte strings, i.e., the magnitude relationship based on comparison utilizing the C-language standard function memcmp, be the same as the magnitude relationship between values expressed in the Oracle-number format.

FIG. 10 is a drawing illustrating a table of specific examples of Oracle-numbers. In the expression of 10E+0(=10×100°), for example, the exponent is 193 (=0+193), and the mantissa is 11 (=10+1). In the expression of 10E+1(=10×100$^1$), for example, the exponent is 194 (=1+193), and the mantissa is 2 (=1+1). In the expression of a negative number of −10E−130(=−10×100$^{-65}$), for example, the exponent is 127 (=62−(−65)), and the mantissa is (=101−10). In the expression of a negative number of −10E−129(=−10×100$^{-64}$), for example, the exponent is 126 (=62−(−64)), and the mantissa is 100 (=101−1). For the negative numbers, the terminator "102" is attached as the last byte. Further, the positive infinite number Inf and the negative infinite number −Inf are assigned to special byte strings as illustrated in the table.

Figure 11:
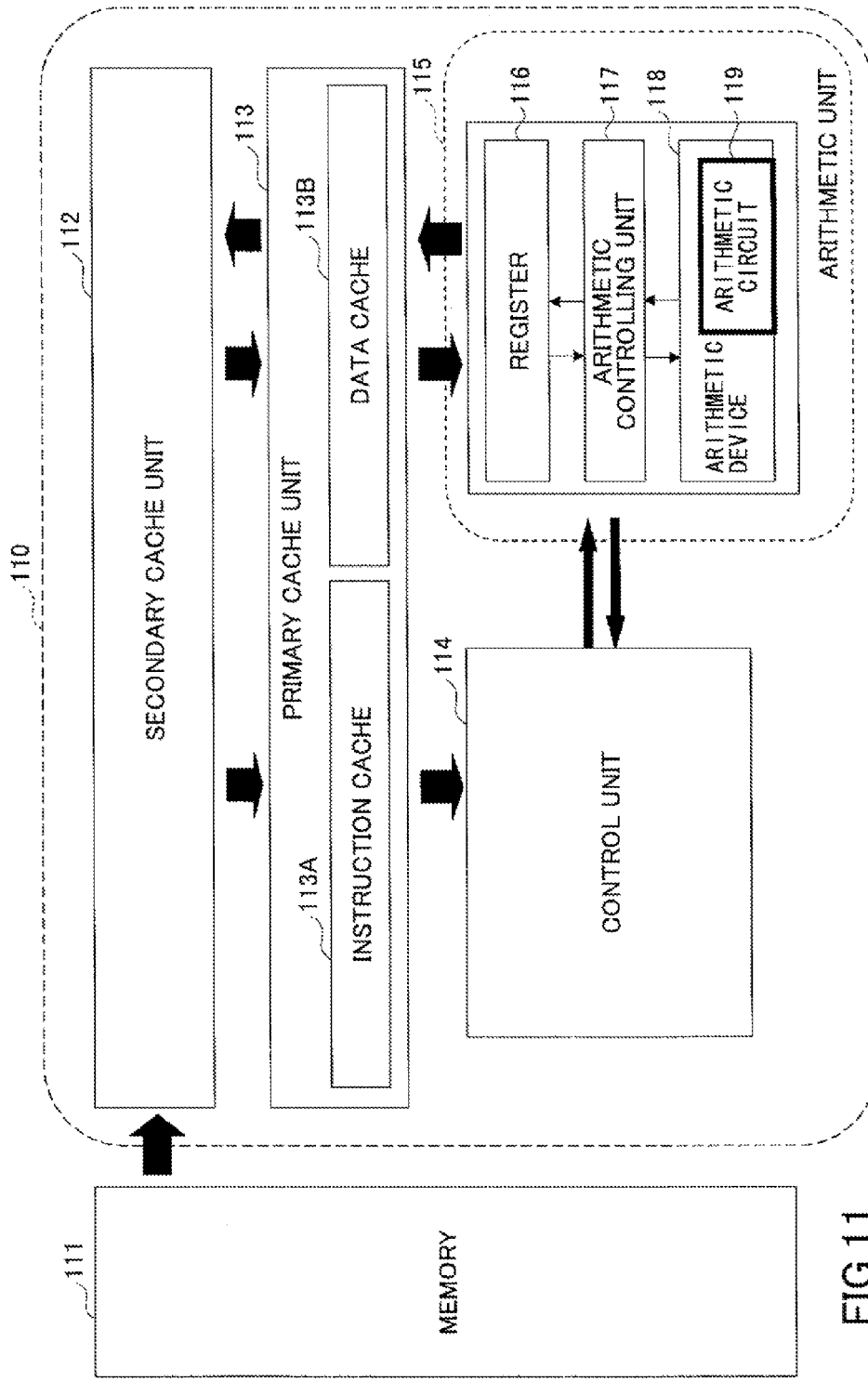
FIG. 11 is a drawing illustrating an example of the configuration of a computer system.

FIG. 11 is a drawing illustrating an example of the configuration of a computer system. The computer system illustrated in FIG. 11 includes a processor 110 and a memory 111. The processor 110 serving as an arithmetic processing apparatus includes a secondary cache unit 112, a primary cache unit 113, a control unit 114, and an arithmetic unit 115. The primary cache unit 113 includes an instruction cache 113A and a data cache 113B. The arithmetic unit 115 includes a register 116, an arithmetic controlling unit 117, and an arithmetic device 118. The arithmetic device 118 includes an arithmetic circuit 119. In FIG. 2 and the subsequent drawings, boundaries between functional blocks illustrated as boxes basically indicate functional boundaries, and may not correspond to separation in terms of physical positions, separation in terms of electrical signals, separation in terms of control logic, etc. Each functional block may be a hardware module that is physically separated from other blocks to some extent, or may indicate a function in a hardware module in which this and other blocks are physically combined together. Each functional block may be a module that is logically separated from other blocks to some extent, or may indicate a function in a module in which this and other blocks are logically combined together.

The above-noted computer system is an exemplified information processing apparatus utilizing a CPU (central processing unit), and is used to implement hardware for performing arithmetic on Oracle-numbers. In so doing, it may be preferable to add a new function such as the previously noted scale_next(X, Y) without making extensive modifications to the system configuration. Namely, an effort is made to achieve an implementation method that can do away with as many modifications as possible caused by addition of new functions. For example, in the above-noted CPU, the arithmetic device typically has two operand inputs and one output, with each operand having a data length of 8 bytes (i.e., 64 bits). It may be preferable not to change this configuration in order to reduce the extent of hardware modifications.

In the processor 110, the cache memory system is implemented as having a multilayer structure in which the primary cache unit 113 and the secondary cache unit 112 are provided. Specifically, the secondary cache unit 112 that can be accessed faster than the main memory is situated between the primary cache unit 113 and the main memory (i.e., the memory 111). With this arrangement, the frequency of access to the main memory upon the occurrence of cache misses in the primary cache unit 113 is reduced, thereby lowering cache-miss penalty.

The control unit 114 issues an instruction fetch address and an instruction fetch request to a primary instruction cache 113A to fetch an instruction from this instruction fetch address. The control unit 114 controls the arithmetic unit 115 in accordance with the decode results of the fetched instruction to execute the fetched instruction. The arithmetic controlling unit 117 operates under the control of the control unit 114 to supply data to be processed from the register 116 to the arithmetic device 118 and to store processed data in the register 116 at a specified register location. Further, the arithmetic controlling unit 117 specifies the type of arithmetic performed by the arithmetic device 118. Moreover, the arithmetic controlling unit 117 specifies an address to be accessed to perform a load instruction or a store instruction with respect to this address in the primary cache unit 113. Data read from the specified address by the load instruction is stored in the register 116 at a specified register location. Data stored at a specified location in the register 116 is written to the specified address by the store instruction.

A description will be first given of the definition of an oraclenum64 format that is a subset of the Oracle-number format. An oraclenum64 is an Oracle-number in which the significant length of the mantissa is shorter than or equal to 7 bytes.

Figure 12:
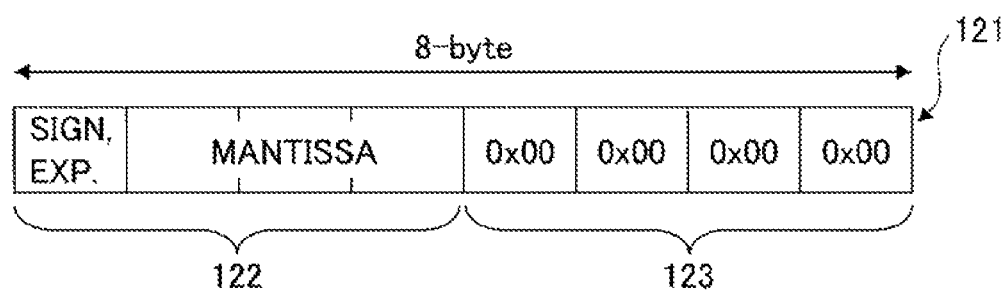
FIG. 12 is a drawing illustrating the configuration of the oraclenum64 format.

FIG. 12 is a drawing illustrating the configuration of the oraclenum64 format. Data 121 representing an oraclenum64 number can be accommodated in an 8-byte-length register. When an Oracle-number having a total length, including a sign and an exponent, of shorter than 8 bytes is stored in a register as an oraculenum64 number, data is packed to the left as illustrated as bytes 122 in FIG. 12. The remaining part on the left has bytes 123 each having a value of 0x00 stored as many as there are remaining bytes.

Figure 13:
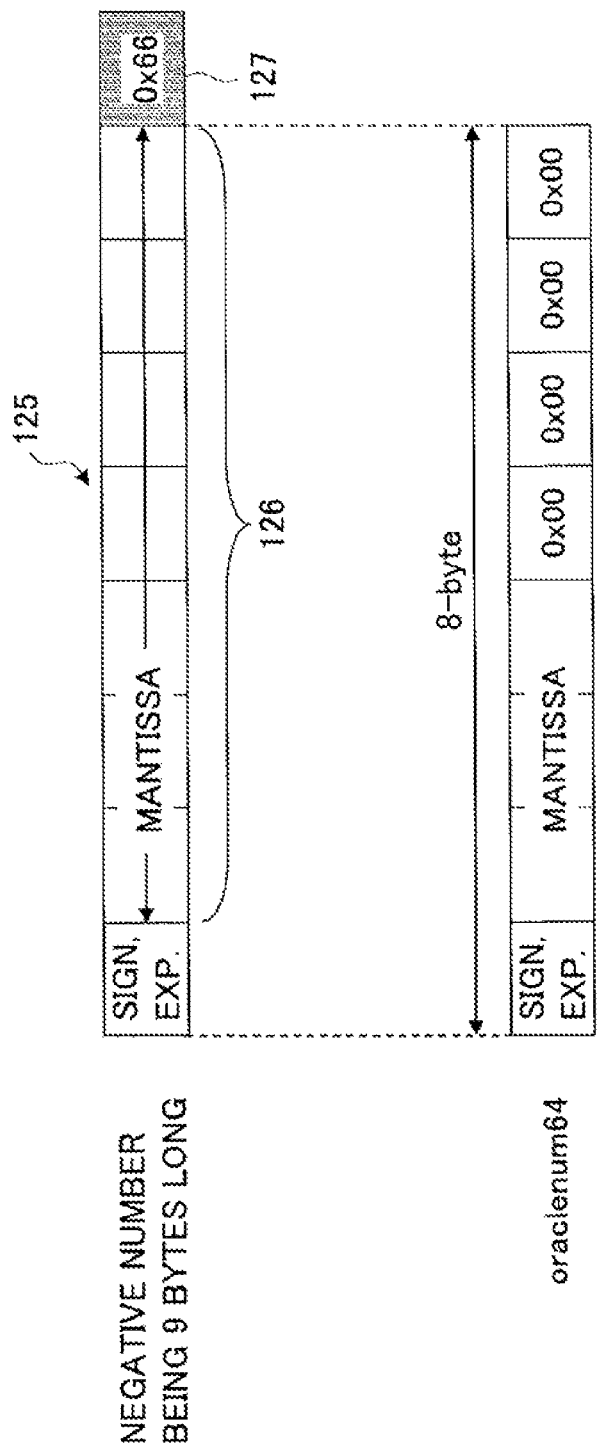
FIG. 13 is a drawing illustrating the configuration of an oraclenum64 number having a length of 9 bytes.

FIG. 13 is a drawing illustrating the configuration of an oraclenum64 number having a length of 9 bytes. As illustrated in FIG. 13, data 125 representing a negative Oracle-number having a length of 9 bytes has a mantissa 126 having a length of 7 bytes followed by the last byte (i.e., ninth byte) in which a terminator 127 (0x66) is stored. This Oracle-number is an oraclenum64 number since the significant length of the mantissa 126 is 7 bytes. This is required for a sign-reversed number of an oraclenum64 number to be always an oraclelum64 number.

Figure 14:
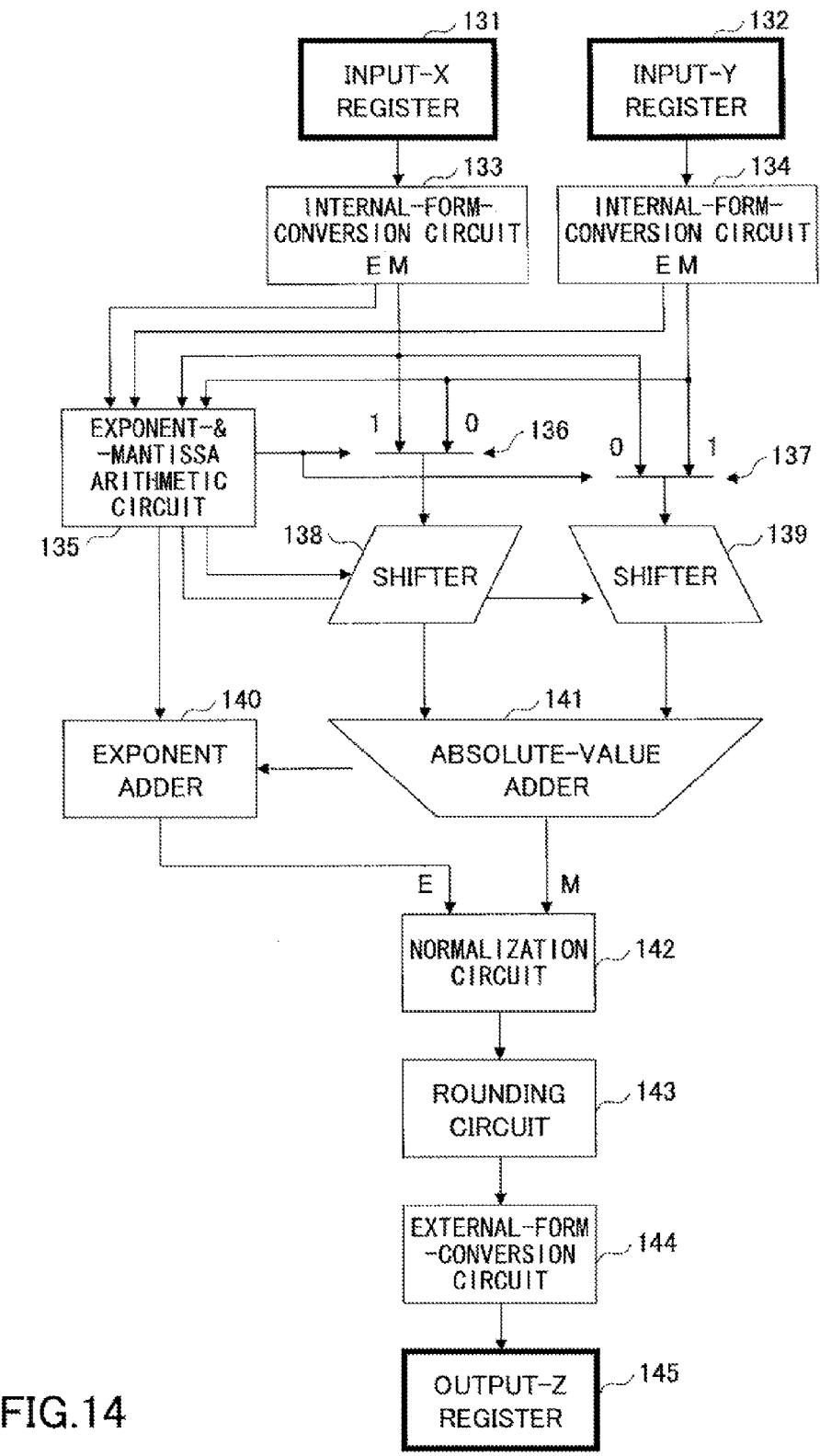
FIG. 14 is a drawing illustrating an example of the configuration of an arithmetic device that can perform arithmetic directly on oraclenum64 numbers.

FIG. 14 is a drawing illustrating an example of the configuration of an arithmetic device that can perform arithmetic directly on oraclenum64 numbers. The arithmetic device illustrated in FIG. 14 corresponds to part of the arithmetic circuit 119 illustrated in FIG. 11. The arithmetic device illustrated in FIG. 14 includes an input-X register 131, an input-Y register 132, internal-form-conversion circuits 133 and 134, an exponent-&-mantissa arithmetic circuit 135, selectors 136 and 137, shifters 138 and 139, an exponent adder 140, and an absolute-value adder 141. The arithmetic device further includes a normalization circuit 142, a rounding circuit 143, an external-form-conversion circuit 144, and an output-Z register 145. The internal-form-conversion circuits 133 and 134 and the external-form-conversion circuit 144 may be specially designed such that both the oraclenum64 format and the IEEE754-decimal64 format can be processed. In FIG. 14, the inputs and the output are floating-point numbers having the same format and the same precision. The input data may not be normalized data. The output data is normalized. The input data is provided in the oraclenum64 format, and, also, unnormalized data are processable. The output data is output in the oraclenum64 format without exception.

Each of the internal-form-conversion circuits 133 and 134 divides an input into a sign, an exponent, and a mantissa, thereby converting the input value representation into an internal format. The sign, exponent, and mantissa of the input X are referred to as a sign-X, an exponent-X, and a mantissa-X, respectively. The sign, exponent, and mantissa of the input Y are referred to as a sign-Y, an exponent-Y, and a mantissa-Y, respectively.

The exponent-&-mantissa arithmetic circuit 135 receives the exponent-X and the exponent-Y as well as the mantissa-X and the mantissa-Y. The exponent-&-mantissa arithmetic circuit 135 compares the exponent-X and the exponent-Y in terms of their magnitudes. Based on the result of magnitude comparison, the exponent-&-mantissa arithmetic circuit 135 generates a select signal such that the mantissa (i.e., first mantissa) associated with the larger exponent is supplied to the shifter 138 and that the mantissa (i.e., second mantissa)

associated with the smaller exponent is supplied to the shifter 139. The exponent-&-mantissa arithmetic circuit 135 compares the absolute value of a difference between the exponent-X and the exponent-Y with a count indicative of the number of leading zeros in the first mantissa. The exponent-&-mantissa arithmetic circuit 135 outputs the count indicative of the number of leading zeros in the first mantissa as the amount of shift to the left for the shifter 138 if the absolute value of a difference between the exponent-X and the exponent-Y is larger. The exponent-&-mantissa arithmetic circuit 135 outputs the absolute value of a difference between the exponent-X and the exponent-Y as the amount of shift to the left for the shifter 138 if the absolute value of a difference between the exponent-X and the exponent-Y is smaller. Here, the count indicative of the number of leading zeros is equal to the number of consecutive zeros appearing from the most significant digit in the mantissa.

The exponent-&-mantissa arithmetic circuit 135 compares the absolute value of a difference between the exponent-X and the exponent-Y with a count indicative of the number of leading zeros in the first mantissa. The exponent-&-mantissa arithmetic circuit 135 outputs the absolute value of a difference between the exponent-X and the exponent-Y minus the count indicative of the number of leading zeros in the first mantissa as the amount of shift to the right for the shifter 139 if the absolute value of a difference between the exponent-X and the exponent-Y is larger. The exponent-&-mantissa arithmetic circuit 135 outputs zero as the amount of shift to the right for the shifter 139 if the absolute value of a difference between the exponent-X and the exponent-Y is smaller. The exponent-&-mantissa arithmetic circuit 135 further outputs as an exponent the smaller exponent plus the above-noted amount of shift to the right.

The shifter 138 shifts the supplied mantissa to the left according to the specified amount of shift. The shifter 139 shifts the supplied mantissa to the right according to the specified amount of shift. The results of shifts by these shifters are input into the absolute-value adder 141.

In the case of subtraction, one of the mantissas is inverted, and a carry is input into the absolute-value adder 141. When a digit overflow is detected as a result of addition performed by the absolute-value adder 141, a value that is shifted to the right by one digit is output. At the same time, a carry is supplied from the absolute-value adder 141 to the exponent adder 140, so that the supplied carry is added to the exponent.

When a digit underflow is detected as a result of addition performed by the absolute-value adder 141, a value that is shifted to the left by one digit is output. At the same time, a signal indicative of digit underflow is supplied from the absolute-value adder 141 to the exponent adder 140, so that subtraction is performed with respect to the exponent. In the case of multiplication and division, a loop arithmetic circuit reutilizing a result of addition may be used.

The normalization circuit 142 receives the result of addition, and outputs a normalized arithmetic result. The rounding circuit 143 rounds the normalized arithmetic result. The external-form-conversion circuit 144 converts the rounded normalized arithmetic result into an external format for provision to the output-Z register 145.

Figure 15:
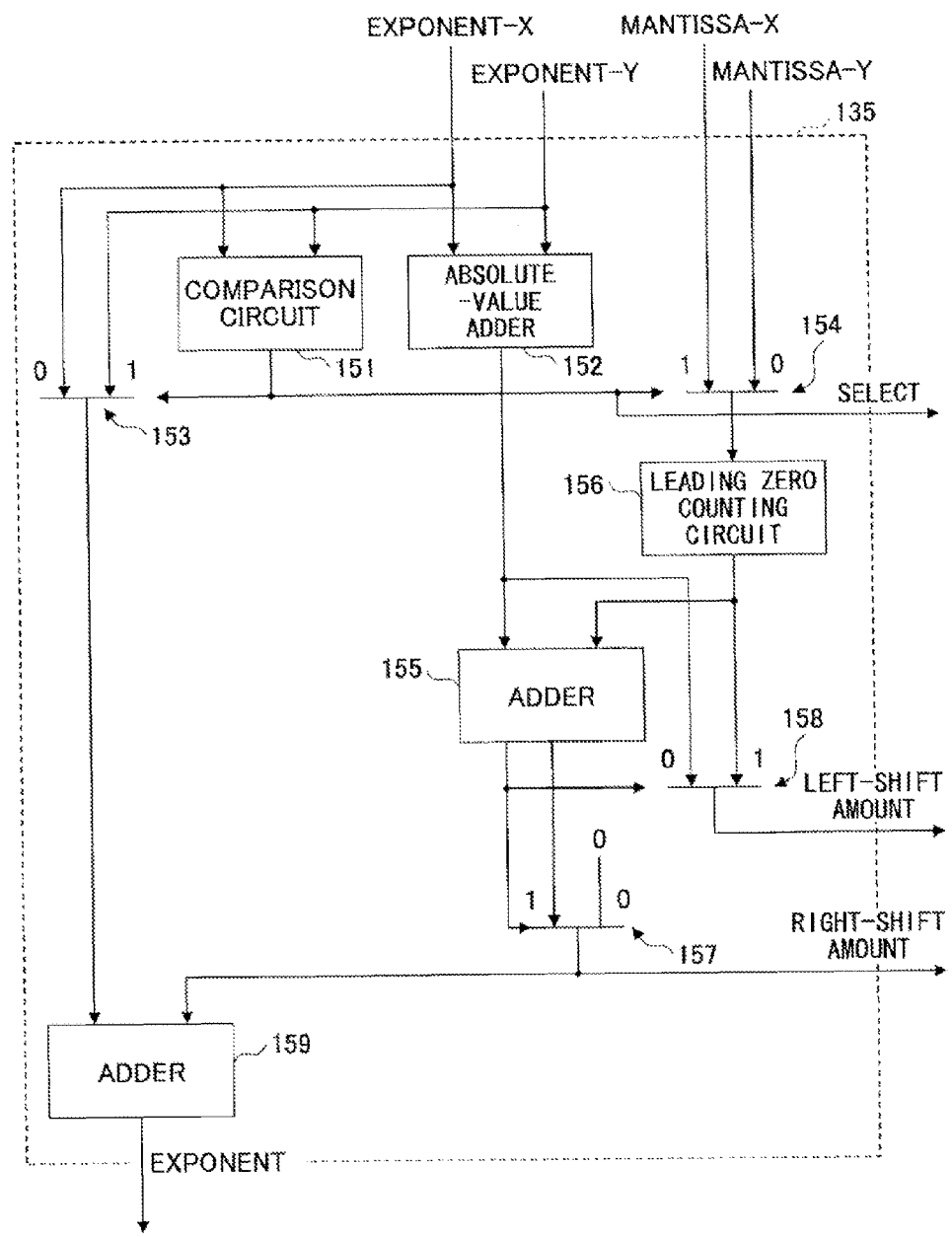
FIG. 15 is a drawing illustrating an example of the configuration of an exponent-&-mantissa arithmetic circuit.

FIG. 15 is a drawing illustrating an example of the configuration of the exponent-&-mantissa arithmetic circuit. The exponent-&-mantissa arithmetic circuit 135 illustrated in FIG. 15 includes a comparison circuit 151, an absolute-value adder 152, selectors 153 and 154, an adder 155, a leading zero counting circuit 156, selectors 157 and 158, and an adder 159.

The comparison circuit 151 compares the exponent-X and the exponent-Y in terms of their magnitudes, and generates a select signal such that the mantissa (i.e., first mantissa) associated with the larger exponent is supplied to the shifter 138 and that the mantissa (i.e., second mantissa) associated with the smaller exponent is supplied to the shifter 139. The absolute-value adder 152 calculates an absolute value of a difference between the exponent-X and the exponent-Y. The leading zero counting circuit 156 counts the number of leading zeros in the selected mantissa. The adder 155 compares the absolute value of a difference between the exponent-X and the exponent-Y and the count indicative of the number of leading zeros in the selected mantissa, thereby outputting a select signal responsive to the result of the comparison. The selector 158 outputs the count indicative of the number of leading zeros as the amount of shift to the left for the shifter 138 if the absolute value of a difference is larger. The selector 158 outputs the absolute value of a difference as the amount of shift to the left for the shifter 138 if the absolute value of a difference is smaller.

The selector 157 outputs the absolute value of a difference minus the count indicative of the number of leading zeros as the amount of shift to the right for the shifter 139 if the absolute value of a difference is larger. The selector 157 outputs zero as the amount of shift to the right for the shifter 139 if the absolute value of a difference is smaller.

The adder 159 receives the smaller exponent from the selector 153. The adder 159 outputs as an exponent a value that is obtained by adding the amount of shift to the right to the received smaller exponent.

Figure 16:
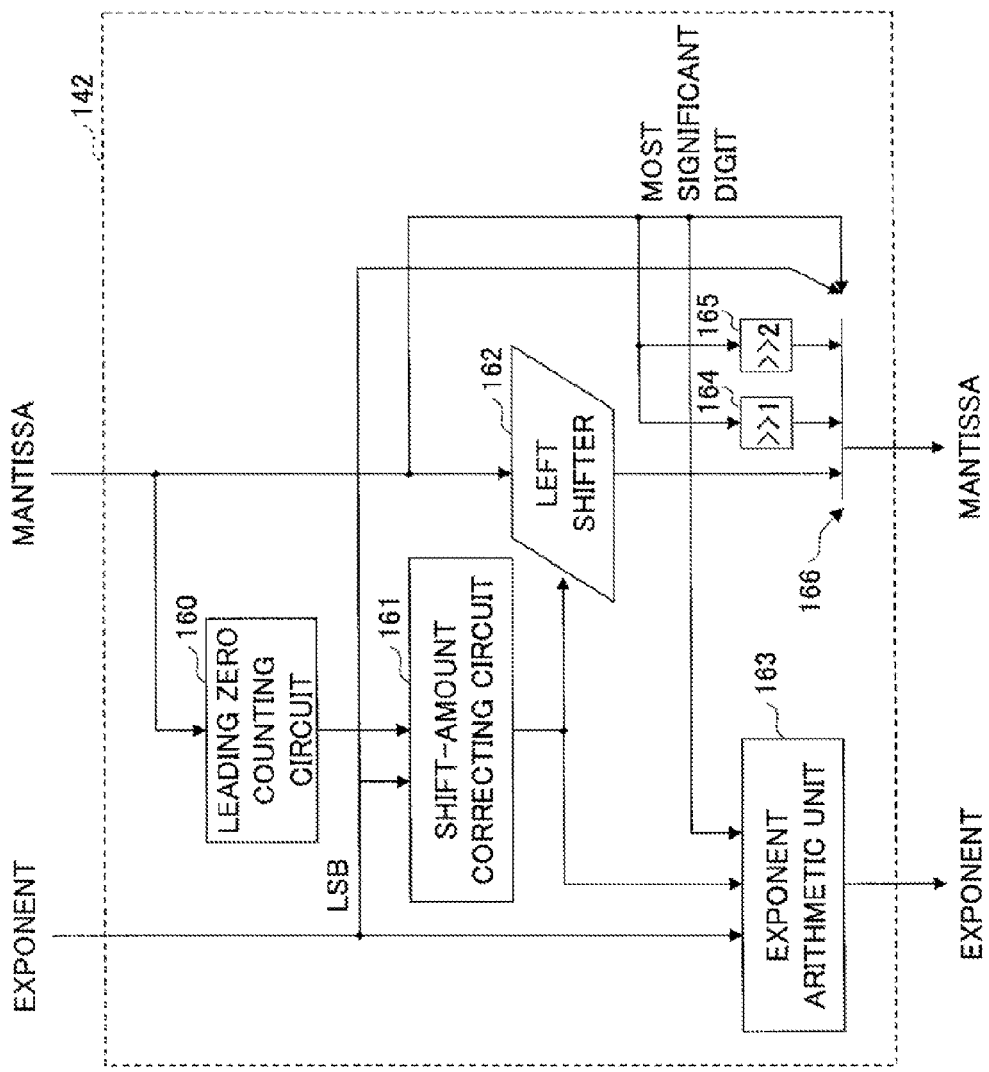
FIG. 16 is a drawing illustrating an example of the configuration of a normalization circuit.

FIG. 16 is a drawing illustrating an example of the configuration of the normalization circuit. The normalization circuit 142 illustrated in FIG. 16 includes a leading zero counting circuit 160, a shift-amount correcting circuit 161, a left shifter 162, an exponent arithmetic unit 163, bit shifters 164 and 165, and a selector 166.

The mantissa is input by use of a data width having an extra one digit attached to the most significant digit when taking into account a digit overflow. The leading zero counting circuit 160 receives a mantissa excluding the extra digit situated immediately above the most significant digit, and counts the number of leading zeros to output a count indicative of the number. The shift-amount correcting circuit 161 receives the count indicative of the number of leading zeros and the least significant bit of the exponent. When an XOR (i.e., exclusive OR) operation between the least significant bit of the exponent and the least significant bit of the count indicative of the number of leading zeros (which indicates whether the count is an odd number or an even number) produces a value of "1", the shift-amount correcting circuit 161 outputs as the amount of shift to the left a value that is obtained by subtracting 1 from the count indicative of the number of leading zeros. When the above-noted XOR value is 0, the shift-amount correcting circuit 161 outputs the count indicative of the number of leading zeros as the amount of shift to the left.

The left shifter 162 receives the amount of shift and a mantissa excluding the extra digit situated immediately above the most significant digit, and outputs a value that is obtained by shifting the mantissa to the left by the specified amount of shift. The selector 166 selects the result of the shift to the left output from the left shifter 162 when the extra digit situated immediately above the most significant digit of the input is "0". Further, the selector 166 selects a value obtained by shifting to the right by two digits the input mantissa inclusive of the extra digit situated immediately above the most significant digit upon concurrent occurrence of both a condition that the extra digit situated immediately above the most significant digit of the input is "1" and a condition that the least significant bit of the exponent is "0". Moreover, the selector 166 selects a value obtained by shifting to the right by one digit the input mantissa inclusive of the extra digit situated immediately above the most significant digit upon concurrent occurrence of both a condition that the extra digit situated immediately above the most significant digit of the input is "1" and a condition that the least significant bit of the exponent is "1". The value selected by the selector 166 is output as a mantissa.

The exponent arithmetic unit 163 receives the exponent, the amount of shift, and the most significant digit of the input mantissa. In the case of the most significant digit of the input mantissa being "0", the exponent arithmetic unit 163 outputs as an exponent a value that is obtained by subtracting the amount of shift from the exponent. Upon concurrent occurrence of both a case of the most significant digit of the input mantissa being "1" and a case of the least significant bit of the exponent being "0", the exponent arithmetic unit 163 outputs as an exponent a value that is obtained by adding 2 to the exponent. Upon concurrent occurrence of both a case of the most significant digit of the input mantissa being "1" and a case of the least significant bit of the exponent being "1", the exponent arithmetic unit 163 outputs as an exponent a value that is obtained by adding 1 to the exponent.

Figures 17A, 17B:
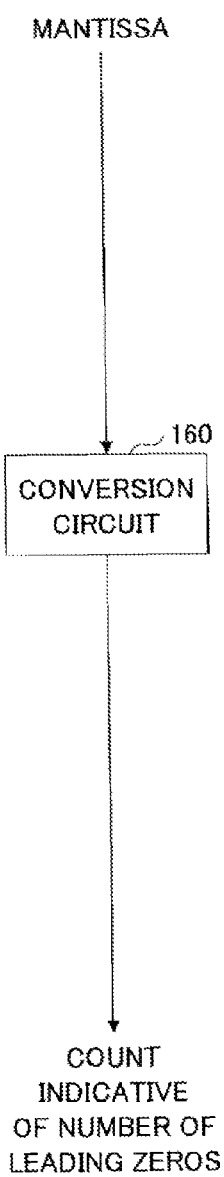
FIGS. 17A and 17B are drawings illustrating an example of the configuration of a leading zero counting circuit.

FIGS. 17A and 17B are drawings illustrating an example of the configuration of the leading zero counting circuit. As illustrated in FIG. 17A, the leading zero counting circuit includes a conversion circuit 160. The conversion circuit 160 receives the mantissa as input data, and generates output data from the input data in accordance with the table illustrated in FIG. 17B. This output data is the count indicative of the number of leading zeros, and represents the count by a binary number. In the table, the symbol "X" at the leftmost position indicates a non-zero value, and other Xs indicate a "don't care" value. 0s are the zeros that are subjected to counting.

Figure 18:
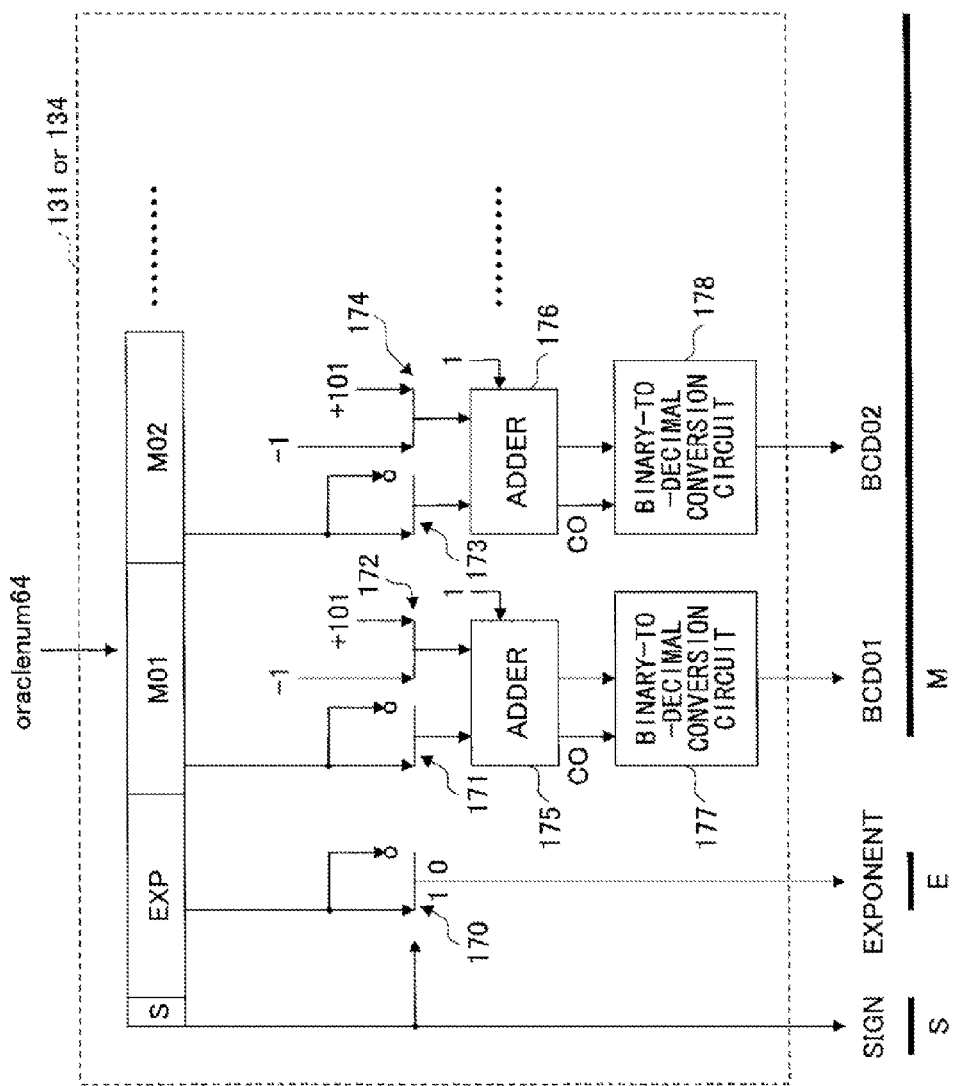
FIG. 18 is a drawing illustrating an example of the configuration of an internal-form-conversion circuit.

FIG. 18 is a drawing illustrating an example of the configuration of the internal-form-conversion circuit. The internal-form-conversion circuit 133 or 134 illustrated in FIG. 18 includes selectors 170 through 174, adders 175 and 176, and binary-to-decimal conversion circuits 177 and 178.

The input data is divided into a sign S, an exponent EXP, and a mantissa M01, M02, . . . . The sign S is comprised of one bit, which is output as sign data as it is. The sign indicates a positive number when it is 1.

The exponent EXP is 7 bits long. The selector 170 outputs as exponent data the exponent EXP as it is when the sign is "1". The selector 170 outputs as exponent data an inverse of the exponent EXP when the sign is "0".

Each of the mantissa parts M01, M02, and so on is 8 bits long. The selector 171 selects the mantissa when the sign is "1", and selects an inverse of the mantissa when the sign is "0". This selected value is applied to one of the inputs of the adder 175. The selector 172 selects "−1" when the sign is "1", and selects "+101" when the sign is "0". This selected value is applied to the other input of the adder 175. When the sign is "0", further, a carry is input into the adder 175. The same also applies in the case of the selectors 173 and 174 and the adder 176.

The outputs of the adders 175 and 176 are converted from the binary format into the BCD format by the binary-to-decimal conversion circuits 177, respectively. The values after the BCD conversion are output as exponent data. It may be noted that values after the BCD conversion are forcibly set to zeros if the CO from the adder is "0".

Figure 19:
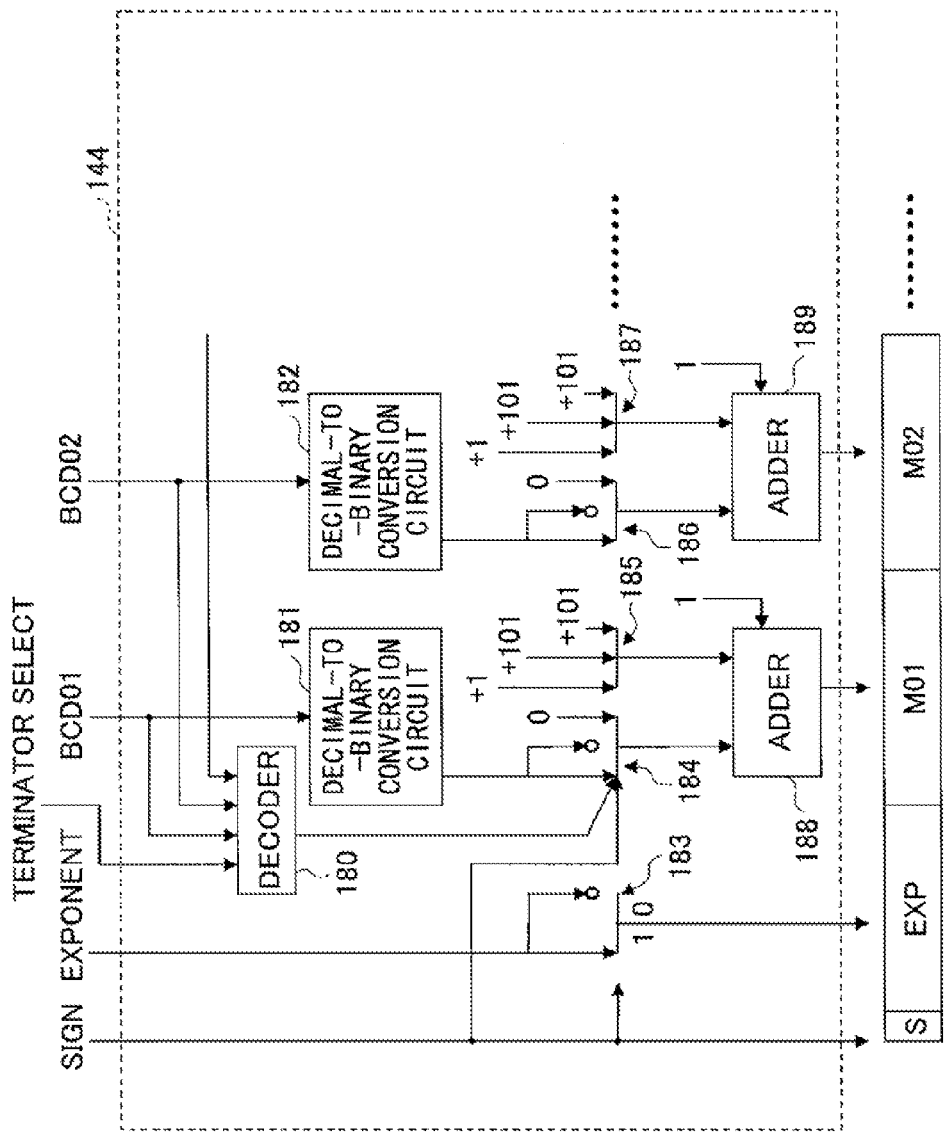
FIG. 19 is a drawing illustrating an example of the configuration of an external-form-conversion circuit.

FIG. 19 is a drawing illustrating an example of the configuration of the external-form-conversion circuit. The external-form-conversion circuit 144 illustrated in FIG. 19 includes a decoder 180, a decimal-to-binary conversion circuits 181 and 182, selectors 183 through 187, and adders 188 and 189. FIG. 19 expressly illustrates each circuit portion corresponding to a respective one of the two mantissa parts BCD01 and BCD02. When the number of mantissa parts is three or more, the same circuit portion is provided for each respective one of these mantissa parts.

A 1-bit sign data input is output as it is, as sign data. The sign indicates a positive number when it is 1. An input and output exponent is 7 bits long. The selector 183 provides the input exponent as an output exponent when the sign is "1", and provides an inverse of the input exponent as an output exponent when the sign is "0". Each of the mantissa parts BCD01, BCD02, and so on is 8 bits long. The decimal-to-binary conversion circuits 181, 182, and so on convert BCD values into binary values.

The decoder 180 receiving a terminator selecting signal generates a terminator digit selecting signal that selects a terminator digit indicative of the digit at the tail end. The terminator digit selecting signal is distributed to the selectors 184, 185, and so on in the subsequent stage.

In respect of each of the adders 188, 189, and so on, one of the inputs thereof receives a mantissa when the sign is "1", and receives an inverse of the mantissa when the sign is "0". When the terminator digit selecting signal is "1", however, zero is selected as an input. The other input receives "+1" when the sign is "1", and receives "+101" when the sign is "0". When the terminator digit selecting signal is "1", however, "+101" is selected as an input. The value that is supposed to be added in this case is "+102". The addition of the carry-in to "+101" achieves an operation equivalent to the addition of "+102" When the sign is "0", further, a carry-in is input into the adder. The outputs of the adders 188, 189, and so on are output as respective parts of the mantissa.

FIG. 20 is a drawing illustrating a specific example of the addition of fixed-precision floating-point numbers. In FIG. 20, the exponent of the input X is denoted as Ex, the exponent of the input Y denoted as Ey, the count indicative of the number of leading zeros in the input X denoted as Lx, and the count indicative of the number of leading zeros in the input Y denoted as Ly. Further, the exponent of the output Z is denoted as Ez. In order to maintain as high arithmetic precision as possible, a mantissa corresponding to the greater of the exponents is shifted to the left to align the digits. Shift to the left by the number of digits larger than the number of leading zeros results in the higher-order digits being lost. In consideration of this, when the amount of shift (Ex−Ey) to the left necessary to align the digits exceeds the number of leading zeros, the mantissa corresponding to the smaller of the exponents is shifted to the right to align the digits. To this end, Ex−Ey is calculated, the result of which is compared with Lx. In the example illustrated in FIG. 20, Lx is larger. Namely, the amount of shift Ex−Ey to left is within the number of leading zeros, so that only a mantissa 191 of the input X is shifted to the left. A mantissa 192 of the input Y is not shifted to the right. The amount of shift to the left is Ex−Ey, and the amount of shift to the right is 0.

The numbers whose digits are aligned as described above, i.e., the mantissa 192 and a mantissa 193 obtained by shifting the mantissa 191 to the left, are added together. Further, an addition result 194 is normalized. That is, the addition result is shifted to the left by the count indicative of the number of leading zeros when the count is 1 or more, and is shifted to the right when a digit overflow exists. The shift to the left may result in the exponent being an odd number. In such a case, the amount of shift to the left is decreased by one. The shift to the right may also result in the exponent being an odd number. In such a case, the amount of shift to the right is decreased by one. The exponent is adjusted in accordance with the amount of shift to the right or to the left. In the case of a shift to the left, the exponent is decreased by the amount of shift to the left. In the case of a shift to the right, the exponent is increased by the amount of shift to the right. In this specific example, a shift to the left by one digit may be necessary. With such a shift, however, the exponent changes from "0" to "1", which is an odd number. The amount of shift to the left is thus decreased by "1" to become "0", so that the exponent remains to be "0". Consequently, the addition result does not go through any change by normalization. The mantissa 194 and the exponent Ez obtained as the addition result are output as they are as the result of arithmetic.

FIG. 21 is a drawing illustrating another specific example of the addition of fixed-precision floating-point numbers. In this specific example, Lx is smaller than the contemplated amount of shift Ex−Ey to the left That is, the amount of shift Ex−Ey to the left is not within the number of leading zeros. Accordingly, an exponent 201 of the input X is shifted to the left by Lx, and an exponent 202 of the input Y is shifted to the right by the number of digits equal to a difference between the actual left shift amount and the contemplated left shift amount. In this case, the amount of shift to the left is Lx, and the amount of shift to the right is (Ex−Ey)−Lx.

The numbers whose digits are aligned as described above, i.e., a mantissa 203 obtained by shifting the mantissa 201 to the left and a mantissa 204 obtained by shifting the mantissa 202 to the right, are added together. In so doing, the digits that are overflowed by the shift to the right are kept. Further, an addition result 205 is normalized. That is, the addition result is shifted to the left by the count indicative of the number of leading zeros when the count is 1 or more, and is shifted to the right when a digit overflow exists. The shift to the left may result in the exponent being an odd number. In such a case, the amount of shift to the left is decreased by one. The shift to the right may also result in the exponent being an odd number. In such a case, the amount of shift to the right is decreased by one. The exponent is adjusted in accordance with the amount of shift to the right or to the left. In the case of a shift to the left, the exponent is decreased by the amount of shift to the left. In the case of a shift to the right, the exponent is increased by the amount of shift to the right. In this specific example, a shift to the right by one digit may be necessary. With such a shift, however, the exponent Ez changes from "2" to "3", which is an odd number. The amount of shift to the right is thus increased by "1" to become "2", so that the exponent Ez changes from "2" to "4".

Subsequently, rounding is performed on a normalized result 206. In this example, rounding to the nearest with 5 being rounded up and 4 being rounded down is performed with respect to the digits that are overflowed to the right. As a result of such a rounding operation, a rounded mantissa 207 together with the corresponding exponent Ez are output as the result of an arithmetic operation.

In the following, a description will be given of a method of expressing a single Oracle-number by use of a set of plural oraclenum64 numbers.

In order to perform the calculation of Oracle-numbers each having a length of up to 21 bytes by use of arithmetic hardware for oraclenum 64, an arrangement is made to express an Oracle-number by use of a set of plural oraclenum64 numbers.

Figure 22:
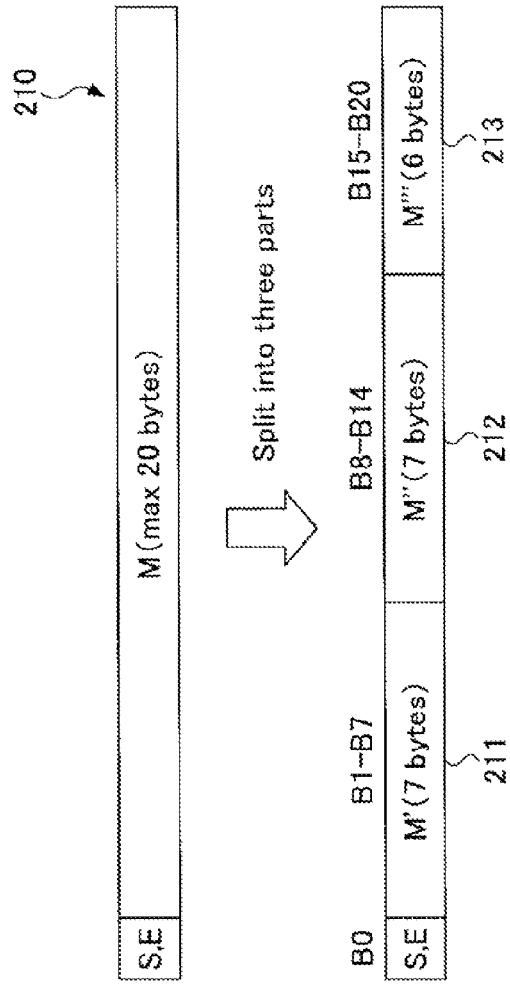
FIG. 22 is a drawing illustrating a method of dividing an Oracle-number having a length of 21 bytes into three parts.

FIG. 22 is a drawing illustrating a method of dividing an Oracle-number having a length of 21 bytes into three parts. As illustrated in FIG. 22, a mantissa 210 having a length of up to 20 bytes is divided into a mantissa 211 being 7 bytes long, a mantissa 212 being 7 bytes long, and a mantissa 213 being 6 bytes long.

Figure 23:
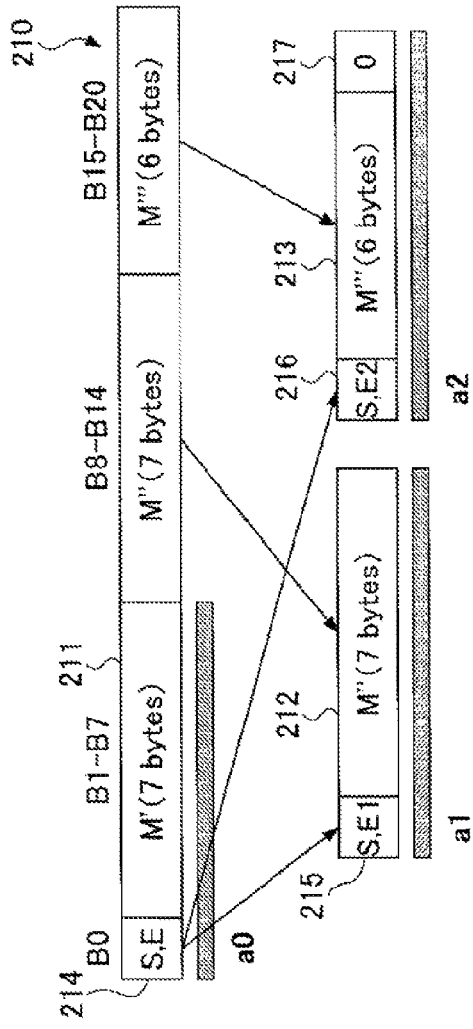
FIG. 23 is a drawing illustrating a method of generating oraclenum64 numbers corresponding to the three divided mantissa parts, respectively.

FIG. 23 is a drawing illustrating a method of generating oraclenum64 numbers corresponding to the three divided mantissa parts, respectively. As for a0, the 8 bytes (i.e., one byte of a sign and an exponent 214 plus the 7-byte mantissa 211) at the head of the original Oracle-number is extracted to generate a number in the oraclenum64 format. In respect of a1 and a2, an arrangement is made to modify the first byte (i.e., the sign and the exponent 214) of the original Oracle-number. Specifically, the exponent E1 of a1 is set equal to E-14 where E is the exponent of the original Oracle-number for a radix of 10, thereby generating for a1 a sign and exponent part 215 being 1 byte long. The 7-byte mantissa 212 is attached to the sign and exponent part 215 to produce an oraclenum64 number corresponding to a1. The exponent E2 of a2 is set equal to E-28, thereby generating for a2 a sign and exponent part 216 being 1 byte long. The 6-byte mantissa 213 and one byte of "0" are attached to the sign and exponent part 216 to produce an oraclenum64 number corresponding to a2. The set of three oraclenum64 numbers generated in this manner will hereinafter be referred to as a triple-oraclenum64.

In the following, a description will be given of the configuration that performs the four arithmetic operations with respect to the triple-oraclenum64 format. A description will be first given of an arithmetic operation for obtaining an accurate sum of oraclenum64 numbers. The two-sum function described below is the same as formula (4.16) shown in Non-Patent Document 1. Similar methods are also disclosed on page 18 of Non-Patent Document 2 and disclosed as algorithm4 in Non-Patent Document 3.

$$\text{two\_sum}(X, Y)$$

$$z = fl(X+Y)$$

$$w = fl(z-X)$$

$$v = fl(z-w)$$

$$z1 = fl(Y-w)$$

$$z2 = fl(v-X)$$

$$zz = fl(z1-z2)$$

$$\text{return}(z, zz)$$

Here, fl(X+Y) indicates the result obtained by mapping the true value of X+Y onto the floating-point number, i.e., the result obtained by expressing this value within the limited precision of the floating-point number. Two values z and zz obtained by the above-noted two_sum function accurately satisfies the following: z+zz=X+Y. Value z represents the most significant part of X+Y within the precision of the fixed-precision floating-point number format, and zz represents a remainder that is left unexpressed by the precision of the fixed-precision floating-point number format.

Attending to rounding that occurs at the time of mapping will be described by taking as an example the rounding to the nearest with 5 being rounded up and 4 being rounded down, which is an exemplary rounding method used in decimal numbers. For the sake of simplicity, the precision of a fixed-precision floating-point number is assumed to be two decimal digits. In this case, the sum of 20000 and −1 will be calculated by two_sum as follows.

$X=20000$ $Y=-1$ $z=\mathit{fl}(X+Y)=20000$ $w=\mathit{fl}(z-X)=0$ $v=\mathit{fl}(z-w)=20000$ $z1=\mathit{fl}(Y-w)=-1$ $z2=\mathit{fl}(v-X)=0$ $zz=\mathit{fl}(z1-z2)=-1$ As in this example, z and zz that are obtained as results of two_sum may have different signs. Rounding down may be used as a rounding operation. In such a case, z+zz may differ from X+Y as in the following example when significant digits do not overlap between X and Y.

$X=20000$ $Y=-1$ $z=\mathit{fl}(X+Y)=19000$ $w=\mathit{fl}(z-X)=-1000$ $v=\mathit{fl}(z-w)=20000$ $z1=\mathit{fl}(Y-w)=990$ $z2=\mathit{fl}(v-X)=0$ $zz=\mathit{fl}(z1-z2)=990$ In the following, it will be shown that the calculation of zz becomes easier by using a new rounding operation as described below, with an assumption that the absolute value of X is greater than or equal to the absolute value of Y:

(1) rounding to the nearest with 5 being rounded up and 4 being rounded down is performed when there is no significant digit overlap between X an Y; and (2) rounding down is performed when there is a significant digit overlap between X an Y When significant digits are consecutively arranged between X and Y, such a case is included in (2) even though no significant digit overlap is in existence between X and Y.

An advantage of using the above-noted rounding operation will be described by use of a specific example. As in the above-noted example, the precision of a fixed-precision floating-point number is assumed to be two decimal digits. The example to be described is directed to a case in which significant digits are consecutively arranged between X an Y. If fl performs rounding to the nearest with 5 being rounded up and 4 being rounded down rather than the special rounding operation described above, calculation will become as follows.

$X=2000$ $Y=52$ $z=2100$ $w=100$ $v=2000$ $z1=-48$ $z2=0$ $zz=-48$

If the above-noted new rounding operation is used, calculation will become as follows.

$X=2000$ $Y=52$ $z=2000$ $w=0$ $v=2000$ $z1=52$ $z2=0$ $zz=52$

The use of the new rounding operation described above provides the following advantages. In the case of (1), the absence of overlap eliminates an arithmetic operation for rounding to the nearest with 5 being rounded up and 4 being rounded down after the calculation of X+Y, and eliminates an arithmetic operation for obtaining z1 that would otherwise be necessary to correct w generated by rounding to the nearest with 5 being rounded up and 4 being rounded down. In the case of (2), the precision of X+Y is guaranteed to be no more than twice the number of significant digits, and only a rounding-down operation is used as rounding, which makes it easier to provide hardware for performing the arithmetic operation.

As described above, the computation of zz becomes easier by comparing the absolute values of two inputs, by classifying the case at hand to either (1) or (2) described above, and by performing the new rounding operation. Further, the provision of hardware circuits for performing get_z(x, y) and get_zz(x, y) to obtain z and zz, respectively, makes it possible to perform two_sum at high speed as described below.

two_sum_fast(x,y)

$z=\mathrm{get\_}z(x,y)$ $zz=\mathrm{get\_}zz(x,y)$ return(z,zz)

Figure 24:
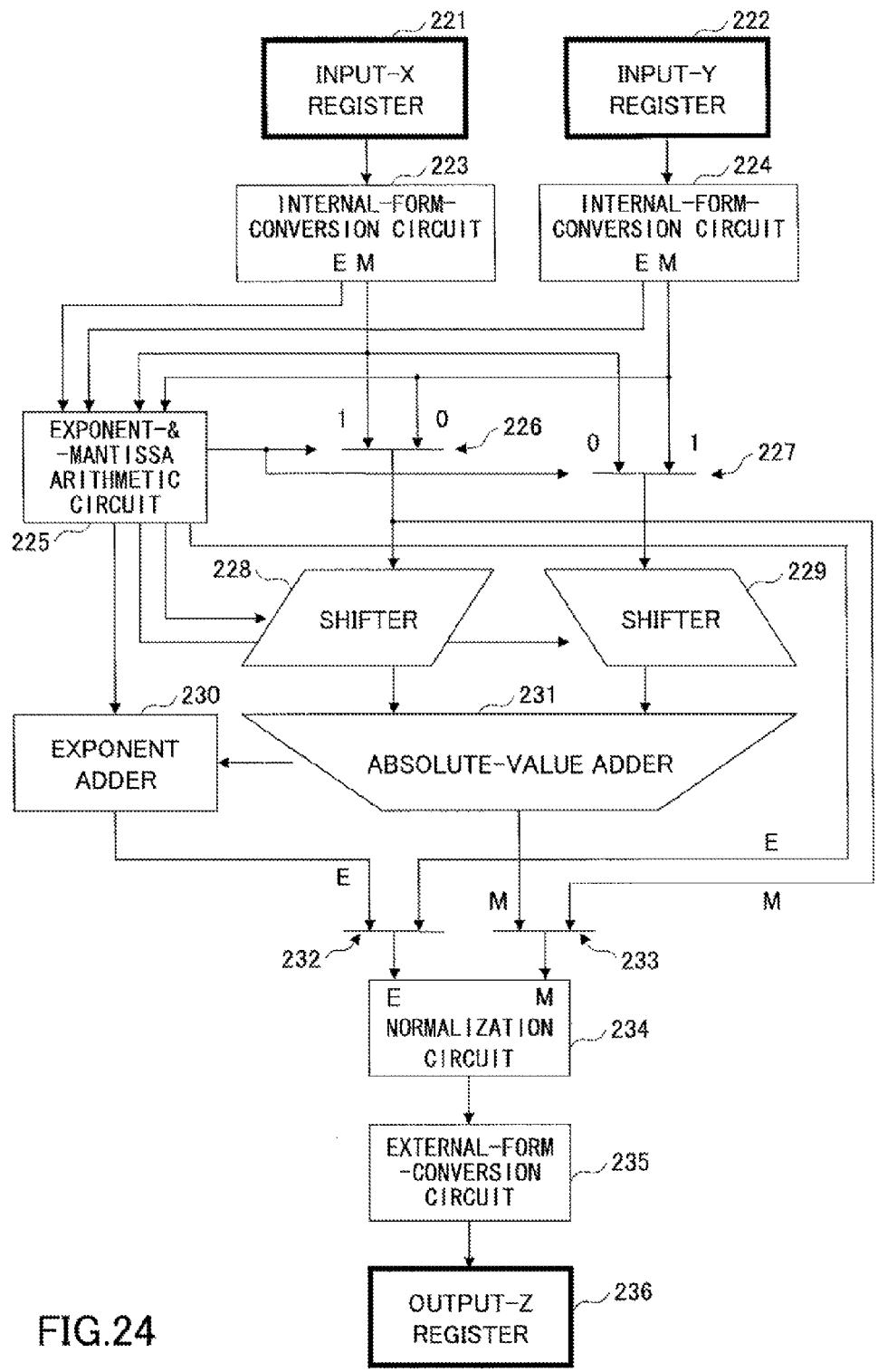
FIG. 24 is a drawing illustrating an example of the configuration of a circuit that performs a get_z arithmetic operation.

FIG. 24 is a drawing illustrating an example of the configuration of a circuit that performs the get_z arithmetic operation. The arithmetic device illustrated in FIG. 24 corresponds to part of the arithmetic circuit 119 illustrated in FIG. 11. The arithmetic device illustrated in FIG. 24 includes an input-X register 221, an input-Y register 222, internal-form-conversion circuits 223 and 224, an exponent-&-mantissa arithmetic circuit 225, selectors 226 and 227, shifters 228 and 229, an exponent adder 230, and an absolute-value adder 231. The arithmetic device further includes selectors 232 and 233, a normalization circuit 234, an external-form-conversion circuit 235, and an output-Z register 236. In FIG. 24, the same or corresponding elements as those in the circuit of FIG. 14 are referred to by the same or corresponding numerals. In FIG. 24, the inputs and the output are floating-point numbers having the same format and the same precision. The input data may not be normalized data. The output data is normalized. The input data is provided in the oraclenum64 format, and, also, unnormalized data are processable. The output data is output in the oraclenum64 format without exception.

Each of the internal-form-conversion circuits 223 and 224 divides an input into a sign, an exponent, and a mantissa, thereby converting the input value representation into an internal format. The sign, exponent, and mantissa of the input X are referred to as a sign-X, an exponent-X, and a mantissa-X, respectively. The sign, exponent, and mantissa of the input Y are referred to as a sign-Y, an exponent-Y, and a mantissa-Y, respectively.

The exponent-&-mantissa arithmetic circuit 225 receives the exponent-X and the exponent-Y as well as the mantissa-X and the mantissa-Y. The exponent-&-mantissa arithmetic circuit 225 compares the exponent-X and the exponent-Y in terms of their magnitudes. Based on the result of magnitude comparison, the exponent-&-mantissa arithmetic circuit 225 generates a select signal such that the mantissa (i.e., first mantissa) associated with the larger exponent is supplied to the shifter 228 and that the mantissa (i.e., second mantissa) associated with the smaller exponent is supplied to the shifter 229. The exponent-&-mantissa arithmetic circuit 225 compares the absolute value of a difference between the exponent-X and the exponent-Y with a count indicative of the number of leading zeros in the first mantissa. The exponent-&-mantissa arithmetic circuit 225 outputs the latter as the amount of shift to the left for the shifter 228 if the former is larger. The exponent-&-mantissa arithmetic circuit 225 outputs the former as the amount of shift to the left for the shifter 228 if the former is smaller.

The exponent-&-mantissa arithmetic circuit 225 compares the absolute value of a difference between the exponent-X and the exponent-Y with a count indicative of the number of leading zeros in the first mantissa. The exponent-&-mantissa arithmetic circuit 225 outputs the absolute value of a difference between the exponent-X and the exponent-Y minus the count indicative of the number of leading zeros in the first mantissa as the amount of shift to the right for the shifter 229 if the absolute value of a difference between the exponent-X and the exponent-Y is larger. The exponent-&-mantissa arithmetic circuit 225 outputs zero as the amount of shift to the right for the shifter 229 if the absolute value of a difference between the exponent-X and the exponent-Y is smaller. The exponent-&-mantissa arithmetic circuit 225 further outputs as an exponent the smaller exponent plus the above-noted amount of shift to the right.

The exponent-&-mantissa arithmetic circuit 225 further checks whether the absolute value of {(exponent-X−the count indicative of the number of leading zeros in mantissa-X)−(exponent-Y−the count indicative of the number of leading zeros in mantissa-Y)} is larger than or equal to 14. If this absolute value is larger than or equal to 14, the exponent-&-mantissa arithmetic circuit 225 generates a select signal such that the first mantissa and the exponent corresponding to the first mantissa are selected by the selectors 232 and 233, respectively. As a result, in the case of the absolute value being larger than or equal to 14, the first mantissa is supplied to the normalization circuit 234 by bypassing the shifter 228 and the absolute-value adder 231.

The shifter 228 shifts the supplied mantissa to the left according to the specified amount of shift. The shifter 229 shifts the supplied mantissa to the right according to the specified amount of shift. The results of shifts by these shifters are input into the absolute-value adder 231.

In the case of subtraction, one of the mantissas is inverted, and a carry is input into the absolute-value adder 231. When a digit overflow is detected as a result of addition performed by the absolute-value adder 231, a value that is shifted to the right by one digit is output. At the same time, a carry-out is supplied from the absolute-value adder 231 to the exponent adder 230, so that the supplied carry is added to the exponent.

When a digit underflow is detected as a result of addition performed by the absolute-value adder 231, a value that is shifted to the left by one digit is output. At the same time, a signal indicative of digit underflow is supplied from the absolute-value adder 231 to the exponent adder 230, so that subtraction is performed with respect to the exponent.

The selectors 232 and 233 select the exponent and mantissa of the addition result, respectively, or select the exponent corresponding to the first mantissa and the first mantissa, respectively, depending on the select signal generated by the exponent-&-mantissa arithmetic circuit 225. The normalization circuit 234 receives the exponent and the mantissa selected by the selectors 232 and 233, respectively, and outputs a normalized arithmetic result. The external-form-conversion circuit 235 converts the normalized arithmetic result into an external format for provision to the output-Z register 236.

FIG. 25 is a drawing illustrating a specific example of the get_z arithmetic operation. In FIG. 25, the exponent of the input X is denoted as Ex, the exponent of the input Y denoted as Ey, the count indicative of the number of leading zeros in the input X denoted as Lx, and the exponent of the output Z denoted as Ez. The arithmetic operation performed in this example is a get_z arithmetic operation 240 illustrated in FIG. 25. In order to maintain as high arithmetic precision as possible, a mantissa corresponding to the greater of the exponents is shifted to the left to align the digits. Shift to the left by the number of digits larger than the number of leading zeros results in the higher-order digits being lost, which is impossible. In consideration of this, when the amount of shift (Ex−Ey) to the left necessary to align the digits exceeds the number of leading zeros, the mantissa corresponding to the smaller of the exponents is shifted to the right to align the digits. To this end, Ex−Ey is calculated, the result of which is compared with Lx. In the example illustrated in FIG. 25, Lx is larger. Namely, the amount of shift Ex−Ey to left is within the number of leading zeros, so that only a mantissa 241 of the input X is shifted to the left. A mantissa 242 of the input Y is not shifted to the right. The amount of shift to the left is Ex−Ey, and the amount of shift to the right is 0.

The numbers whose digits are aligned as described above, i.e., a mantissa 243 obtained by shifting the mantissa 241 to the left and a mantissa 244 unchanged from the mantissa 242, are added together. Further, an addition result 245 is normalized. That is, the addition result is shifted to the left by the count indicative of the number of leading zeros when the count indicative of the number of leading zeros is 1 or more, and is shifted to the right when a digit overflow exists. The shift to the left may result in the exponent being an odd number. In such a case, the amount of shift to the left is decreased by one. The shift to the right may also result in the exponent being an odd number. In such a case, the amount of shift to the right is decreased by one. The exponent is adjusted in accordance with the amount of shift to the right or to the left. In the case of a shift to the left, the exponent is decreased by the amount of shift to the left. In the case of a shift to the right, the exponent is increased by the amount of shift to the right. In this specific example, a shift to the left by one digit may be necessary. With such a shift, however, the exponent changes from "0" to "1", which is an odd number. The amount of shift to the left is thus decreased by "1" to become "0", so that the exponent remains to be "0". In this example, there is no change brought about by normalization. Further, upper-order digits of the normalized mantissa 246 are selected.

When the number of digits in the mantissa of the input format is 14, 14 digits from the most significant digit are selected as the upper-order digits, with the remaining digits from the 15-th digit position and onwards being treated as lower-order digits, As a result of the above-noted arithmetic operation, a mantissa 247 together with the corresponding exponent Ez are output as the result of an arithmetic operation.

FIG. 26 is a drawing illustrating another specific example of the get_z arithmetic operation. The arithmetic operation performed in this example is a get_z arithmetic operation 250 illustrated in FIG. 26. In order to maintain as high arithmetic precision as possible, a mantissa corresponding to the greater of the exponents is shifted to the left to align the digits. Shift to the left by the number of digits larger than the number of leading zeros results in the higher-order digits being lost, which is impossible. In consideration of this, when the amount of shift (Ex−Ey) to the left necessary to align the digits exceeds the number of leading zeros, the mantissa corresponding to the smaller of the exponents is shifted to the right to align the digits. To this end, Ex−Ey is calculated, the result of which is compared with Lx. In the example illustrated in FIG. 26, Lx is smaller. That is, the amount of shift Ex−Ey to the left is not within the number of leading zeros. Accordingly, an exponent 251 of the input X is shifted to the left by Lx, and an exponent 252 of the input Y is shifted to the right by the number of digits equal to a difference between the actual left shift amount and the contemplated left shift amount. In this case, the amount of shift to the left is Lx, and the amount of shift to the right is (Ex−Ey)−Lx.

The numbers whose digits are aligned as described above, i.e., a mantissa 253 obtained by shifting the mantissa 251 to the left and a mantissa 254 obtained by shifting the mantissa 252 to the right, are added together. In so doing, the digits that are overflowed by the shift to the right are kept. Further, an addition result 255 is normalized. That is, the addition result is shifted to the left by the count indicative of the number of leading zeros when the count is 1 or more, and is shifted to the right when a digit overflow exists. The shift to the left may result in the exponent being an odd number. In such a case, the amount of shift to the left is decreased by one. The shift to the right may also result in the exponent being an odd number. In such a case, the amount of shift to the right is decreased by one. The exponent is adjusted in accordance with the amount of shift to the right or to the left. In the case of a shift to the left, the exponent is decreased by the amount of shift to the left. In the case of a shift to the right, the exponent is increased by the amount of shift to the right. In this specific example, a shift to the right by one digit may be necessary. With such a shift, however, the exponent Ez changes from "2" to "3", which is an odd number. The amount of shift to the right is thus increased by "1" to become "2", so that the exponent changes from "2" to "4". Further, upper-order digits of the normalized mantissa 256 obtained in this manner are selected. When the number of digits in the mantissa of the input format is 14, 14 digits from the most significant digit are selected as the upper-order digits, with the remaining digits from the 15-th digit position and onwards being treated as lower-order digits, As a result of the above-noted arithmetic operation, a mantissa 257 is output as the result of the arithmetic operation, and the corresponding exponent Ez is output as the exponent of the result of the arithmetic operation.

FIG. 27 is a drawing illustrating yet another specific example of the get_z arithmetic operation. The arithmetic operation performed in this example is a get_z arithmetic operation 260 illustrated in FIG. 27. In order to maintain as high arithmetic precision as possible, a mantissa corresponding to the greater of the exponents is shifted to the left to align the digits. Shift to the left by the number of digits larger than the number of leading zeros results in the higher-order digits being lost. In consideration of this, when the amount of shift (Ex−Ey) to the left necessary to align the digits exceeds the number of leading zeros, the mantissa corresponding to the smaller of the exponents is shifted to the right to align the digits. However, when there is a difference of 14 digits or more between the two inputs obtained by aligning digits, i.e., when there is no overlap at all, the result of an arithmetic operation can be obtained without actually performing the arithmetic operation. This is because the get_z arithmetic operation serves to obtain the upper-order digits of the result of an arithmetic operation. Namely, the one of the two inputs that has the greater value becomes the upper-order digit number when there is no overlap between the two inputs.

In order to check whether this condition is satisfied, (Ex−Lx)−(Ey−Ly) is calculated. Finding that the result of the calculation is 14 or larger warrants a determination that the above-noted condition is satisfied. A value of 14 is the number of digits of a mantissa in the format being used. In this example, the above-noted condition is satisfied, i.e., there is no overlap between a mantissa 261 and a mantissa 262. In this case, the mantissa 261 is passed to the next stage as the result of addition.

Further, a passed result 263 is normalized. That is, the addition result is shifted to the left by the count indicative of the number of leading zeros when the count indicative of the number of leading zeros is 1 or more, and is shifted to the right when a digit overflow exists. The shift to the left may result in the exponent being an odd number. In such a case, the amount of shift to the left is decreased by one. The shift to the right may also result in the exponent being an odd number. In such a case, the amount of shift to the right is decreased by one. The exponent is adjusted in accordance with the amount of shift to the right or to the left. In the case of a shift to the left, the exponent is decreased by the amount of shift to the left. In the case of a shift to the right, the exponent is increased by the amount of shift to the right. In this specific example, a shift to the left by three digits may be necessary. With such a shift, however, the exponent changes from "16" to "13", which is an odd number. The amount of shift to the left is thus decreased by "1" to become "2", so that the exponent changes from "16" to "14". The result of normalization obtained in this manner is output as the result of an arithmetic operation inclusive of the mantissa 264 and the corresponding exponent Ez.

Figures 28A, 28B:
FIGS. 28A and 28B are drawings illustrating examples of an addition operation in a case where the absolute values of two inputs are separated by more than the number of digits of the format being used.

It may be noted that zz represents a remainder that is left unexpressed by the fixed precision during the addition operation. In the case of a multiplication operation, an instruction to output zz is generally used. In the case of multiplication, z and zz are values whose digits are consecutive to each other. In the case of addition, however, z and zz are not the values whose digits are consecutive to each other when the absolute values of two inputs are separated by more than the number of digits of the format being used. FIG. 28A illustrates an example of an addition operation in a case where the absolute values of two inputs are separated by more than the number of digits of the format being used. In this first case, z and zz may be output by performing an arithmetic operation according to the normal operation procedure. However, the absence of an overlap between these values may be utilized so that the one having the smaller absolute value can be used as zz without performing any arithmetic operation. This makes it possible to easily produce zz.

In the case of multiplication, further, the signs of the inputs do not affect the value of the mantissa in the result of an arithmetic operation. There is thus no need to consider the signs when obtaining zz. In the case of addition, however, a special operation may need to be performed in the addition of two numbers having different signs (i.e., the subtraction of two numbers having the same sign) when the absolute values of two inputs are separated as described above. FIG. 28B illustrates an example of addition of two values having different signs in a case where the absolute values of two inputs are separated from each other. In this second case, the use of the normal operation procedure results in a non-zero value being generated due to digit borrow as illustrated as "A" in FIG. 28B at the digits that are originally filled with zeros between the two inputs. As a result, the precision required to represent zz increases by a number equal to the number of digits between the two inputs. In this second case, therefore, an arrangement is made to output the one having the smaller absolute value as zz in the same manner as in the case 1 described above, without performing the arithmetic operation according to the normal operation procedure.

In this manner, the outputting of zz in the case of addition involves considering cases that are not considered in the case of multiplication. The circuit configuration in the case of addition is thus different from the zz output circuit used in the case of multiplication in that some modifications are made such as adding a bypass circuit.

Figure 29:
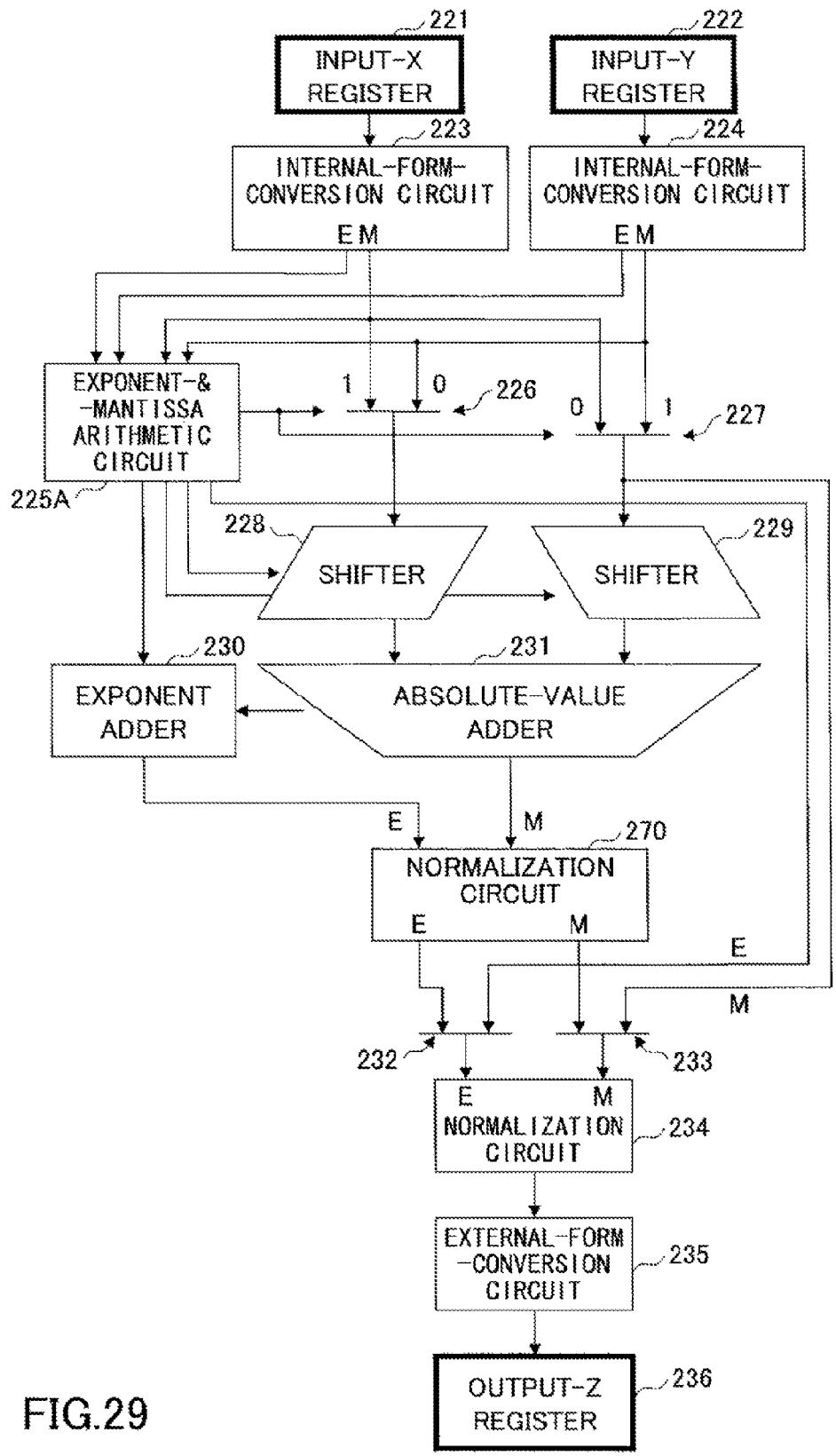
FIG. 29 is a drawing illustrating an example of the configuration of a circuit that performs a get_zz arithmetic operation.

FIG. 29 is a drawing illustrating an example of the configuration of a circuit that performs the get_zz arithmetic operation. The arithmetic device illustrated in FIG. 29 corresponds to part of the arithmetic circuit 119 illustrated in FIG. 11. In FIG. 29, the same or corresponding elements as those of FIG. 24 are referred to by the same or corresponding numerals. The arithmetic device illustrated in FIG. 29 includes an input-X register 221, an input-Y register 222, internal-form-conversion circuits 223 and 224, an exponent-&-mantissa arithmetic circuit 225A, selectors 226 and 227, shifters 228 and 229, an exponent adder 230, and an absolute-value adder 231. The arithmetic device further includes selectors 232 and 233, a normalization circuit 234, an external-form-conversion circuit 235, an output-Z register 236, and a normalization circuit 270.

Each of the internal-form-conversion circuits 223 and 224 divides an input into a sign, an exponent, and a mantissa, thereby converting the input value representation into an internal format. The sign, exponent, and mantissa of the input X are referred to as a sign-X, an exponent-X, and a mantissa-X, respectively. The sign, exponent, and mantissa of the input Y are referred to as a sign-Y, an exponent-Y, and a mantissa-Y, respectively.

The exponent-&-mantissa arithmetic circuit 225A receives the exponent-X and the exponent-Y as well as the mantissa-X and the mantissa-Y. The exponent-&-mantissa arithmetic circuit 225A compares the exponent-X and the exponent-Y in terms of their magnitudes. Based on the result of magnitude comparison, the exponent-&-mantissa arithmetic circuit 225A generates a select signal such that the mantissa (i.e., first mantissa) associated with the larger exponent is supplied to the shifter 228 and that the mantissa (i.e., second mantissa) associated with the smaller exponent is supplied to the shifter 229. The exponent-&-mantissa arithmetic circuit 225A compares the absolute value of a difference between the exponent-X and the exponent-Y with a count indicative of the number of leading zeros in the first mantissa. The exponent-&-mantissa arithmetic circuit 225A outputs the count indicative of the number of leading zeros in the first mantissa as the amount of shift to the left for the shifter 228 if the absolute value of a difference between the exponent-X and the exponent-Y is larger. The exponent-&-mantissa arithmetic circuit 225A outputs the absolute value of a difference between the exponent-X and the exponent-Y as the amount of shift to the left for the shifter 228 if the absolute value of a difference between the exponent-X and the exponent-Y is smaller.

The exponent-&-mantissa arithmetic circuit 225A compares the absolute value of a difference between the exponent-X and the exponent-Y with a count indicative of the number of leading zeros in the first mantissa. The exponent-&-mantissa arithmetic circuit 225A outputs the absolute value of a difference between the exponent-X and the exponent-Y minus the count indicative of the number of leading zeros in the first mantissa as the amount of shift to the right for the shifter 229 if the absolute value of a difference between the exponent-X and the exponent-Y is larger. The exponent-&-mantissa arithmetic circuit 225A outputs zero as the amount of shift to the right for the shifter 229 if the absolute value of a difference between the exponent-X and the exponent-Y is smaller. The exponent-&-mantissa arithmetic circuit 225A further outputs as an exponent the smaller exponent plus the above-noted amount of shift to the right.

The exponent-&-mantissa arithmetic circuit 225A further checks whether the absolute value of {(exponent-X–the count indicative of the number of leading zeros in mantissa-X)–(exponent-Y–the count indicative of the number of leading zeros in mantissa-Y)} is larger than or equal to 14. If this absolute value is larger than or equal to 14, the exponent-&-mantissa arithmetic circuit 225A generates a select signal such that the second mantissa and the exponent corresponding thereto are selected by the selectors 232 and 233, respectively. As a result, in the case of the absolute value of {(exponent-X–the count indicative of the number of leading zeros in mantissa-X)–(exponent-Y–the count indicative of the number of leading zeros in mantissa-Y)} is larger than or equal to 14 that is the number of digits of the format being used, the second mantissa is supplied to the normalization circuit 234 by bypassing the shifter 228 and the absolute-value adder 231.

The shifter 228 shifts the supplied mantissa to the left according to the specified amount of shift. The shifter 229 shifts the supplied mantissa to the right according to the specified amount of shift. The results of shifts by these shifters are input into the absolute-value adder 231.

In the case of subtraction, one of the mantissas is inverted, and a carry is input into the absolute-value adder 231. When a digit overflow is detected as a result of addition performed by the absolute-value adder 231, a value that is shifted to the right by one digit is output. At the same time, a carry is supplied from the absolute-value adder 231 to the exponent adder 230, so that the supplied carry is added to the exponent.

When a digit underflow is detected as a result of addition performed by the absolute-value adder 231, a value that is shifted to the left by one digit is output. At the same time, a signal indicative of digit underflow is supplied from the absolute-value adder 231 to the exponent adder 230, so that subtraction is performed with respect to the exponent.

The normalization circuit 270 receives the result of addition and the result of an exponent arithmetic, and outputs a normalized exponent and mantissa.

The selectors 232 and 233 select the normalized exponent and mantissa, respectively, or select the exponent corresponding to the second mantissa and the second mantissa, respectively, depending on the select signal generated by the exponent-&-mantissa arithmetic circuit 225A. The normalization circuit 234 receives the exponent and the mantissa selected by the selectors 232 and 233, respectively, and outputs a normalized arithmetic result. The external-form-conversion circuit 235 converts the normalized arithmetic result into an external format for provision to the output-Z register 236.

FIG. 30 is a drawing illustrating a specific example of the get_zz arithmetic operation. In FIG. 30, the exponent of the input X is denoted as Ex, the exponent of the input Y denoted as Ey, the count indicative of the number of leading zeros in the input X denoted as Lx, and the exponent of the output Z denoted as Ez. The arithmetic operation performed in this example is a get_zz arithmetic operation 280 illustrated in FIG. 30. In order to maintain as high arithmetic precision as possible, a mantissa corresponding to the greater of the exponents is shifted to the left to align the digits. Shift to the left by the number of digits larger than the number of leading zeros results in the higher-order digits being lost. In consideration of this, when the amount of shift (Ex−Ey) to the left necessary to align the digits exceeds the number of leading zeros, the mantissa corresponding to the smaller of the exponents is shifted to the right to align the digits. To this end, Ex−Ey is calculated, the result of which is compared with Lx. In the example illustrated in FIG. 30, Lx is larger. Namely, the amount of shift Ex−Ey to left is within the number of leading zeros, so that only a mantissa 281 of the input X is shifted to the left. A mantissa 282 of the input Y is not shifted to the right. The amount of shift to the left is Ex−Ey, and the amount of shift to the right is 0.

The numbers whose digits are aligned as described above, i.e., a mantissa 283 obtained by shifting the mantissa 281 to the left and a mantissa 284 unchanged from the mantissa 282, are added together. Further, an addition result 285 is normalized. That is, the addition result is shifted to the left by the count indicative of the number of leading zeros when the count is 1 or more, and is shifted to the right when a digit overflow exists. The shift to the left may result in the exponent being an odd number. In such a case, the amount of shift to the left is decreased by one. The shift to the right may also result in the exponent being an odd number. In such a case, the amount of shift to the right is decreased by one. The exponent is adjusted in accordance with the amount of shift to the right or to the left. In the case of a shift to the left, the exponent is decreased by the amount of shift to the left. In the case of a shift to the right, the exponent is increased by the amount of shift to the right. In this specific example, a shift to the left by one digit may be necessary. With such a shift, however, the exponent changes from "0" to "1", which is an odd number. The amount of shift to the left is thus decreased by "1" to become "0", so that the exponent remains to be "0".

Subsequently, lower-order digits 286 of the normalized result are selected. When the number of digits in the mantissa of the input format is 14, digits from the most significant digit are treated as the upper-order digits, with the remaining digits from the 15-th digit position and onwards being treated as lower-order digits, With the selection of the lower-order digits, the exponent is decreased by 14. In this specific example, zeros are selected as the lower-order digits.

Further, selected lower-order digits 287 are normalized. Since the data of interest is zero in this example, the exponent and the mantissa existing prior to the normalization are output as they are, and serve as the result of normalization. The result of normalization is output as the result of an arithmetic operation inclusive of the mantissa 288 and the corresponding exponent Ez.

FIG. 31 is a drawing illustrating another specific example of the get_zz arithmetic operation. The arithmetic operation performed in this example is a get_zz arithmetic operation 290 illustrated in FIG. 31. In order to maintain as high arithmetic precision as possible, a mantissa corresponding to the greater of the exponents is shifted to the left to align the digits. Shift to the left by the number of digits larger than the number of leading zeros results in the higher-order digits being lost, which is impossible. In consideration of this, when the amount of shift (Ex−Ey) to the left necessary to align the digits exceeds the number of leading zeros, the mantissa corresponding to the smaller of the exponents is shifted to the right to align the digits. To this end, Ex−Ey is calculated, the result of which is compared with Lx. In the example illustrated in FIG. 31, Lx is smaller. That is, the amount of shift Ex−Ey to the left is not within the number of leading zeros. Accordingly, an exponent 291 of the input X is shifted to the left by Lx, and an exponent 292 of the input Y is shifted to the right by the number of digits equal to a difference between the actual left shift amount and the contemplated left shift amount. In this case, the amount of shift to the left is Lx, and the amount of shift to the right is (Ex−Ey)−Lx.

The numbers whose digits are aligned as described above, i.e., a mantissa 293 obtained by shifting the mantissa 291 to the left and a mantissa 294 obtained by shifting the mantissa 292 to the right, are added together. In so doing, the digits that are overflowed by the shift to the right are kept.

Further, an addition result 295 is normalized. That is, the addition result is shifted to the left by the count indicative of the number of leading zeros when the count is 1 or more, and is shifted to the right when a digit overflow exists. The shift to the left may result in the exponent being an odd number. In such a case, the amount of shift to the left is decreased by one. The shift to the right may also result in the exponent being an odd number. In such a case, the amount of shift to the right is decreased by one. The exponent is adjusted in accordance with the amount of shift to the right or to the left. In the case of a shift to the left, the exponent is decreased by the amount of shift to the left. In the case of a shift to the right, the exponent is increased by the amount of shift to the right. In this specific example, a shift to the right by one digit may be necessary. With such a shift, however, the exponent Ez changes from "2" to "3", which is an odd number. The amount of shift to the right is thus increased by "1" to make the exponent equal to "4", so that the exponent changes from "2" to "4".

Subsequently, lower-order digits 296 of the normalized result are selected. When the number of digits in the mantissa of the input format is 14, 14 digits from the most significant digit are treated as the upper-order digits, with the remaining digits from the 15-th digit position and onwards being treated as lower-order digits, With the selection of the lower-order digits, the exponent is decreased by 14.

Further, selected lower-order digits 297 are normalized. In this specific example, the mantissa is shifted to the left by two digits, and the exponent is changed from −10 to −12 through subtraction of 2. The result of normalization is output as the result of an arithmetic operation inclusive of the mantissa 298 and the corresponding exponent Ez.

FIG. 32 is a drawing illustrating yet another specific example of the get_zz arithmetic operation. The arithmetic operation performed in this example is a get_zz arithmetic operation 300 illustrated in FIG. 32. In order to maintain as high arithmetic precision as possible, a mantissa corresponding to the greater of the exponents is shifted to the left to align the digits. Shift to the left by the number of digits larger than the number of leading zeros results in the higher-order digits being lost. In consideration of this, when the amount of shift (Ex−Ey) to the left necessary to align the digits exceeds the number of leading zeros, the mantissa corresponding to the smaller of the exponents is shifted to the right to align the digits. However, when there is a difference of 14 digits or more between the two inputs obtained by aligning digits, i.e., when there is no overlap at all, the result of an arithmetic operation can be obtained without actually performing the arithmetic operation. This is because the get_zz arithmetic operation serves to obtain the lower-order digits of the result of an arithmetic operation. Namely, the one of the two inputs that has the smaller value becomes the lower-order digit number when there is no overlap between the two inputs.

In order to check whether this condition is satisfied, (Ex−Lx)−(Ey−Ly) is calculated. Finding that the result of the calculation is 14 or larger warrants a determination that the above-noted condition is satisfied. A value of 14 is the number of digits of a mantissa in the format being used. In this example, the above-noted condition is satisfied, i.e., there is no overlap between a mantissa 301 and a mantissa 302. In this case, the mantissa 302 is passed to the next stage as the result of addition.

Further, a passed result 303 is normalized. That is, the addition result is shifted to the left by the count indicative of the number of leading zeros when the count is 1 or more, and is shifted to the right when a digit overflow exists. The shift to the left may result in the exponent being an odd number. In such a case, the amount of shift to the left is decreased by one. The shift to the right may also result in the exponent being an odd number. In such a case, the amount of shift to the right is decreased by one. The exponent is adjusted in accordance with the amount of shift to the right or to the left. In the case of a shift to the left, the exponent is decreased by the amount of shift to the left. In the case of a shift to the right, the exponent is increased by the amount of shift to the right. In this specific example, a shift to the left by one digit may be necessary. With such a shift, however, the exponent changes from "0" to "−1", which is an odd number. The amount of shift to the left is thus decreased by "1" to become "0", so that the exponent remains to be "0". The result of normalization obtained in this manner is output as the result of an arithmetic operation inclusive of the mantissa 304 and the corresponding exponent Ez.

Figure 33:
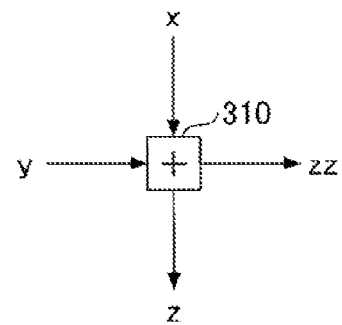
FIG. 33 is a drawing illustrating a circuit-diagram symbol for two_sum.

FIG. 33 is a drawing illustrating a circuit-diagram symbol for two_sum. The two_sum operation described above is frequently used in the calculation of triple-oraclenum64 numbers. This two_sum operation, i.e., the operation for obtaining z and zz for representing an accurate sum of x and y, is represented by use of an operator 310 illustrated in FIG. 33.

Figure 34:
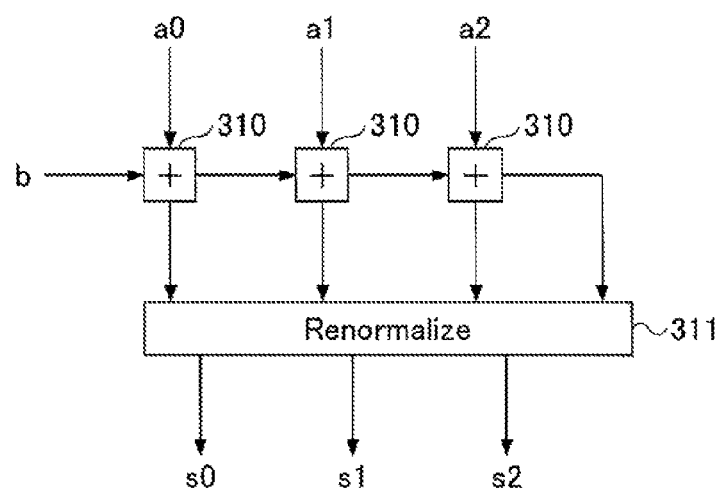
FIG. 34 is a drawing illustrating an example of the circuit that obtains the sum of an oraclenum64 number and triple-oraclenum64 numbers.

FIG. 34 is a drawing illustrating an example of the circuit that obtains the sum of an oraclenum64 number and triple-oraclenum64 numbers. The circuit illustrated in FIG. 34 includes three two_sum operators 310 and a renormalization unit 311. An input b is a single oraclenum64 number. Inputs a0, a1, and a2 are triple-oraclenum64 numbers. Outputs s0, s1, and s2 are also triple-oraclenum64 numbers. The circuit configuration as illustrated in FIG. 34 can obtain the sum of an oraclenum64 number and triple-oraclenum64 numbers. The arithmetic operation performed by the renormalization unit 311 will be described later.

FIG. 35 is a drawing illustrating an algorithm for obtaining the sum of two sets of triple-oraclenum64 numbers. The two_sum described above may be used to obtain the sum of two sets of triple-oraclenum64 numbers. Triple_Add illustrated in FIG. 35 obtains the sum of first triple-oraclenum64 numbers a0, a1, and a2 and second triple-oraclenum64 numbers b0, b1, and b2. This arithmetic operation is the same as the one that is disclosed in section A.2 of Non-Patent Document 2. Further, this is also similar to algorithm 13 and 14 disclosed in Non-Patent Document 3. The remaining ones of the four arithmetic operations can also be implemented by use of the methods disclosed in Non-Patent Documents 1 through 3.

In the following, renormalization of the result of calculation will be described. Renormalization is described on page 116 of Non-Patent Document 2, which is also referred to by Non-Patent Document 3. Here, renormalization disclosed in Non-Patent Document 2 is referred to as Priest's renormalization. The results (X0, X1, X2, X3) of an arithmetic operation prior to renormalization are generally arranged in the descending order of their absolute values. However, some digits may overlap. Further, X0 does not represent, in the fixed precision, the most significant part of X0+X1+X2+X3.

The results of renormalization performed on the arithmetic results (X0, X1, X2, X3) by use of Priest's renormalization are referred to as (a0, a1, a2) In this case, a0+a1+a2 is equal to X0+X1+X2+X3 within the range of triple, and also satisfies the following conditions.

$$|a0| \geq |a1| \geq |a2|$$

$$E(i+1) \leq Ei-14$$

Here, Ei is the exponent of the element a1 when the radix is 10. Since the precision of oraclenum64 is 14 decimal digits, the second condition denoted above requires that the elements do not overlap.

Figure 36:
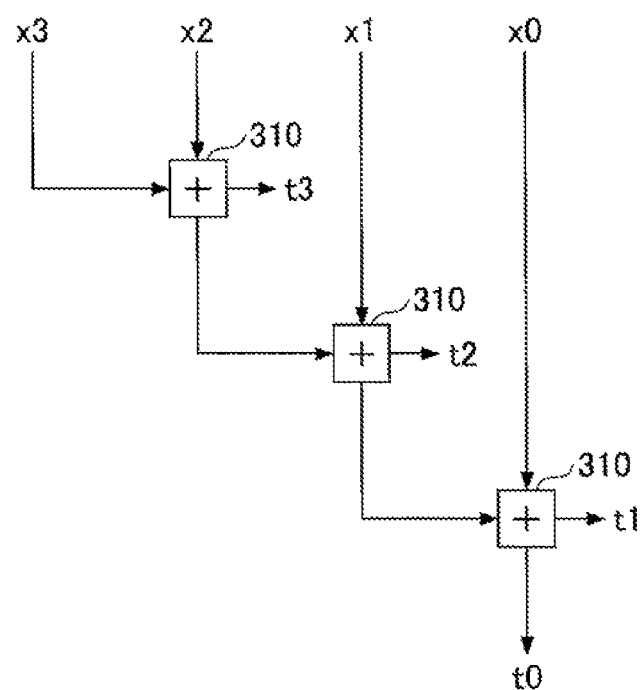
FIG. 36 is a drawing illustrating connections between three two_sum operators for removing overlaps.

The two_sum operation previously described is used in Priest's renormalization. In order to remove overlaps, the three two_sum operators 310 connected as illustrated in FIG. 36 are used. Results (t0, t1, t2, t3) obtained in this manner do not overlap, and are arranged in the descending order of their absolute values, except for an element that is zero. These obtained results may be successively accumulated with t0 first, thereby producing (a0, a1, a2). The two_sum operation is also used in the arithmetic operation "accumulate" for performing such successive accumulation.

In general, the results (X0, X1, X2, X3) of an arithmetic operation prior to renormalization do not have the same sign, so that (a0, a1, a2) obtained by successively performing two_sum as previously described do not have the same sign. In consideration of this, when all the numbers included in a set of fixed-precision floating-point numbers obtained by Priest's renormalization have the same sign, such renormalization is referred to as sign-matched Priest's renormalization.

In the present disclosures, stronger normalization that imposes stricter conditions than Priest's renormalization imposes is used. Strongly normalized set (b0, b1, b2) satisfies the following conditions. It may be noted that strong renormalization may create a case in which b1=0 and b2≠0, so that a condition of |b0|≥|b1|≥|b2| may not be generally satisfied.

$$E(i+1) = Ei-14$$

b0, b1, b2: all have the same sign.

The use of such strong normalization ensures that a difference between the exponents of elements is equal to the precision (i.e., the number of digits) of fixed-point numbers. Because of this, it is easy to convert a strongly normalized set into the original Oracle-number expression.

In the following, a description will be first given of a process of obtaining a number set (a0, a1, a2, . . . ) normalized by sign-matched Priest's renormalization from a number set (t0, t1, t2, . . . ) illustrated in FIG. 36 that do not overlap and that are arranged in the descending order of their absolute values, except for zeros. Here, fl_truncate(X+Y) indicates an arithmetic operation that truncates the sum of fixed-precision floating-point numbers X and Y to the significant digits thereof. Further, two_sum(X, Y) indicates an arithmetic operation that obtains two numbers whose significant digits do not overlap as was previously described. In the example described here, all the arithmetic operations performed in the two_sum operation are subjected to rounding to the nearest with 5 being rounded up and 4 being rounded down.

$$a0 = fl\_truncate(t0+t1)$$

$$(z0, zz0) = two\_sum(t0, t1)$$

In the case of zz0=0, t2, t3, . . . are successively accumulated until zz0≠0 is satisfied as described below.

$$a0 = fl\_truncate(a0+t2)$$

$$(z0, zz0) = two\_sum(a0, t2)$$

If zz0 is still equal to 0 even after accumulating all the numbers of the input number set (t0, t1, t2, . . . ), the procedure comes to an end. In the following, the procedure performed after zz0≠0 is satisfied will be described.

$$w0 = fl\_truncate(z0-a0)$$

Due to the characteristics of the two_sum operation, the following is satisfied.

$$t0+t1+\ldots+ti = z0+zz0 = a0+w0+zz0$$

Here, t0, t1, . . . , ti are numbers accumulated until zz0≠0 is satisfied. In this case, a0 and (w0+zz0) are the same sign, and do not have any overlapping significant digit as described in the following.

(i) In the case of w0=0, zz0 is equal to the value discarded by fl_truncate(t0+t1+ . . . +ti), so that a0 and (w0+zz0) are the same sign, and do not have any overlapping significant digit.

(ii) In the case of w0≠0, w0 is a number that is the same sign as a0 and that has "1" only at the least significant one of the significant digits of a0. Further, the absolute value of zz0 is smaller than the absolute value of w0, and zz0 and w0 have different signs. Accordingly, a0 and (w0+zz0) are the same sign, and do not have any overlapping significant digit.

Subsequently, the same procedure is performed with respect to (w0, zz0, ti+1, . . . ), thereby successively obtaining a1, a2, and so on. By doing so, a1, a2, . . . will have the same sign as described in above-noted (i) and (ii).

FIG. 37 is a drawing illustrating an example of sign-matched Priest's renormalization. In this example, a fixed-precision floating-point number is comprised of 4 decimal digits for the sake of simplicity, and rounding used in the two_sum operation is rounding to the nearest with 5 being rounded up and 4 being rounded down. In FIG. 37, (t0, t1, t2, t3) do not overlap, and are arranged in the descending order of their absolute values, except for an element that is zero. These values may be successively accumulated with t0 first, thereby producing a number set (a0, a1, a2) normalized by sign-matched Priest's renormalization.

FIG. 38 is a drawing illustrating an example of calculation that produces a set of strongly-normalized numbers from the number set normalized by sign-matched Priest's renormalization. In order to achieve strong normalization, it suffices to properly quantize the second and subsequent elements in the number set normalized by sign-matched Priest's renormalization. In the example illustrated in FIG. 38, a fixed-precision floating-point number is comprised of 4 decimal digits for the sake of simplicity. As illustrated in FIG. 38, a set of strongly-normalized numbers (b0, b1, b2) is obtained from the number set (a0, a1, a2) normalized by sign-matched Priest's renormalization.

Figure 39:
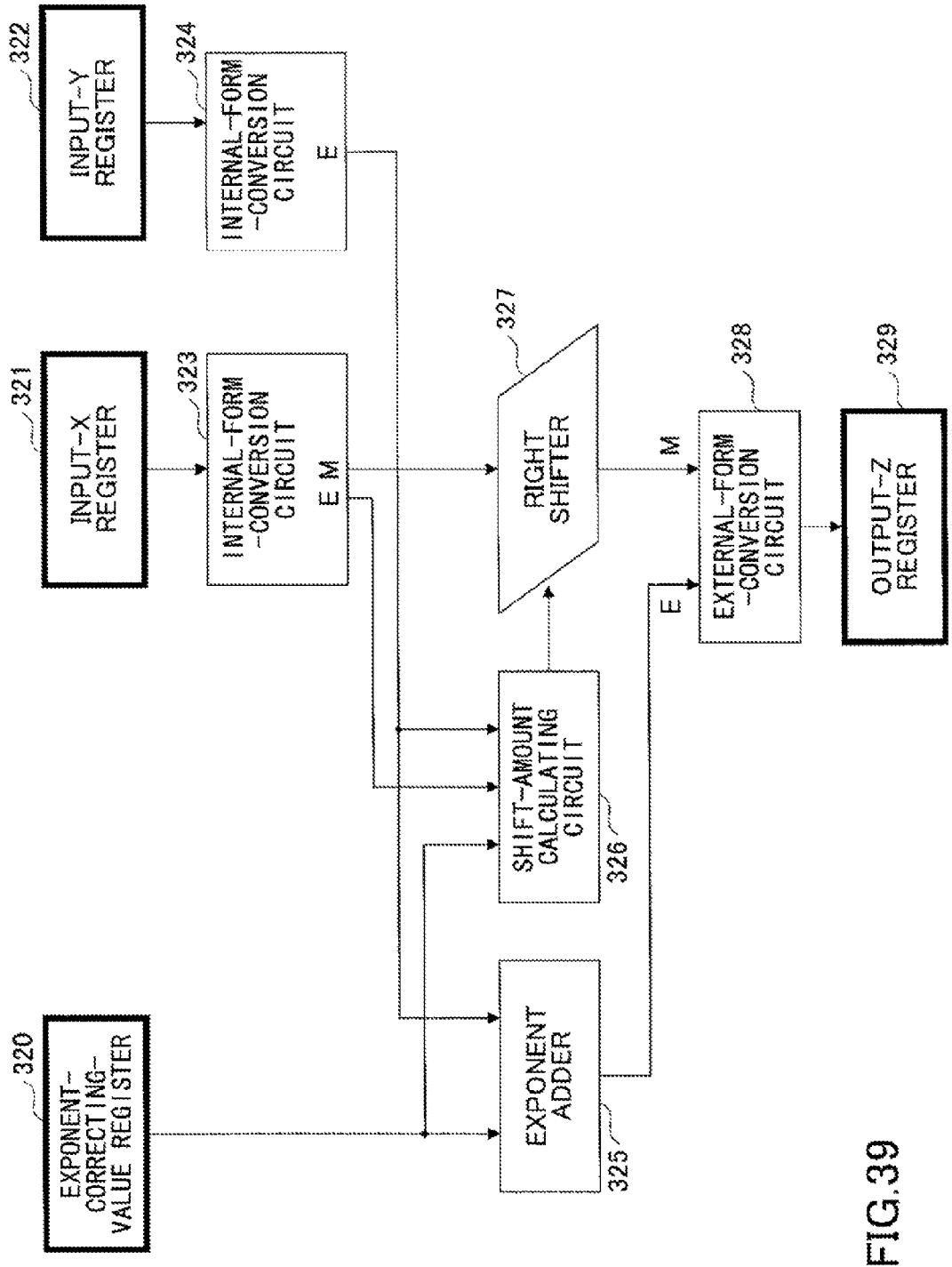
FIG. 39 is a drawing illustrating an example of the configuration of circuit that performs a scale_next(X, Y) operation for performing quantization.

FIG. 39 is a drawing illustrating an example of the configuration of circuit that performs a scale_next(X, Y) operation for performing quantization. The circuit illustrated in FIG. 39 includes an exponent-correcting-value register 320, an input-X register 321, an input-Y register 322, internal-form-conversion circuits 323 and 324, an exponent adder 325, a shift-amount calculating circuit 326, a right shifter 327, an external-form-conversion circuit 328, and an output-Z register 329. Data input into this circuit is assumed to satisfy the following condition.

$$\text{Exponent-}Y \geq \text{Exponent-}X + t$$

Here, t is the number of digits of an oraclenum64 number. In this example, t may be 14.

Each of the internal-form-conversion circuits 323 and 324 divides an input into an exponent and a mantissa, thereby converting the input value representation into an internal format. The exponent and mantissa of the input X are referred to as an exponent-X and a mantissa-X, respectively. The exponent of the input Y is denoted as an exponent-Y. The exponent-correcting-value register 320 stores therein a predetermined fixed value t. Instead of using a register for storing this value, this fixed value may be set by use of wired logic.

The shift-amount calculating circuit 326 receives the exponent-X, the exponent-Y, and the fixed value t. The shift-amount calculating circuit 326 outputs the result of the arithmetic operation "exponent-Y−exponent-X−t" as the amount of shift. The right shifter 327 receives the amount of shift and the mantissa-X to output the value obtained by shifting the mantissa-X to the right by the amount of shift. Shifted-out digits are discarded.

The exponent adder 325 receives the exponent-Y and the fixed value t to output the result of the arithmetic operation "exponent-Y−t". The external-form-conversion circuit 328 converts the exponent from the exponent adder 325 and the mantissa from the right shifter 327 into an external format for provision to the output-Z register 329.

Figure 40:
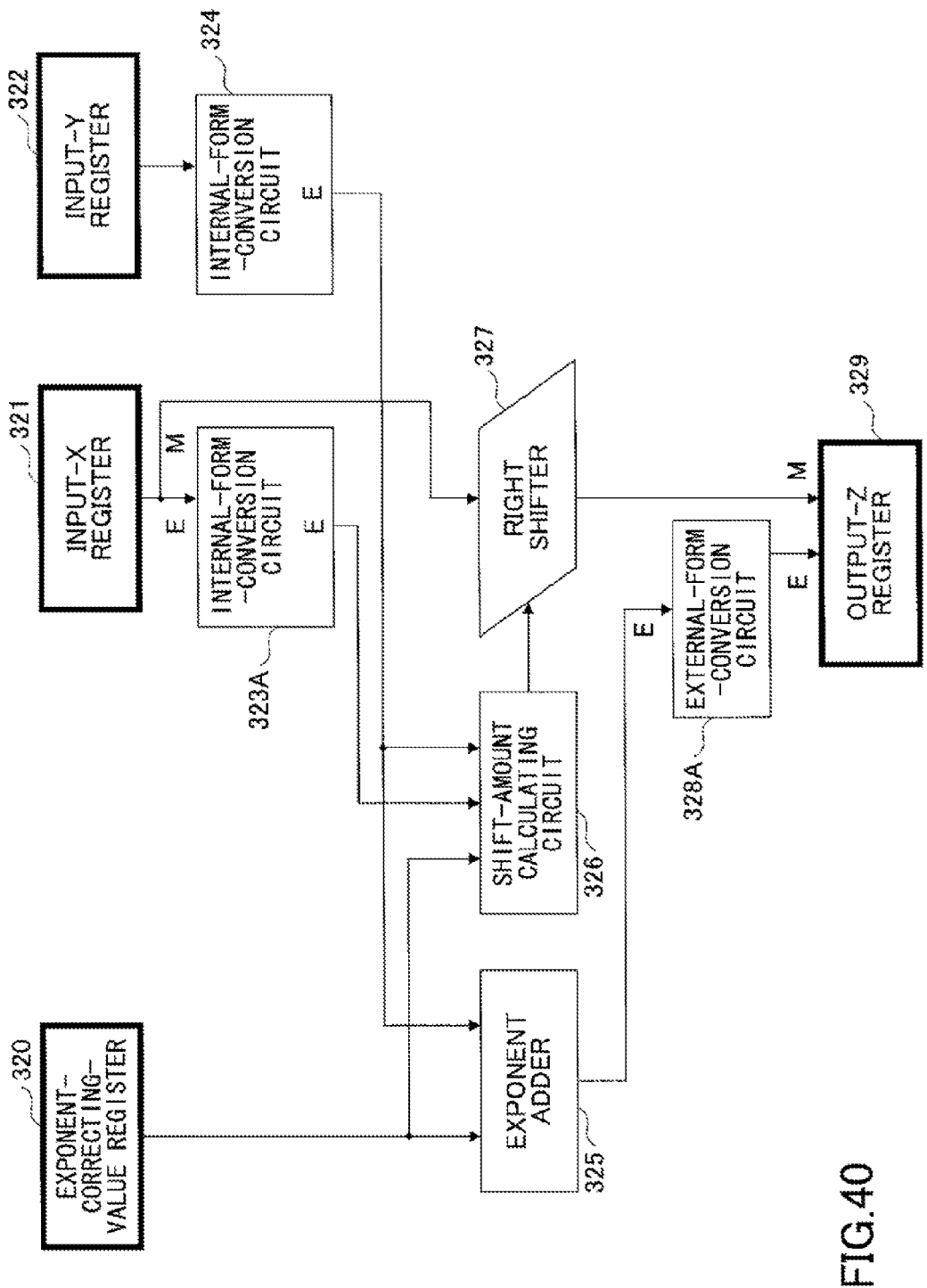
FIG. 40 is a drawing illustrating an example of the configuration of a circuit that performs a scale_next operation without converting a mantissa into an internal format.

FIG. 40 is a drawing illustrating an example of the configuration of a circuit that performs the scale_next operation without converting a mantissa into the internal format. In FIG. 40, the same elements as those of FIG. 39 are referred to by the same or similar numerals, and a description thereof will be omitted as appropriate. In FIG. 40, an internal-form-conversion circuit 323A is provided in place of the internal-form-conversion circuit 323, and an external-form-conversion circuit 328A is provided in place of the external-form-conversion circuit 328. In the case of the input data being provided in the oraclenum64 format, the right shifter performs an 8-bit shift for a shift amount of 2.

Each of the internal-form-conversion circuits 323A and 324 divides an input into an exponent and a mantissa, thereby converting the input value representation into an internal format. The exponent of the input X is denoted as an exponent-X. The exponent of the input Y is denoted as an exponent-Y. The exponent-correcting-value register 320 stores therein a predetermined fixed value t. Instead of using a register for storing a value to set a correction value as in this example, the mechanism for indicating an exponent correction value may be a wired logic circuit for setting the fixed value.

The shift-amount calculating circuit 326 receives the exponent-X, the exponent-Y, and the fixed value t. The shift-amount calculating circuit 326 outputs the result of the arithmetic operation "exponent-Y−exponent-X−t" as the amount of shift. The right shifter 327 receives the amount of shift and the mantissa-X to output the value obtained by shifting the mantissa-X to the right by the amount of shift. Shifted-out digits are discarded.

The exponent adder 325 receives the exponent-Y and the fixed value t to output the result of the arithmetic operation "exponent-Y−t". The external-form-conversion circuit 328A converts the exponent from the exponent adder 325 into an external format for provision to the output-Z register 329. The left-shifted mantissa output from the right shifter 327 is supplied to the output-Z register 329 as it is.

In the following, a description will be given of rounding of the triple-oraclenum64 format. A set of triple-oraclenum64 numbers (a0, a1, a2) that is subjected to rounding is assumed to be renormalized. In this assumption, renormalization may be either sign-matched Priest's renormalization or the strong renormalization.

FIG. 41 is a drawing illustrating a table demonstrating three types of methods for specifying NUMBER-type precision in the Oracle-Database. Here, rounding to the nearest with 5 being rounded up and being rounded down is used. In the case of the result of calculation being 1234.56, for example, the result of rounding for NUMBER(4), NUMBER (4, −2), and NUMBER(4, 1) will be as follows.

NUMBER(4)→1234
NUMBER(4, −2)→1200
NUMBER(4, 1)→error

The reason why the last example produces an error is because "1234.6" that is obtained by rounding the result of calculation "1234.56" off to one decimal place is not accommodated within the limit of the 4-digit precision.

In respect of the triple-oraclenum64 format, it is preferable to achieve such a rounding operation in an efficient manner and with the provision of error detection. An arithmetic device that can be used here is the type that receives operands each having a length of 8 bytes as two inputs, and that outputs a single value having a length of 8 bytes. Such an arithmetic device is assumed to be used in the rounding operation.

An arrangement is made to implement the rounding operation for triple-oraclenum64 numbers by use of three steps as follows:

1) generating a number that has "5" only at the digit position at which rounding occurs;
2) adding the generated number to triple-oraclenum64 numbers; and
3) truncating the results at a proper digit position.

A description will be first given of an algorithm for the first step. In the following, triple-oraclenum64 numbers to be rounded are referred to as (a0, a1, a2). The value of a0 that is the most significant element of this set is expressed as follows.

$$a0 = M * 100^e$$

Further, the arithmetic operation for obtaining "e" in the above equation is referred to as e(a0).

The first step will be implemented by use of different algorithms depending on the method of specifying precision. When no indication of precision is given (i.e., in the case of using NUMBER without any argument), rounding is performed such that the mantissa becomes 20 bytes or fewer.

In order to describe an algorithm in the case of precision being specified, it is convenient to express a0 by use of decimal expression. The following form is thus used.

$$a0 = M' * 10^{e'}$$

It is further assumed that the mantissa is normalized such that $10 > |M'| \geq 0$ is satisfied. Further, the arithmetic operation for obtaining e' is referred to as e'(a0).

FIGS. 42A through 42C are drawings illustrating examples of algorithms that generate a number having "5" only at the digit position at which rounding occurs. FIGS. 42A and 42B illustrate algorithms used when precision is specified by referring to decimal digit numbers. These two algorithms can each be implemented as an arithmetic device having two inputs and one output. FIG. 42C illustrates an algorithm used when a scale (i.e., relative position from the decimal point) is specified. Since a relative position from the decimal point is specified, this calculation is independent of a0. The algorithm illustrated in FIG. 42C may be implemented by creating a program calculating the mathematical formula illustrated in FIG. 42C. Alternatively, a table in which various values of "n" and values associated to these values are stored may be provided, and a program may be created to refer to the table by use of "n" as a key.

Whether a rounded result can be accommodated within the specified precision when a scale is specified can be determined as follows. In the case of NUMBER(p, s) being specified, two values p_d and p_s are calculated by using the above-noted algorithm for specified precision and the algorithm for a specified scale.

$$p\_d = \text{get\_comma5}(a0, \text{digits}=p)$$

$$p\_s = \text{get\_comma5}(\text{scale}=s)$$

When |p_d|>|p_s| is satisfied, i.e., when the absolute value of p_d is larger than the absolute value of p_s, this satisfied condition indicates that precision is not sufficient to express the result rounded by the specified scale.

In the second step, the number generated by the first step is added to the triple-oraclenum64 numbers. The algorithm illustrated FIG. 34 may be used to implement this addition.

In the third step, truncation is performed at a proper position. In this case again, the number "p" (which is either "p_d" or "p_s" corresponding to the respective precision specified cases) generated by the first step may be utilized. This number "p" is the number added for the purpose of rounding, and thus contains information indicative of the position of the digit at which rounding occurs. Accordingly, the arithmetic operation for truncating each element of the triple-oraclenum64 numbers can be defined by use of the element and "p" as two operand inputs.

With (b0, b1, b2) denoting the results of calculation in the second step, the results of rounding (c0, c1, c2) obtained in the third step are expressed as follows.

$$c0 = \text{truncate}(b0, p)$$

$$c1 = \text{truncate}(b1, p)$$

$$c2 = \text{truncate}(b2, p)$$

Figure 43:
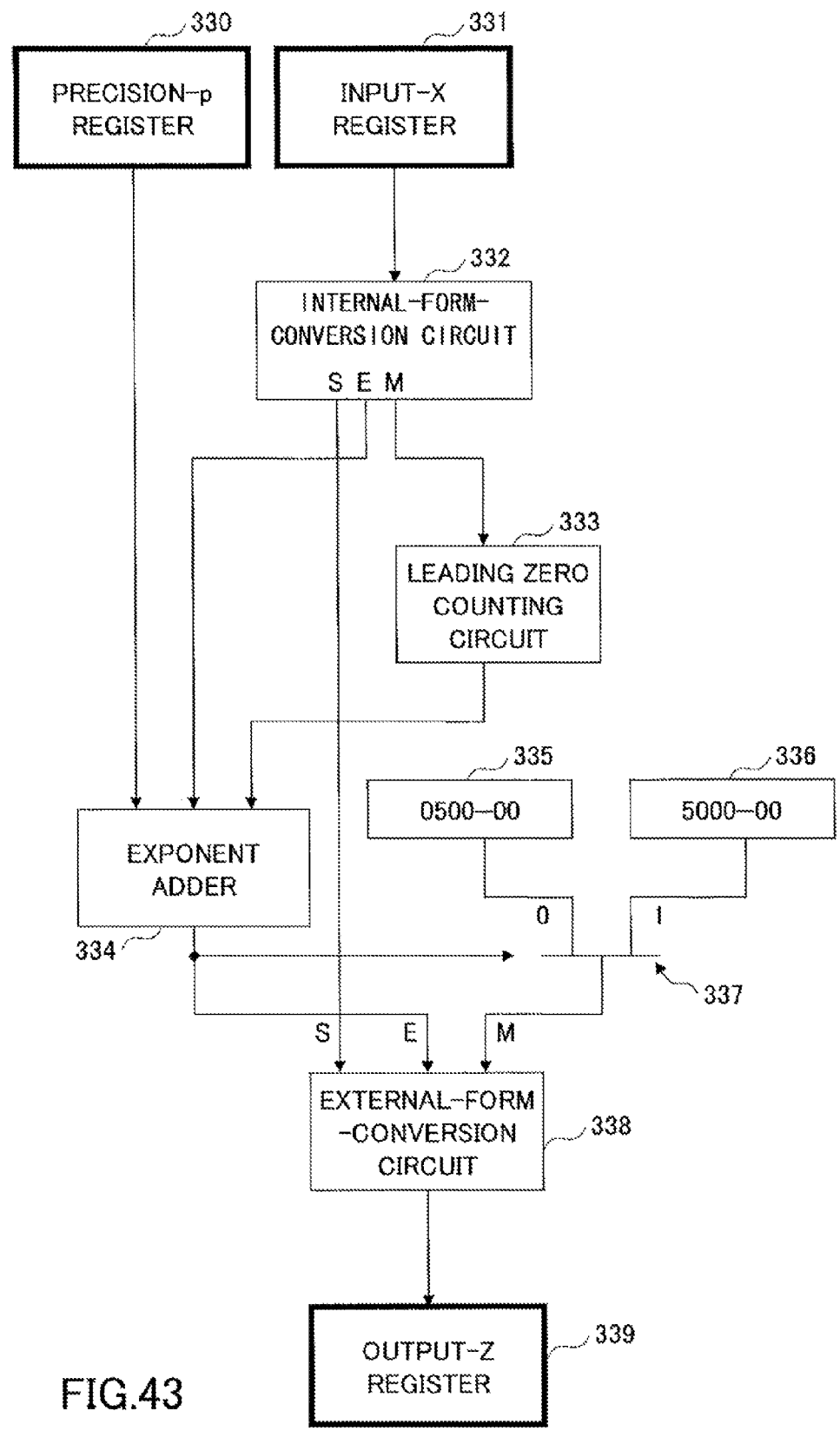
FIG. 43 is a drawing illustrating an example of the configuration of a circuit that performs a get_comma5 arithmetic operation.

FIG. 43 is a drawing showing an example of the configuration of a circuit that implements get_comma5 (precision). The circuit illustrated in FIG. 43 includes a precision-p register 330, an input-X register 331, an internal-form-conversion circuit 332, a leading zero counting circuit 333, an exponent adder 334, registers 335 and 336, a selector 337, an external-form-conversion circuit 338, and an output-Z register 339.

The internal-form-conversion circuit 332 divides an input into an exponent and a mantissa, thereby converting the input value representation into an internal format. The exponent and mantissa of the input X are referred to as an exponent-X and a mantissa-X, respectively. The leading zero counting circuit 333 receives the mantissa-X, and counts the number of leading zeros in the mantissa-X. The exponent adder 334 calculates "exponent-X+1−precision-p−the count indicative of the number of leading zeros". The selector 337 selects 5000-00 of the register 336 in the case of an output of the exponent adder 334 being an odd number, and selects 0500-00 of the register 335 in the case of an output of the exponent adder 334 being an even number.

The exponent supplied from the exponent adder 334 to the external-form-conversion circuit 338 has the most significant bit thereof being changed to zero in the case of an output of the exponent adder 334 being an odd number, and has the most significant bit thereof unchanged in the case of an output of the exponent adder 334 being an even number. The external-form-conversion circuit 338 converts the sign from the internal-form-conversion circuit 332, the exponent from the exponent adder 334, and the mantissa from the selector 337 into an external-format number for provision to the output-Z register 339.

Figure 44:
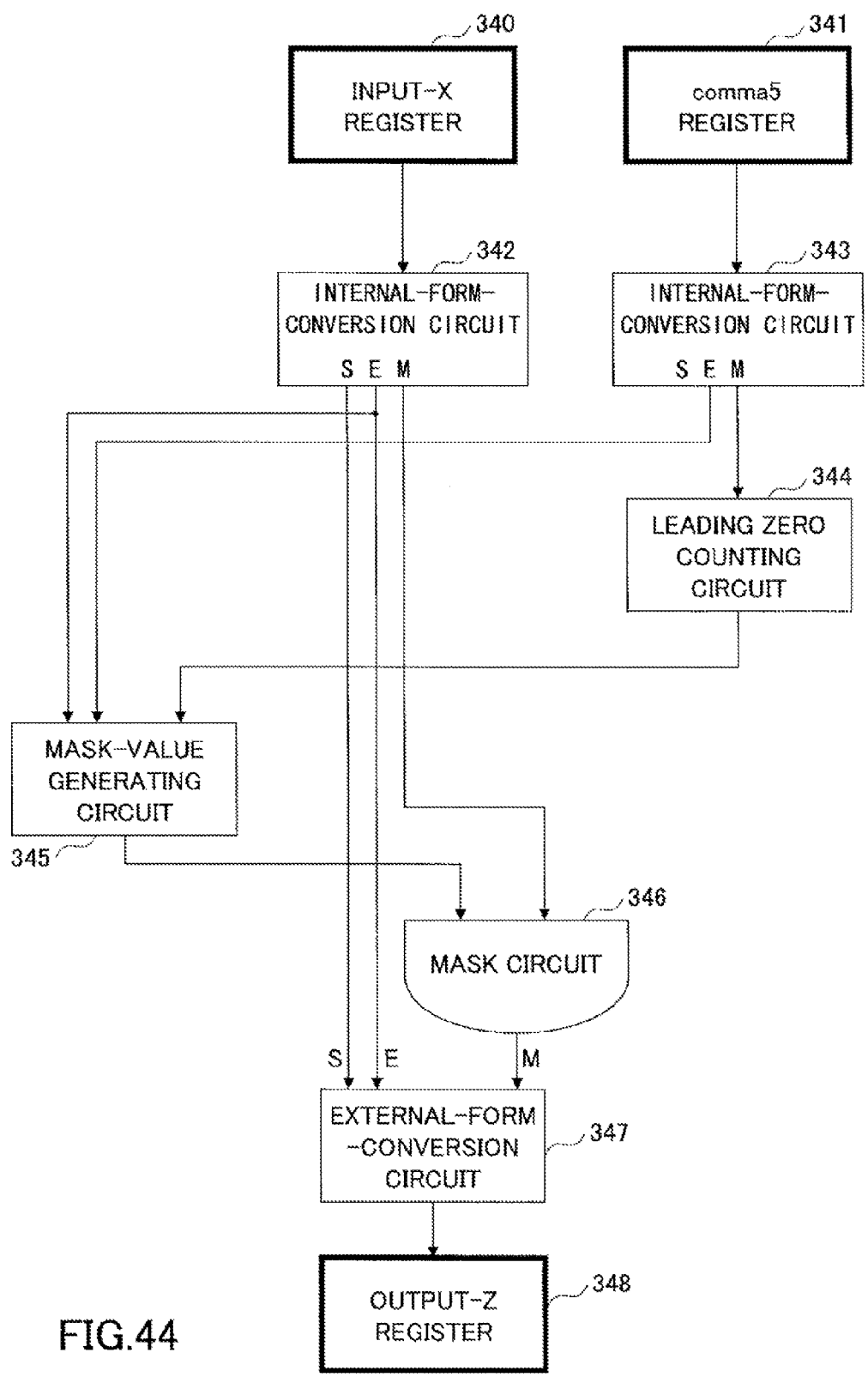
FIG. 44 is a drawing illustrating an example of the configuration of a circuit that performs a truncate operation.

FIG. 44 is a drawing illustrating an example of the configuration of a circuit that performs a truncate operation. The circuit illustrated in FIG. 44 includes an input-X register 340, a comma-5 register 341, internal-form-conversion circuits 342 and 343, a leading zero counting circuit 344, a mask-value generating circuit 345, a mask circuit 346, an external-form-conversion circuit 347, and an output-Z register 348.

Each of the internal-form-conversion circuits 342 and 343 divides an input into a sign, an exponent, and a mantissa, thereby converting the input value representation into an internal format. The sign, exponent, and mantissa of the input X are referred to as a sign-X, an exponent-X, and a mantissa-X, respectively. The exponent and mantissa of the input "comma5" are referred to as an exponent-c and a mantissa-c, respectively.

The leading zero counting circuit 344 receives the mantissa-c, and counts the number of leading zeros in the mantissa-c. The mask-value generating circuit 345 receives as inputs the exponent-X, the exponent-c, and the count indicative of the number of leading zeros in the mantissa-c, and generates mask data in response to these inputs. The mask circuit 346 masks the mantissa-X according to the mask data, thereby outputting a masked value as a mantissa. The external-form-conversion circuit 347 converts the sign-X and the exponent-X from the internal-form-conversion circuit 342 and the mantissa from the mask circuit 346 into an external-format number for provision to the output-Z register 348.

Figure 45:
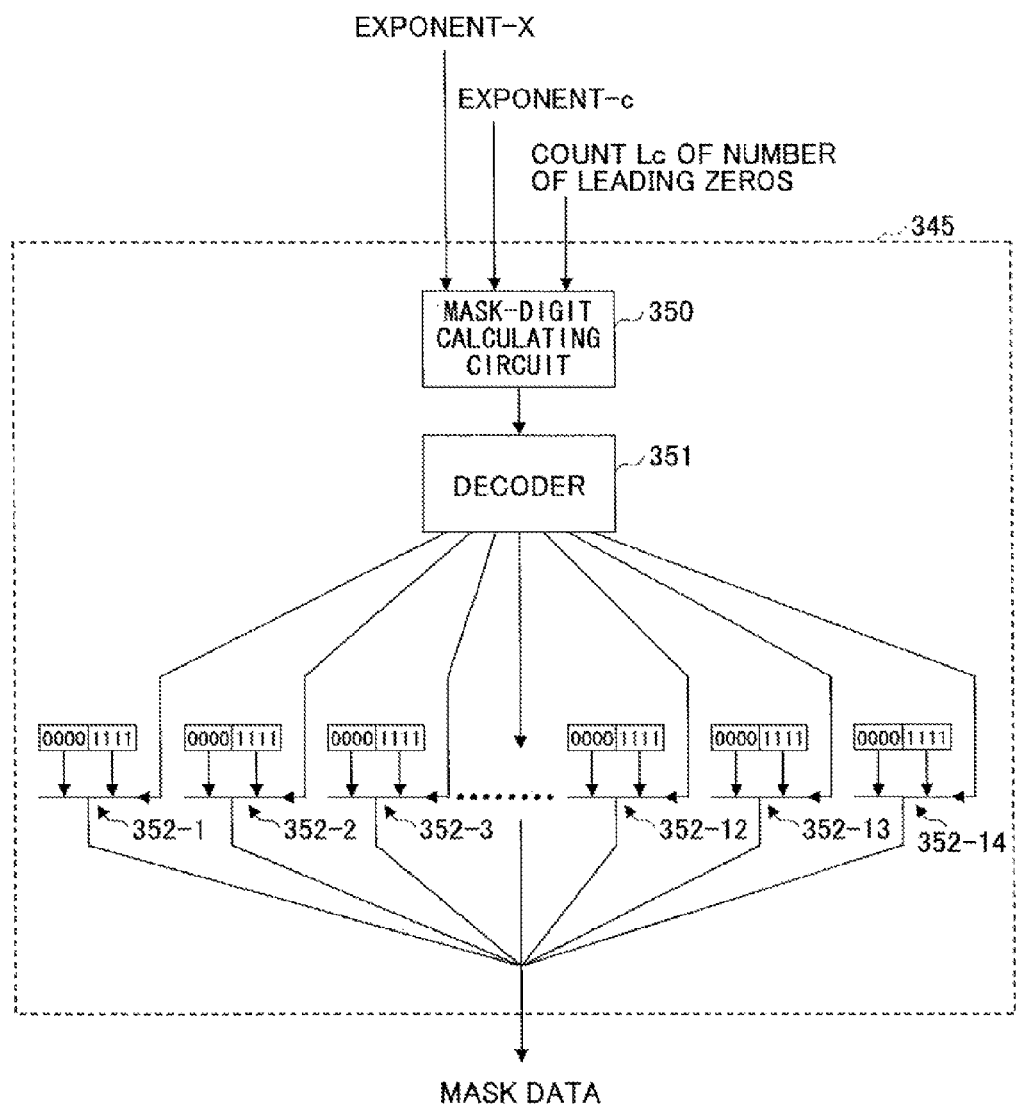
FIG. 45 is a drawing illustrating an example of the configuration of a mask-value generating circuit.

FIG. 45 is a drawing illustrating an example of the configuration of the mask-value generating circuit. The mask-value generating circuit 345 illustrated in FIG. 45 includes a mask-digit calculating circuit 350, a decoder 351, and selectors 352-1 through 352-14. The mask-digit calculating circuit 350 receives the exponent-X, the exponent-c, and a count Lc indicative of the number of leading zeros, and calculates a mask digit. The mask digit is obtained as 14+(exponent-c−Lc)−exponent-X when the number of digits in the mantissa of the format being used is 14. This value indicates how many digits from the least significant digit of the mask data are set to zero. Based on the result of mask-digit calculation, the decoder 351 generates digit-specific select signals The select signals generated by the decoder 351 are supplied to the selectors 352-1 through 352-14 corresponding to the respective 14 digits. In the case of the result of mask-digit calculation being "n", the select signals are generated such that "0000" is selected for the "n" digits from the least significant digit. In the case of the result of mask-digit calculation being "0", the select signals are generated such that "1111" is selected for all the digits. In response to the select signals, the selectors 352-1 through 352-14 select either a "1111" bit string or a "0000" bit string, and outputs the selected bit string as the mask data.

Figure 46:
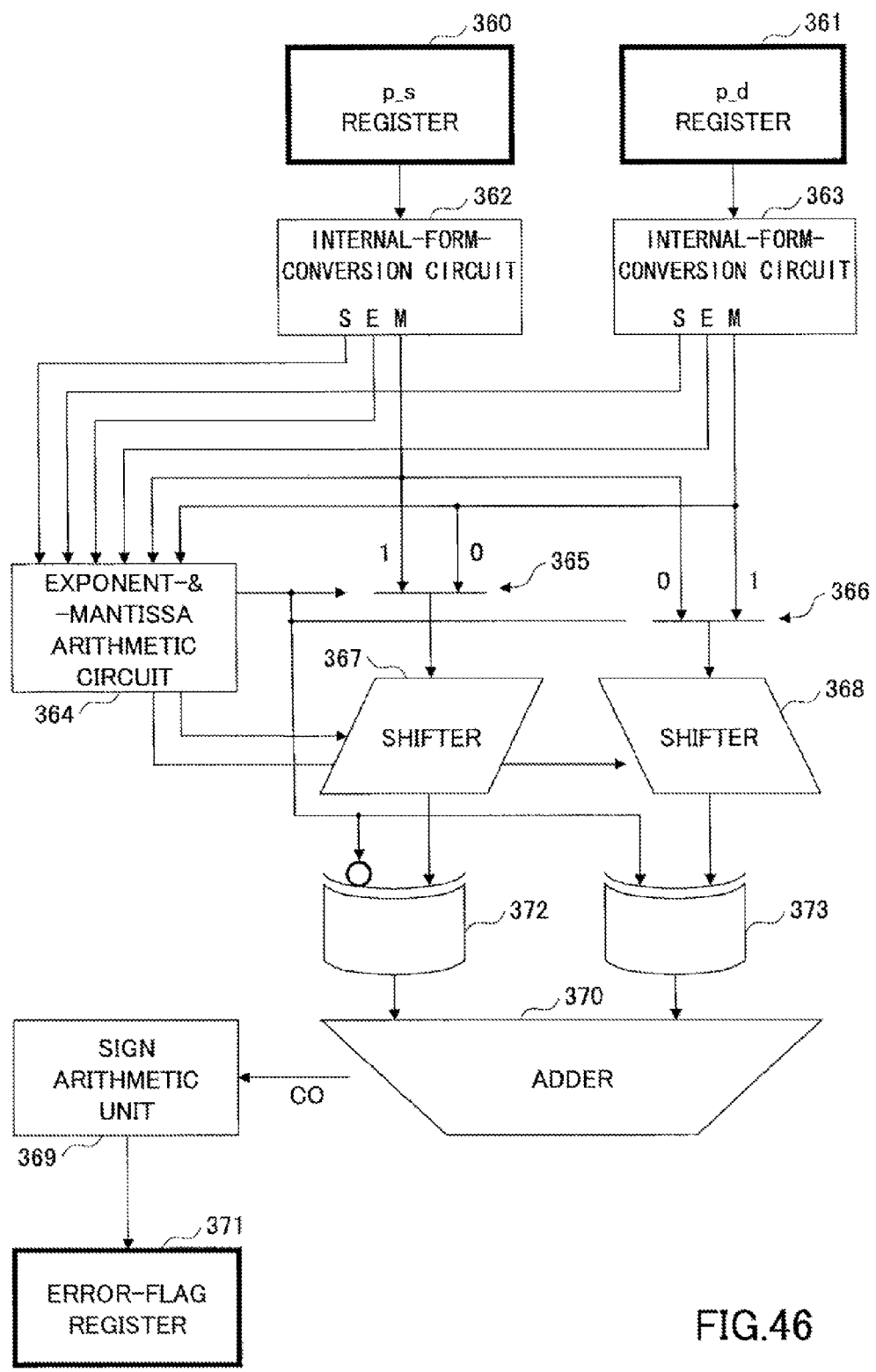
FIG. 46 is a drawing illustrating an example of the configuration of an absolute-value-comparison error check circuit for p_d and p_s.

FIG. 46 is a drawing illustrating an example of the configuration of an absolute-value-comparison error check circuit for p_d and p_s. This circuit includes a p_s register 360, a p_d register 361, internal-form-conversion circuit 362 and 363, an exponent-&-mantissa arithmetic circuit 364, selectors 365 and 366, shifters 367 and 368, a sign arithmetic unit 369, an adder 370, a complementer 372, a complementer 373, and an error-flag register 371.

Each of the internal-form-conversion circuits 362 and 363 divides an input into an exponent and a mantissa, thereby converting the input value representation into an internal format. The exponent and mantissa of the input "p_s" are referred to as an exponent-X and a mantissa-X, respectively. The exponent and mantissa of the input "p_d" are referred to as an exponent-Y and a mantissa-Y, respectively.

The exponent-&-mantissa arithmetic circuit 364 receives the exponent-X and the exponent-Y as well as the mantissa-X and the mantissa-Y. The exponent-&-mantissa arithmetic circuit 364 compares the exponent-X and the exponent-Y in terms of their magnitudes. Based on the result of magnitude comparison, the exponent-&-mantissa arithmetic circuit 364 generates a select signal such that the mantissa (i.e., first mantissa) associated with the larger exponent is supplied to the shifter 367 and that the mantissa (i.e., second mantissa) associated with the smaller exponent is supplied to the shifter 368. The exponent-&-mantissa arithmetic circuit 364 compares the absolute value of a difference between the exponent-X and the exponent-Y with a count indicative of the number of leading zeros in the first mantissa. The exponent-&-mantissa arithmetic circuit 364 outputs the latter as the amount of shift to the left for the shifter 367 if the former is larger. The exponent-&-mantissa arithmetic circuit 364 outputs the former as the amount of shift to the left for the shifter 367 if the former is smaller.

The exponent-&-mantissa arithmetic circuit 364 compares the absolute value of a difference between the exponent-X and the exponent-Y with a count indicative of the number of leading zeros in the first mantissa. The exponent-&-mantissa arithmetic circuit 364 outputs a value obtained by subtracting the latter from the former as the amount of shift to the right for the shifter 368 if the former is larger. The exponent-&-mantissa arithmetic circuit 364 outputs zero as the amount of shift to the right for the shifter 368 if the former is smaller.

The shifter 367 shifts the supplied mantissa to the left according to the specified amount of shift. The shifter 368 shifts the supplied mantissa to the right according to the specified amount of shift. The results of shifts by these shifters are input into the complementer 372 and the complementer 373.

The complementer 372 is an EOR circuit (i.e., exclusive-OR circuit) that compliments the supplied output of the left shifter by use of an inverse signal of the supplied select signal. The complementer 373 is an EOR circuit (i.e., exclusive-OR circuit) that compliments the supplied output of the right shifter by use of an inverse signal of the supplied select signal. The outputs of these complementers are input into the adder 370.

A carry is input into the adder 370, When a digit overflow is detected as a result of addition performed by the adder 370, a carry-out is supplied to the sign arithmetic unit 369.

The sign arithmetic unit 369 receives the carry-out from the adder 370. The sign arithmetic unit 369 sets an error flag equal to "1" when an inverse of the carry-out is "1". Otherwise the error flag is zero. The error flag generated by the sign arithmetic unit 369 is stored in the error-flag register 371.

Figures 47A, 47B:
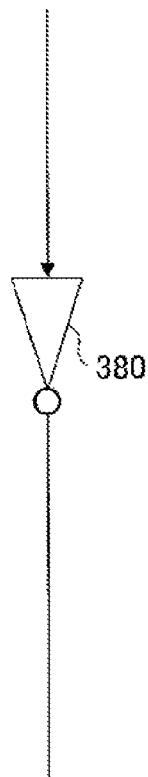
FIGS. 47A and 47B are drawings illustrating an example of the circuit configuration of a sign arithmetic unit.

FIGS. 47A and 47B are drawings illustrating an example of the circuit configuration of the sign arithmetic unit. The sign arithmetic unit illustrated in FIG. 47A includes an inverter 380. This circuit sets the error flag to "1" when an inverse of the carry-out is "1". The table illustrated in FIG. 47B indicates the magnitude relationships between the absolute values of "p_d" and "p_s" supplied to the absolute-value-comparison error check circuit for "p_d" and "p_s", and indicates two output signals associated thereto. Here, |p_d| is the absolute value of "p_d". The same applies in the case of "p_s".

FIG. 48 is a drawing illustrating an example of the arithmetic operation for obtaining the length of an Oracle-number. The length of an Oracle-number is obtained in order to store triple-oraclenum64 numbers, obtained as the results of the arithmetic operation previously described, as a single Oracle-number in memory. The procedure illustrated in FIG. 48 is performed to obtain the length of an Oracle-number. Here, length(aX) is an arithmetic operation that obtains the number of significant digits in an oraclenum64 number. The length of the Oracle-number becomes shorter when a2 is zero, and becomes even shorter when a1 is also zero.

In the case of strongly-renormalized triple-oraclenum64 numbers, a0, a1, and a2 represents respective parts that are 7 bytes, 7 bytes, and 6 bytes, respectively, into which the mantissa of an Oracle-number is divided. Basically, the mantissas of a0, a1, and a2 may simply be catenated together to obtain an Oracle-number. It may be noted, however, that when the lengths of a0 and a1 are shorter, an arrangement is made to store these values in memory after adding trailing zeros.

Figure 49:
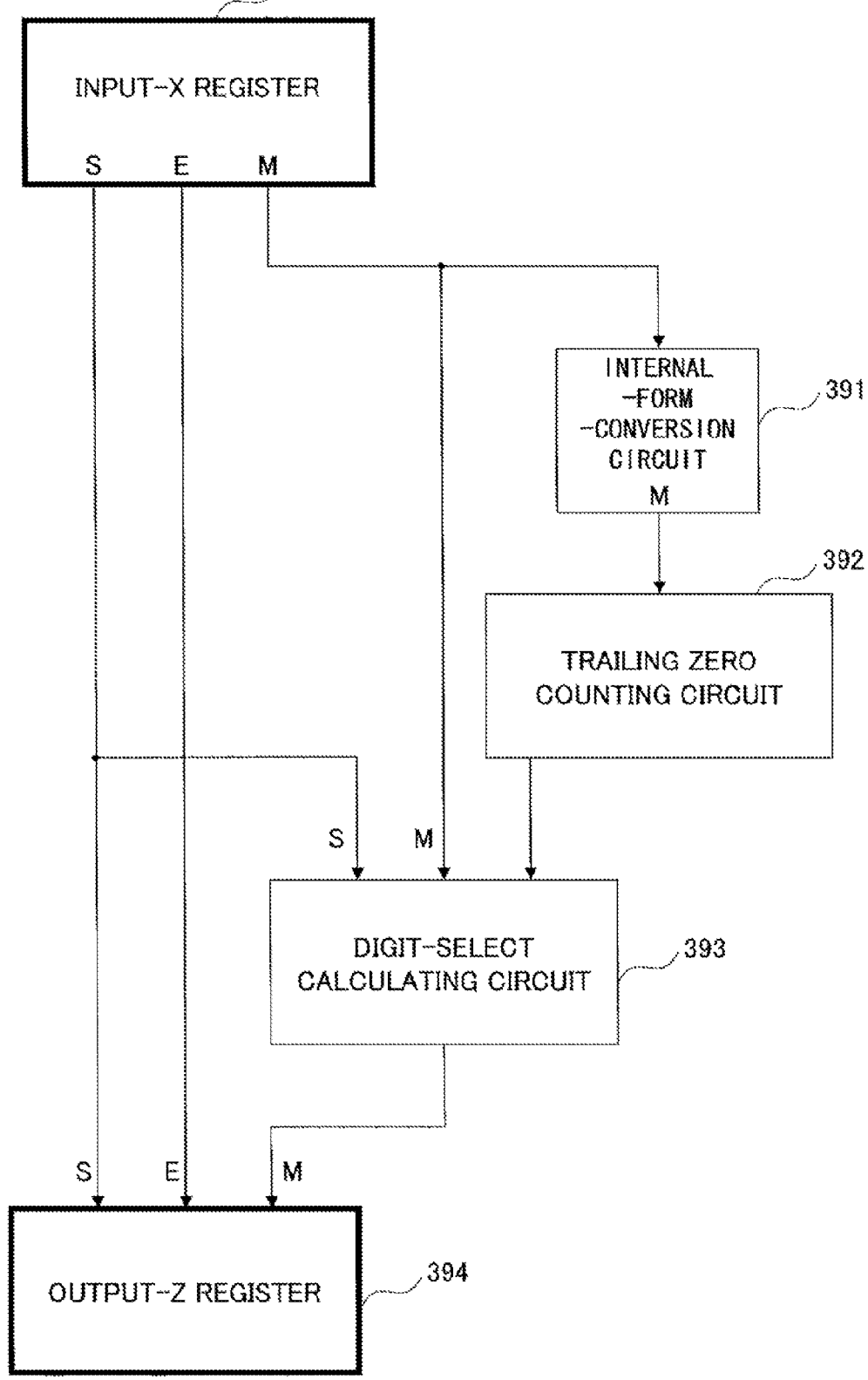
FIG. 49 is a drawing illustrating an example of the configuration of a circuit that performs an expand operation.

FIG. 49 is a drawing illustrating an example of the configuration of a circuit that performs an expand operation. The circuit illustrated in FIG. 49 includes an input-X register 390, an internal-form-conversion circuit 391, a trailing zero counting circuit 392, a digit-select calculating circuit 393, and an output-Z register 394.

The internal-form-conversion circuit 391 receives the mantissa of the value stored in the input-X register 390, and outputs a mantissa in the internal format. The trailing zero counting circuit 392 receives the mantissa in the internal format, and obtains the number of trailing zeros from the received mantissa, followed by outputting digit select data based on the counted number of trailing zeros. The digit-select calculating circuit 393 receives the sign and mantissa of the value stored in the input-X register 390, and also receives the digit select data from the trailing zero counting circuit 392. Based on the sign and the digit select data, the digit-select calculating circuit 393 selects, on a digit-by-digit basis, either the received mantissa or zero in the oraclenum64 representation (i.e., 0x01 or 0x65) for outputting. Zero is selected and output at a digit position that is determined by the trailing zero counting circuit 392 as the position of a trailing zero. The output data is stored in the output-Z register 394.

Figures 50A, 50B:
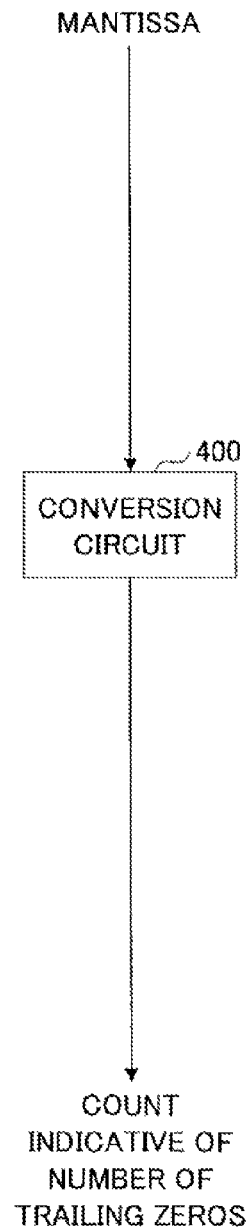
FIGS. 50A and 50B are drawings illustrating an example of the configuration of a trailing zero counting circuit.

FIGS. 50A and 50B are drawings illustrating an example of the configuration of the trailing zero counting circuit. As illustrated in FIG. 50A, the trailing zero counting circuit includes a conversion circuit 400. The conversion circuit 400 receives the mantissa as input data, and generates output data from the input data in accordance with the table illustrated in FIG. 50B. This output data is the count indicative of the number of trailing zeros, and represents the count by a binary number. In the table, the symbol "X" at the rightmost position indicates a non-zero value, and other Xs indicate a "don't care" value. 0s are the zeros that are subjected to counting.

Figure 51:
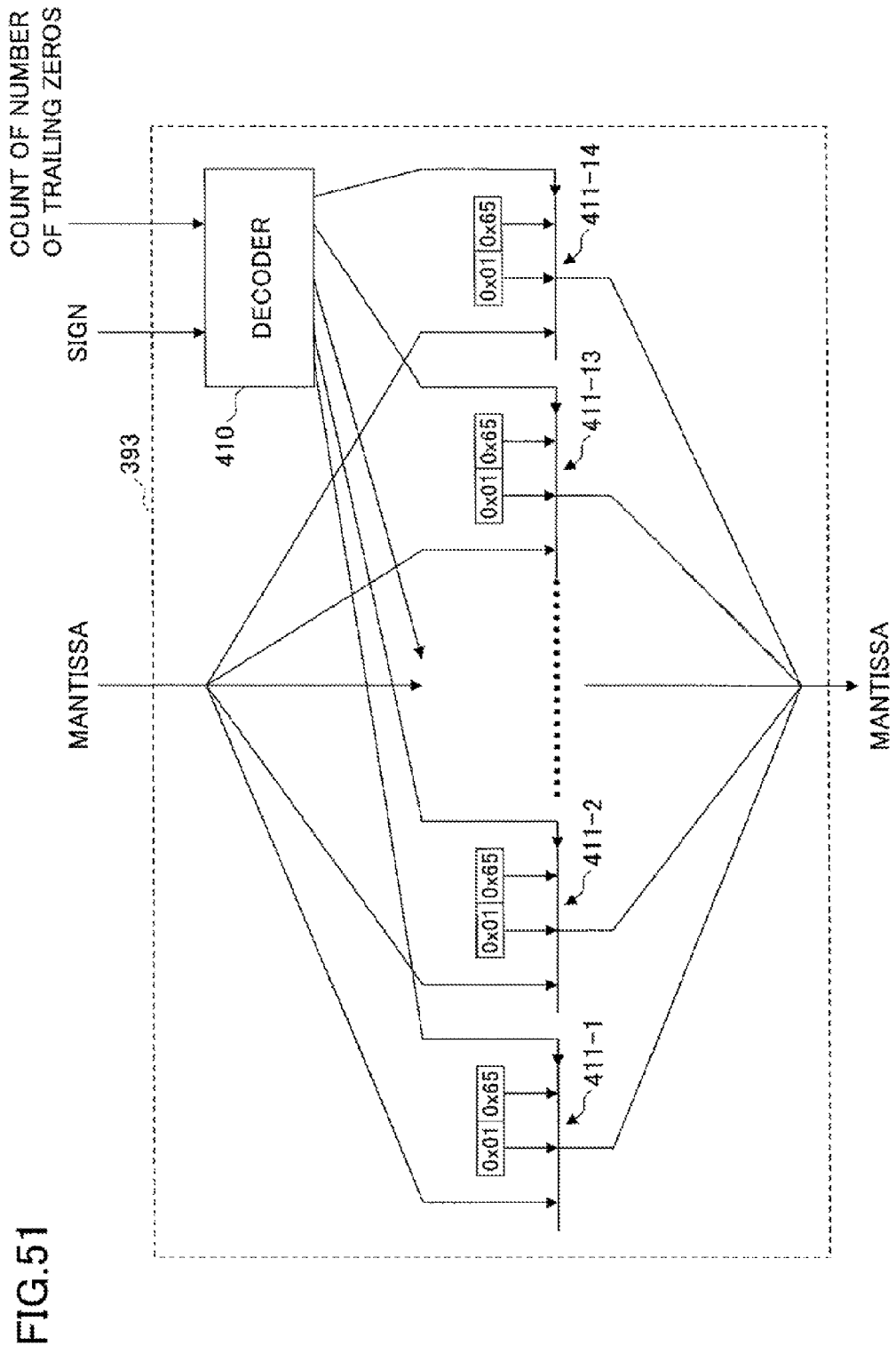
FIG. 51 is a drawing illustrating an example of the configuration of a digit-select calculating circuit.

FIG. 51 is a drawing illustrating an example of the configuration of the digit-select calculating circuit. The digit-select calculating circuit 393 illustrated in FIG. 51 includes a decoder 410 and selectors 411-1 through 411-14. The decoder 410 receives the sign and the count indicative of the number of trailing zeros, and generates a digit select signal on a digit-specific basis. The select signals generated by the decoder 410 are supplied to the selectors 411-1 through 411-14 corresponding to the respective 14 digits, for example. In the case of the count indicative of the number of trailing zeros being "n", the select signals are generated such that "0x01" or "0x65" is selected for the "n" digits from the least significant digit. When the sign is "1" indicative of positive, "0x01" is selected. When the sign is "0" indicative of negative, "0x65" is selected. The supplied mantissa is selected as it is for the n+10-th and higher-order digits as counted from the least significant digit. The supplied mantissa, 0x01, or 0x65 selected on a digit-by-digit basis is output as mantissa data.

Figure 52:
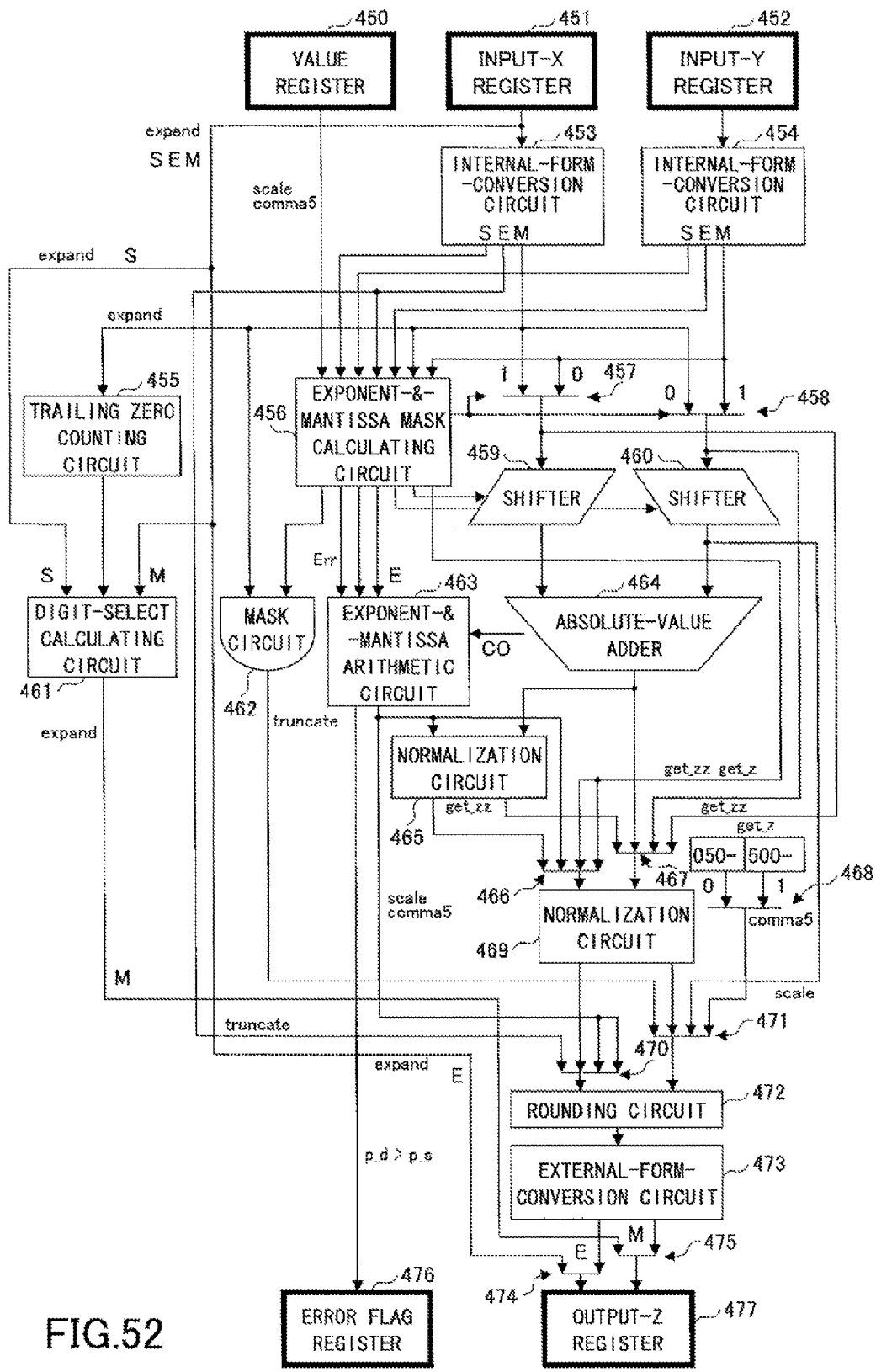
FIG. 52 is a drawing illustrating an example of the configuration of a fixed-precision floating-point number adding and subtracting unit.

FIG. 52 is a drawing illustrating an example of the configuration of a fixed-precision floating-point number adding and subtracting unit. The fixed-precision floating-point number adding and subtracting unit is obtained by adding various arithmetic functions described heretofore to the fixed-precision floating-point number adding and subtracting unit illustrated in FIG. 14, and corresponds to part of the arithmetic circuit 119 illustrated in FIG. 11. The arithmetic operations added herein include the get_z operation illustrated in FIG. 24, the get_zz operation illustrated in FIG. 29, the scale_next operation illustrated in FIG. 39, the get_comma5 operation illustrated in FIG. 43, the truncate operation illustrated in FIG. 44, the error check operation illustrated in FIG. 46, and the expand operation illustrated in FIG. 49. The fixed-precision floating-point number adding and subtracting unit illustrated in FIG. 52 includes a value register 450, an input-X register 451, an input-Y register 452, internal-form-conversion circuits 453 and 454, a trailing zero counting circuit 455, an exponent-&-mantissa mask calculating circuit 456, and selectors 457 and 458. The fixed-precision floating-point number adding and subtracting unit illustrated in FIG. 52 further includes shifters 459 and 460, a digit-select calculating circuit 461, a mask circuit 462, an exponent-&-mantissa arithmetic circuit 463, an absolute-value adder 464, a normalization circuit 465, selectors 466 through 468, and a normalization circuit 469. The fixed-precision floating-point number adding and subtracting unit illustrated in FIG. 52 further includes selectors 470 and 471, a rounding circuit 472, an external-form-conversion circuit 473, selectors 474 and 475, an error flag register 476, and an output-Z register 477.

Parts of the fixed-precision floating-point number adding and subtracting unit illustrated in FIG. 52 correspond to respective corresponding parts of the arithmetic devices described heretofore. For example, the trailing zero counting circuit 455 and the digit-select calculating circuit 461 correspond to the trailing zero counting circuit 392 and the digit-select calculating circuit 393, respectively, illustrated in FIG. 49. Also, for example, the mask circuit 462 corresponds to the mask circuit 346 of the truncate arithmetic operation illustrated in FIG. 44. Further, for example, the normalization circuit 465 corresponds to the normalization circuit 270 of the get_zz arithmetic operation illustrated in FIG. 29. For example, the normalization circuit 469 corresponds to the normalization circuit 234 of the get_z arithmetic operation illustrated in FIG. 24 and the get_zz arithmetic operation illustrated in FIG. 29. Further, for example, the selector 468 corresponds to the selector 337 of the get_comma5 arithmetic operation illustrated in FIG. 43. The exponent-&-mantissa mask calculating circuit 456 and the exponent-&-mantissa arithmetic circuit 463 correspond to a circuit unit obtained by putting together corresponding circuit units of the relevant arithmetic circuits. The operations of circuits noted above are the same as or similar to the operations of the respective corresponding circuits of the arithmetic operation circuits described heretofore. It may be noted that there is an arithmetic operation that does not need to be processed by the rounding circuit 472. In this implementation example, however, all the results of arithmetic operations are supplied to the rounding circuit 472 for the sake of reducing the number of selectors. The rounding mode may be set to zero for an arithmetic operation for which no rounding is necessary, thereby producing the same outcome as when the rounding circuit 472 is not used.

Figure 53:
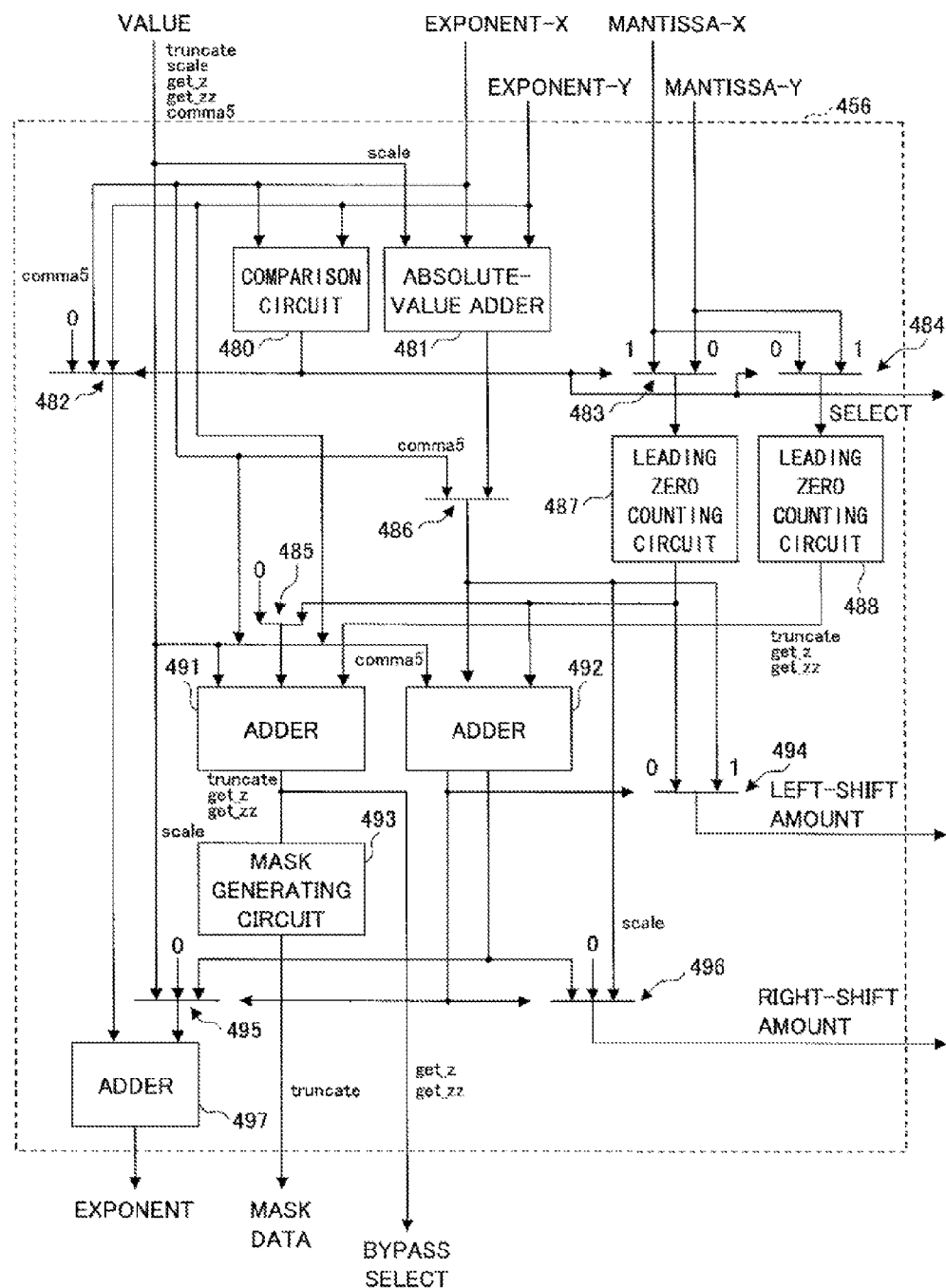
FIG. 53 is a drawing illustrating an example of the configuration of an exponent-&-mantissa mask calculating circuit.

FIG. 53 is a drawing illustrating an example of the configuration of the exponent-&-mantissa mask calculating circuit. The exponent-&-mantissa mask calculating circuit 456 illustrated in FIG. 53 includes a comparison circuit 480, an absolute-value adder 481, selectors 482 through 486, leading zero counting circuit 487 and 488, adders 491 and 492, and a mask generating circuit 493. The exponent-&-mantissa mask calculating circuit 456 illustrated in FIG. 53 further includes selectors 494 through 496 and an adder 497.

The comparison circuit 480, the absolute-value adder 481, the leading zero counting circuit 487, the selectors 494 and 496, and the adder 492 correspond to the comparison circuit 151, the absolute-value adder 152, the leading zero counting circuit 156, the selectors 158 and 157, and the adder 155, respectively, illustrated in FIG. 15. It may be noted, however, that the absolute-value adder 481 receives a value responsive to an arithmetic operation of interest in addition to the exponent-X and the exponent-Y, and performs a relevant addition and subtraction operation. The absolute-value adder 481 calculates an absolute value of a difference between the exponent-X and the exponent-Y in the case of the get_z arithmetic operation or the get_zz arithmetic operation. In the case of the scale_next arithmetic operation, the absolute-value adder 481 outputs the result of the arithmetic operation "exponent-Y−exponent-X−t (i.e., number of digits of oraclenum64)" as the amount of shift. The adder 491 performs the same function as the mask-digit calculating circuit 350 of FIG. 45 performs, and receives the exponent-X, the exponent-c (i.e., the exponent of comma5), and a count Lc indicative of the number of leading zeros to calculate a mask digit. The mask generating circuit 493 corresponding to the decoder 351 and the selectors 352-1 through 352-14 illustrated in FIG. 45 generates mask data in response to the above-noted mask digit. The adder 491 further performs the same function as the exponent-&-mantissa arithmetic circuit of FIG. 24 or FIG. 29 performs, thereby checking whether the absolute value of {(exponent-X−the count indicative of the number of leading zeros in mantissa-X)−(exponent-Y−the count indicative of the number of leading zeros in mantissa-Y)} is larger than or equal to 14. When this absolute value is 14 or larger, the adder 491 generates a bypass select signal for selecting a bypass route.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An arithmetic circuit for quantizing pre-quantized data, the arithmetic circuit comprising:
   a first input register to store first-format pre-quantized data that includes a mantissa of a floating-point number using a base-N numbering system (N: integer larger than or equal to 2), and includes an exponent for the mantissa;
   a second input register to store a quantization target exponent indicative of an exponent to be achieved for quantization of the pre-quantized data;
   an exponent-correction-value indicating unit to indicate an exponent correction value for the quantization target exponent;
   an exponent generating unit to generate a quantized exponent obtained by subtracting the exponent correction value from the quantization target exponent;
   a shift amount generating unit to generate a shift amount obtained by subtracting the exponent of the pre-quantized data and the exponent correction value from the quantization target exponent;
   a shift unit to generate a quantized mantissa obtained by shifting the mantissa of the pre-quantized data by the shift amount generated by the shift amount generating unit; and
   a first output register to store quantized data that includes the quantized exponent generated by the exponent generating unit and the quantized mantissa generated by the shift unit.

2. The arithmetic circuit as claimed in claim 1, further comprising:
   a first conversion unit to convert the pre-quantized data stored in the first input register into second-format pre-quantized data; and
   a second conversion unit to convert the quantization target exponent stored in the second input register into second-format quantization target exponent,
   wherein the exponent generating unit generates the quantized exponent by subtracting the exponent correction value from the second-format quantization target exponent, and the shift amount generating unit generates the shift amount by subtracting the exponent of the second-format pre-quantized data and the exponent correction value from the second-format quantization target exponent.

3. The arithmetic circuit as claimed in claim 2, wherein the second format is a binary-coded decimal format.

4. The arithmetic circuit as claimed in claim 1, further comprising a third conversion unit to convert the quantized data stored in the first output register into the first format.

5. The arithmetic circuit as claimed in claim 1, wherein the exponent correction value is a value indicative of a digit width of the mantissa.

6. The arithmetic circuit as claimed in claim 1, further comprising:
   a third input register to store a sign of the quantized data and the quantized mantissa generated by the shift unit;
   a trailing zero counting unit to count consecutive zeros starting from a least significant bit of the quantized mantissa stored in the third input register;
   a selector to select for each predetermined number of digits either at least one digit included the quantized mantissa stored in the third input register or a predetermined value indicative of zero based on the number of zeros counted by the trailing zero counting unit and the sign stored in the third input register, thereby outputting a zero-extended mantissa; and
   a second output register to store the sign of the quantized data and a zero-extended mantissa output by the selector.

7. The arithmetic circuit as claimed in claim 1, wherein the third input register also stores the quantized exponent generated by the exponent generating unit, and the second output register also stores the quantized exponent stored in the third input register.

8. An arithmetic processing apparatus comprising:
   an arithmetic circuit to perform quantization; and
   an instruction control unit to decode a quantization arithmetic instruction for controlling the quantization by the arithmetic circuit, wherein the arithmetic circuit includes:
a first input register to store first-format pre-quantized data that includes a mantissa of a floating-point number using a base-N numbering system (N: integer larger than or equal to 2), and includes an exponent for the mantissa;
a second input register to store a quantization target exponent indicative of an exponent to be achieved for quantization of the pre-quantized data;
an exponent-correction-value indicating unit to indicate an exponent correction value for the quantization target exponent;
an exponent generating unit to generate a quantized exponent obtained by subtracting the exponent correction value from the quantization target exponent based on a decode result obtained by the instruction control unit decoding the quantization arithmetic instruction;
a shift amount generating unit to generate a shift amount obtained by subtracting the exponent of the pre-quantized data and the exponent correction value from the quantization target exponent;
a shift unit to generate a quantized mantissa obtained by shifting the mantissa of the pre-quantized data by the shift amount generated by the shift amount generating unit based on the decode result obtained by the instruction control unit decoding the quantization arithmetic instruction; and
a first output register to store quantized data that includes the quantized exponent generated by the exponent generating unit and the quantized mantissa generated by the shift unit.

9. The arithmetic processing apparatus as claimed in claim 8, wherein the arithmetic circuit further includes:
a first conversion unit to convert the pre-quantized data stored in the first input register into second-format pre-quantized data; and
a second conversion unit to convert the quantization target exponent stored in the second input register into second-format quantization target exponent,
wherein the exponent generating unit generates the quantized exponent by subtracting the exponent correction value from the second-format quantization target exponent, and the shift amount generating unit generates the shift amount by subtracting the exponent of the second-format pre-quantized data and the exponent correction value from the second-format quantization target exponent.

10. The arithmetic processing apparatus as claimed in claim 9, wherein in the arithmetic circuit, the second format is a binary-coded decimal format.

11. The arithmetic processing apparatus as claimed in claim 8, wherein the arithmetic circuit further includes a third conversion unit to convert the quantized data stored in the first output register into quantized data of the first format.

12. The arithmetic processing apparatus as claimed in claim 11, wherein in the arithmetic circuit, the exponent correction value is a value indicative of a digit width of the mantissa.

13. The arithmetic processing apparatus as claimed in claim 8, wherein the instruction control unit further decodes a zero-extension arithmetic instruction for converting an arithmetic result obtained by the arithmetic circuit into a data format used for storage in a main memory device connected to the arithmetic processing apparatus, and the arithmetic circuit further includes:
a third input register to store a sign of the quantized data and the quantized mantissa generated by the shift unit;
a trailing zero counting unit to count consecutive zeros starting from a least significant bit of the quantized mantissa stored in the third input register based on a decode result obtained by the instruction control unit decoding the zero-extension arithmetic instruction;
a selector to select for each predetermined number of digits either at least one digit included the quantized mantissa stored in the third input register or a predetermined value indicative of zero based on the number of zeros counted by the trailing zero counting unit and the sign stored in the third input register, thereby outputting a zero-extended mantissa in response to the decode result obtained by the instruction control unit decoding the zero-extension arithmetic instruction; and
a second output register to store the sign of the quantized data and a zero-extended mantissa output by the selector.

14. The arithmetic processing apparatus as claimed in claim 8, wherein in the arithmetic circuit, the third input register also stores the quantized exponent generated by the exponent generating unit, and the second output register also stores the quantized exponent stored in the third input register.

15. A method of controlling an arithmetic circuit including a first input register to store first-format pre-quantized data that includes a mantissa of a floating-point number using a base-N numbering system (N: integer larger than or equal to 2), and includes an exponent for the mantissa; a second input register to store a quantization target exponent indicative of an exponent to be achieved for quantization of the pre-quantized data; and an exponent-correction-value register to store an exponent correction value for the quantization target exponent, the method comprising:
generating, by use of an exponent generating unit of the arithmetic circuit, a quantized exponent obtained by subtracting the exponent correction value from the quantization target exponent;
generating, by use of a shift amount generating unit of the arithmetic circuit, a shift amount obtained by subtracting the exponent of the pre-quantized data and the exponent correction value from the quantization target exponent; and
generating, by use of a shift unit of the arithmetic circuit, a quantized mantissa obtained by shifting the mantissa of the pre-quantized data by the shift amount generated by the shift amount generating unit.

16. The method as claimed in claim 15, wherein the arithmetic circuit further includes a third input register to store a sign of the quantized data and the quantized mantissa generated by the shift unit, and the method further includes:
counting, by use of a trailing zero counting unit of the arithmetic circuit, consecutive zeros starting from a least significant bit of the quantized mantissa stored in the third input register; and
selecting, by use of a selector of the arithmetic circuit, for each predetermined number of digits, either at least one digit included the quantized mantissa stored in the third input register or a predetermined value indicative of zero based on the number of zeros counted by the trailing zero counting unit and the sign stored in the third input register, thereby outputting a zero-extended mantissa.

* * * * *